(12) United States Patent
Lee et al.

(10) Patent No.: US 12,550,078 B2
(45) Date of Patent: Feb. 10, 2026

(54) ELECTRONIC DEVICE AND METHOD FOR CONTROLLING TRANSMISSION POWER ACCORDING TO OVER-TEMPERATURE STATE IN ELECTRONIC DEVICE

(71) Applicant: SAMSUNG ELECTRONICS CO., LTD., Suwon-si (KR)

(72) Inventors: Sanghyun Lee, Suwon-si (KR); Seungmoo Cho, Suwon-si (KR); Yonghyon Kim, Suwon-si (KR); Dongchul Ma, Suwon-si (KR); Byungki Moon, Suwon-si (KR); Sungbo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 317 days.

(21) Appl. No.: 17/733,154

(22) Filed: Apr. 29, 2022

(65) Prior Publication Data
US 2022/0361118 A1 Nov. 10, 2022

Related U.S. Application Data

(63) Continuation of application No. PCT/KR2022/005107, filed on Apr. 8, 2022.

(30) Foreign Application Priority Data

Apr. 30, 2021 (KR) .................. 10-2021-0056906

(51) Int. Cl.
*H04W 52/00* (2009.01)
*H04L 1/00* (2006.01)
(Continued)

(52) U.S. Cl.
CPC ......... *H04W 52/367* (2013.01); *H04L 1/0003* (2013.01); *H04L 1/203* (2013.01); *H04W 52/146* (2013.01)

(58) Field of Classification Search
None
See application file for complete search history.

(56) References Cited

U.S. PATENT DOCUMENTS

2002/0177462 A1 11/2002 Cao et al.
2010/0216472 A1 8/2010 Youn et al.
(Continued)

FOREIGN PATENT DOCUMENTS

| CN | 107809773 | 3/2018 |
| CN | 111431552 | 7/2020 |

(Continued)

OTHER PUBLICATIONS

Extended European Search Report dated Jun. 20, 2024 issued in European Patent Application No. 22796000.2.
(Continued)

*Primary Examiner* — Brandon M Renner
(74) *Attorney, Agent, or Firm* — NIXON & VANDERHYE P.C.

(57) ABSTRACT

According to various embodiments, an electronic device may comprise: a temperature sensor; a wireless communication circuit; and a processor electrically connected to the wireless communication circuit, wherein the processor is configured to: receive a temperature sensed by the temperature sensor; determine a first maximum transmission power as a maximum transmission power of uplink transmission data to be transmitted through the wireless communication circuit, identify a modulation and coding scheme (MCS) index and a number of resource blocks (RBs), when the received temperature is higher than a predetermined value, based on the identified the MCS index and the number of RBs, determine a second maximum transmission power, and change the first maximum transmission power to the second maximum transmission power, wherein the second maxi-
(Continued)

mum transmission power is lower than the first maximum transmission power.

20 Claims, 34 Drawing Sheets

(51) Int. Cl.
  *H04L 1/20*     (2006.01)
  *H04W 52/14*    (2009.01)
  *H04W 52/36*    (2009.01)

(56) References Cited

U.S. PATENT DOCUMENTS

| | | |
|---|---|---|
| 2010/0285828 A1 | 11/2010 | Panian et al. |
| 2011/0121939 A1* | 5/2011 | Hosomi ................ H04B 1/036 340/3.1 |
| 2012/0075992 A1 | 3/2012 | Shahidi et al. |
| 2012/0094617 A1 | 4/2012 | Tone et al. |
| 2013/0039173 A1 | 2/2013 | Ehsan et al. |
| 2013/0344830 A1 | 12/2013 | Coe et al. |
| 2018/0049139 A1 | 2/2018 | Lim et al. |
| 2019/0364511 A1 | 11/2019 | Chen et al. |
| 2020/0068499 A1 | 2/2020 | Ryoo et al. |
| 2020/0154372 A1 | 5/2020 | Chae et al. |
| 2020/0229112 A1 | 7/2020 | John Wilson et al. |
| 2021/0099961 A1* | 4/2021 | Sood ..................... H04W 52/24 |
| 2022/0295316 A1* | 9/2022 | Vos ....................... H04W 72/23 |

FOREIGN PATENT DOCUMENTS

| | | |
|---|---|---|
| EP | 1622286 | 2/2006 |
| EP | 2141935 | 1/2010 |
| KR | 10-2002-0090132 | 11/2002 |
| KR | 10-2010-0096938 | 9/2010 |
| KR | 10-2014-0046047 | 4/2014 |
| KR | 10-2017-0121207 | 11/2017 |
| KR | 10-2019-0137873 | 12/2019 |
| KR | 10-2020-0109237 | 9/2020 |
| KR | 10-2020-0136860 | 12/2020 |
| WO | 2010/048471 | 4/2010 |
| WO | 2010/129667 | 11/2010 |
| WO | 2012/122113 | 9/2012 |
| WO | 2013/108317 | 7/2013 |
| WO | 2020/123162 | 6/2020 |

OTHER PUBLICATIONS

Search Report and Written Opinion issued Jul. 12, 2022 in counterpart International Patent Application No. PCT/KR2022/005107.

* cited by examiner

ELECTRONIC DEVICE AND METHOD FOR CONTROLLING TRANSMISSION POWER ACCORDING TO OVER-TEMPERATURE STATE IN ELECTRONIC DEVICE

CROSS-REFERENCE TO RELATED APPLICATIONS

This application is a continuation of International Application No. PCT/KR2022/005107 designating the United States, filed on Apr. 8, 2022, in the Korean Intellectual Property Receiving Office and claiming priority to Korean Patent Application No. 10-2021-0056906, filed on Apr. 30, 2021, in the Korean Intellectual Property Office, the disclosures of which are incorporated by reference herein in their entireties.

BACKGROUND

Field

The disclosure relates to an electronic device and a method for controlling transmission power according to an over-temperature state in an electronic device.

Description of Related Art

To meet the demand for wireless data traffic having increased since deployment of 4G communication systems, efforts have been made to develop a 5G communication system. In order to achieve a higher data transmission rate, implementation is considered in the 5G communication system to use the existing communication band such as 3G and LTE but also a new band, for example, an ultra-high frequency band (e.g., an FR2 band). Multiple antenna modules may be packaged in an electronic device supporting mmWave, which is an ultra-high frequency band. Due to high frequency characteristics, mmWave band radio channels have high linearity and a large path loss and, to make up for the issues, highly directional beamforming is essential and, to that end, multiple antenna modules are needed. For example, multiple antenna modules radiating signals in different directions may be packaged in an electronic device.

SUMMARY

In 5G communication technology, a relatively large amount of data can be transmitted and a large amount of power can be consumed, and thus, potentially, the temperature of an electronic device may rise. For example, due to the use of a high frequency band and the increase in data throughput, the electronic device requires more power consumption, and accordingly, the amount of heat generated from the electronic device may increase, which may lead to an overheating phenomenon occurring in or around an antenna module in use.

For example, when a specific antenna module or an area therearound is overheated, a user using the electronic device may feel unpleasant, and furthermore, the overheating may cause a low temperature burn. With additional damage of a component (e.g., a battery) disposed around the overheated antenna module, overall performance of the electronic device may deteriorate. According to various embodiments, the electronic device may install various applications including a data transmission or reception function through 5G communication and use the same. When the electronic device executes an application requiring an excessive amount of data transmission or reception through 5G communication, the amount of generated heat may increase much more due to the use of the high frequency band and the increase in the data throughput.

Various embodiments provide an electronic device and a method for controlling transmission power according to an over-temperature state in the electronic device, wherein maximum transmission power of uplink transmission data is adjusted based on a parameter (e.g., an MCS, the number of resource blocks, a data rate, a grant ratio, a path loss, a BSI, and a BLER) related to a physical layer of the electronic device in the over-temperature state, so that peak current can be reduced.

According to various embodiments, an electronic device may include: a temperature sensor; a wireless communication circuit; and a processor electrically connected to the wireless communication circuit, wherein the processor is configured to: receive a temperature sensed by the temperature sensor; determine a first maximum transmission power as a maximum transmission power of uplink transmission data to be transmitted through the wireless communication circuit, identify a modulation and coding scheme (MCS) index and a number of resource blocks (RBs), when the received temperature is higher than a predetermined value, based on the identified the MCS index and the number of RBs, determine a second maximum transmission power, and change the first maximum transmission power to the second maximum transmission power, wherein the second maximum transmission power is lower than the first maximum transmission power.

According to various embodiments, a method of operating an electronic device may include: receiving a temperature sensed by a temperature sensor; determining a first maximum transmission power as a maximum transmission power of uplink transmission data to be transmitted through a wireless communication circuit, identifying a modulation and coding scheme (MCS) index and a number of resource blocks (RBs), when the received temperature is higher than a predetermined value, based on the identified the MCS index and the number of RBs, determining a second maximum transmission power, changing the first maximum transmission power to the second maximum transmission power, wherein the second maximum transmission power is lower than the first maximum transmission power.

A non-transitory computer readable storage medium storing one or more programs, the one or more programs comprising instructions configured to, when executed by a processor of an electronic device, cause the electronic device to: receive a temperature sensed by a temperature sensor; determine a first maximum transmission power as a maximum transmission power of uplink transmission data to be transmitted through a wireless communication circuit, identify a modulation and coding scheme (MCS) index and a number of resource blocks (RBs), when the received temperature is higher than a predetermined value, based on the identified the MCS index and the number of RBs, determine a second maximum transmission power, and change the first maximum transmission power to the second maximum transmission power, wherein the second maximum transmission power is lower than the first maximum transmission power.

According to various embodiments, an electronic device and an operation method of the electronic device can reduce peak current by adjusting maximum transmission power of uplink transmission data, based on a parameter (e.g., an MCS, the number of resource blocks, a data rate, a grant ratio, a path loss, a BSI, and a BLER) related to a physical layer of the electronic device in the over-temperature state. As the peak current is controlled to decrease, an overheating problem can be addressed.

According to various embodiments, an electronic device and an operation method of the electronic device may adjust maximum transmission power in an over-temperature state, wherein maximum transmission power of or transmission power uplink transmission data is adjusted based on a parameter (e.g., an MCS, the number of resource blocks, a data rate, a grant ratio, a path loss, a BSI, and a BLER) related to a physical layer of the electronic device in the over-temperature state, and thus, transmission performance deterioration which may be caused by reduction of the transmission power can be minimized and/or reduced.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
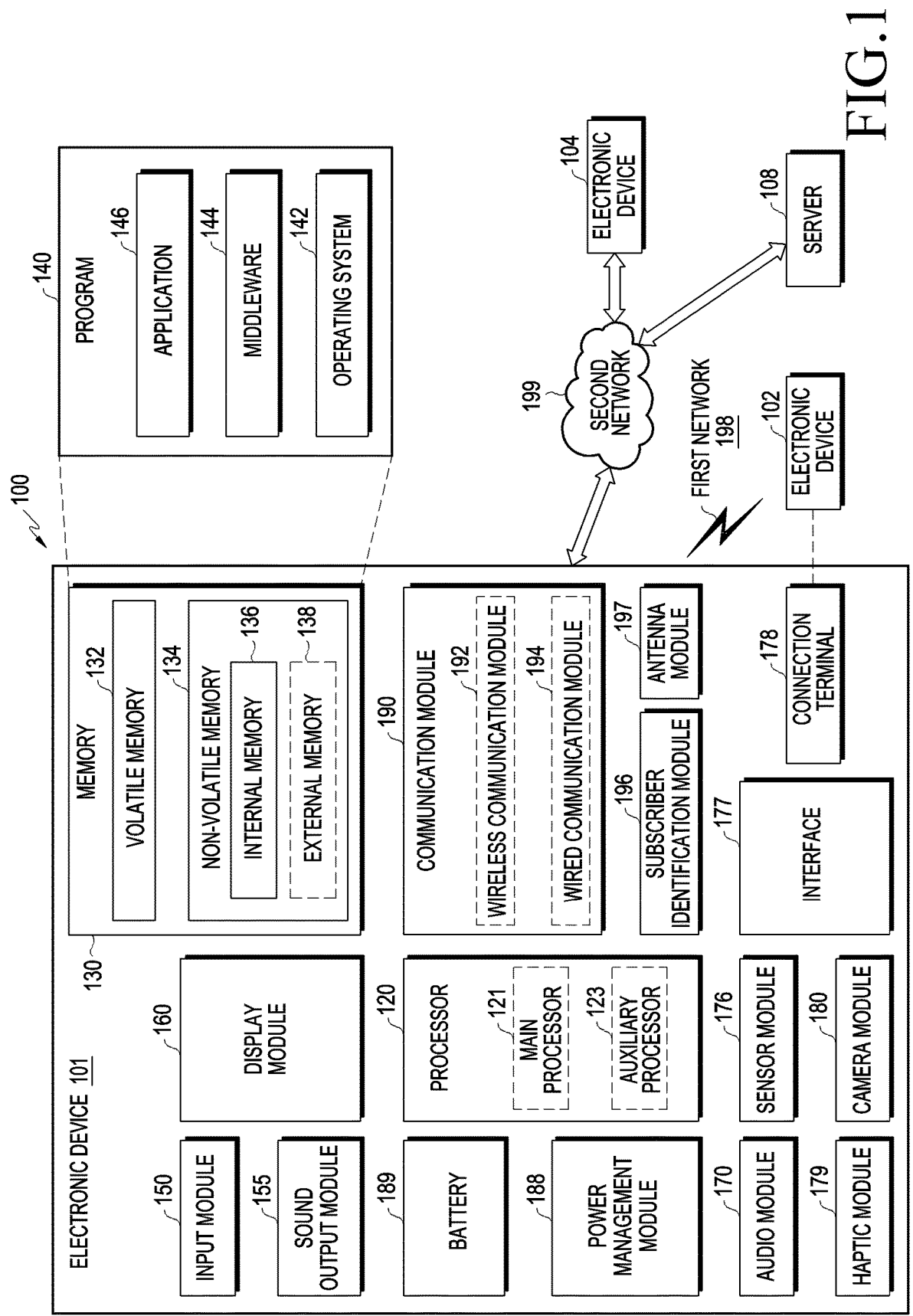
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
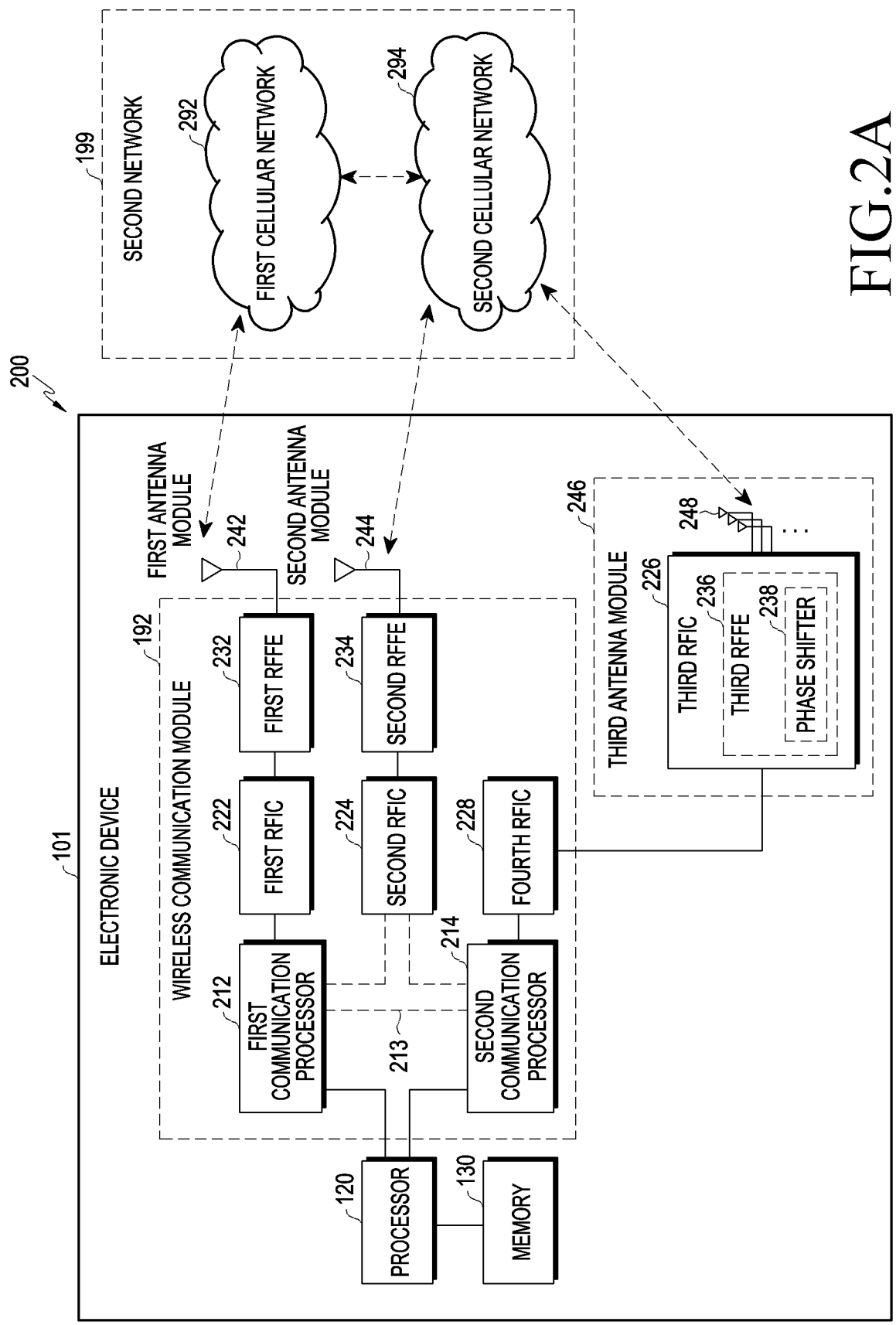
FIG. 2A is a block diagram illustrating an electronic device for supporting legacy network communication and 5G network communication according to various embodiments.

FIG. 2A is a block diagram 200 illustrating an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device may further include a processor 120 and a memory 130. A second network 199 may include a first cellular network 292 and a second cellular network 294. In an embodiment, the electronic device 101 may further include at least one of the elements illustrated in FIG. 1, and the second network 199 may further include another network. According to an embodiment, the first communication processor 212, the second communication processor 214, the first RFIC 222, the second RFIC 224, the fourth RFIC 228, the first RFFE 232, and the second RFFE 234 may form at least a part of a wireless communication module 192. According to an embodiment, the fourth RFIC 228 may be omitted, or may be included as a part of the third RFIC 226.

The first communication processor 212 may include various processing circuitry and support establishment of a communication channel of a band to be used for wireless communication with the first cellular network 292, and legacy network communication through the established communication channel According to various embodiments, the first cellular network may be a legacy network including a second generation (2G), 3G, 4G, or long-term evolution (LTE) network. The second communication processor 214 may support establishment of a communication channel corresponding to a designated band (e.g., about 6 GHz to about 60 GHz) among the bands to be used for wireless communication with the second cellular network 294, and 5G network communication through the established communication channel. According to various embodiments, the second cellular network 294 may be a 5G network defined in 3GPP. Additionally, according to an embodiment, the first communication processor 212 or the second communication processor 214 may support establishment of a communication channel corresponding to another designated band (e.g., about 6 GHz or less) among the bands to be used for wireless communication with the second cellular network 294, and 5G network communication through the established communication channel The first communication processor 212 may transmit or receive data to or from the second communication processor 214. For example, data classified to be transmitted through the second cellular network 294 may be changed to be transmitted through the first cellular network 292. In this case, the first communication processor 212 may receive transmission data from the second communication processor 214. For example, the first communication processor 212 may transmit or receive data to or from the second communication processor 214 via an inter-processor interface 213. The inter-processor interface 213 may be implemented as, for example, a universal asynchronous receiver/transmitter (UART) (e.g., a high speed-UART (HS-UART) or peripheral component interconnect bus express (PCIe) interface), but the type of the interface is not limited thereto. Alternatively, the first communication processor 212 and the second communication processor 214 may exchange control information and packet data information using, for example, a shared memory. The first communication processor 212 may transmit or receive various information such as sensing information, information on output intensity, and resource block (RB) allocation information, to and from the second communication processor 214.

Depending on the implementation, the first communication processor 212 may not be directly connected to the second communication processor 214. In this case, the first communication processor 212 may also transmit or receive data to or from the second communication processor 214 through the processor 120 (e.g., an application processor). For example, the first communication processor 212 and the second communication processor 214 may transmit or receive data to or from the processor 120 (e.g., application processor) through the HS-UART interface or PCIe interface, but the type of the interface is not limited thereto. Alternatively, the first communication processor 212 and the second communication processor 214 may exchange control information and packet data information with the processor 120 (e.g., an application processor) using the shared memory.

Figure 2B:
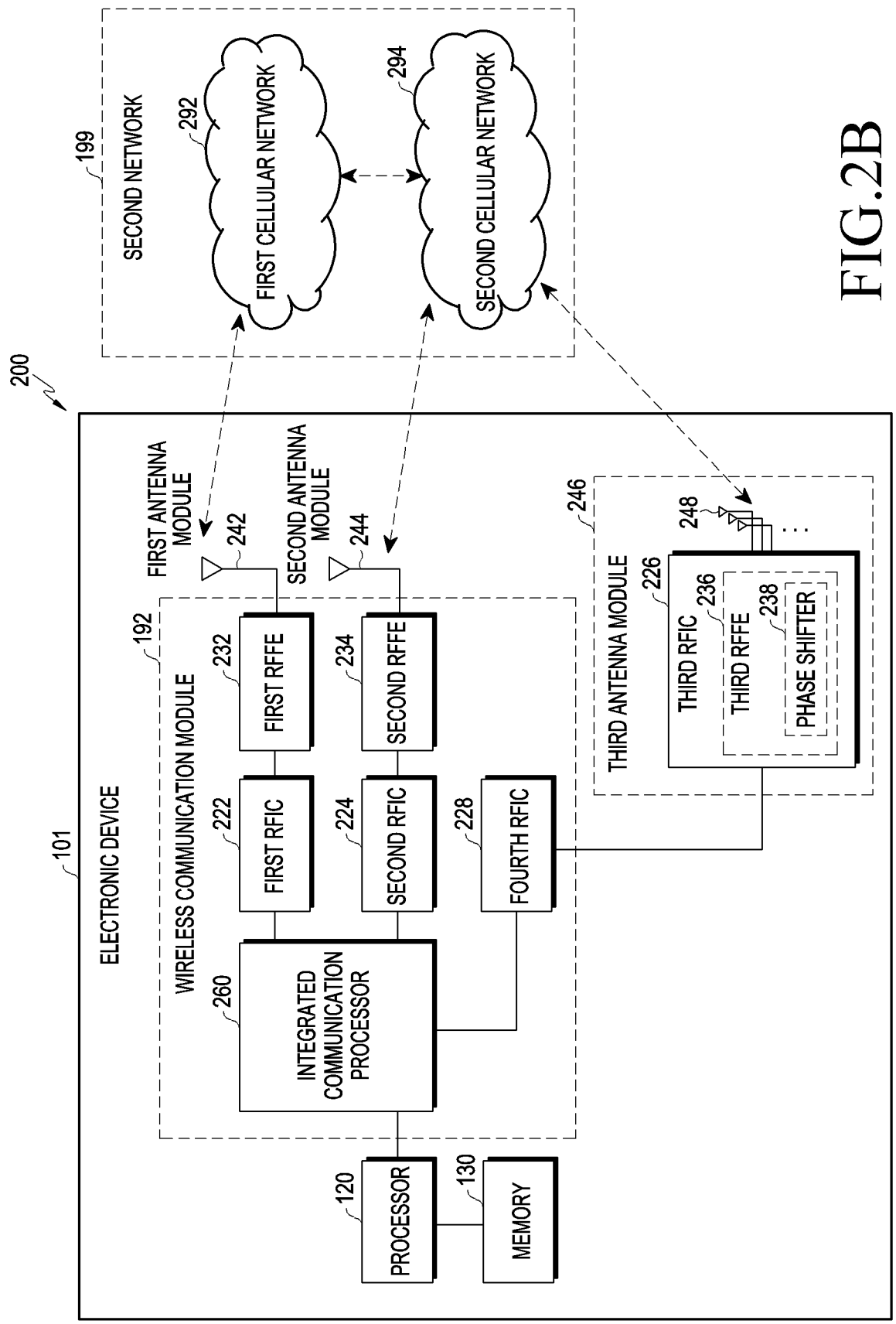
FIG. 2B is a block diagram illustrating an electronic device for supporting legacy network communication and 5G network communication according to various embodiments.

According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190. For example, as illustrated in FIG. 2B, a communication processor (e.g., including processing circuitry) 260 may support all functions for communication with the first cellular network 292 and the second cellular network 294.

The first RFIC 222, when performing transmission, may convert a baseband signal generated by the first communication processor 212 into a radio frequency (RF) signal of about 700 MHz to about 3 GHz used in the first cellular network 292 (e.g., a legacy network). When performing reception, an RF signal is obtained from the first cellular network 292 (e.g., the legacy network) through an antenna (e.g., the first antenna module 242), and may be pre-processed through an RFFE, (e.g., the first RFFE 232). The first RFIC 222 may convert the preprocessed RF signal into a baseband signal so that the signal can be processed by the first communication processor 212.

The second RFIC 224, when performing transmission, may convert the baseband signal generated by the first communication processor 212 or the second communication processor 214 into an RF signal (hereinafter, referred to as a 5G Sub6 RF signal) of a Sub6 band (e.g., about 6 GHz or less) used in the second cellular network 294 (e.g., a 5G network). When performing reception, the 5G Sub6 RF signal is obtained from the second cellular network 294 (e.g., a 5G network) through an antenna (e.g., the second antenna module 244), and may be pre-processed via an RFFE (e.g., the second RFFE 234). The second RFIC 224 may convert the pre-processed 5G Sub6 RF signal into a baseband signal so that the signal can be processed by a corresponding communication processor among the first communication processor 212 or the second communication processor 214.

The third RFIC 226 may convert the baseband signal generated by the second communication processor 214 into an RF signal (hereinafter, referred to as a 5G Above6 RF signal) in the 5G Above6 band (e.g., about 6 GHz to about 60 GHz) to be used in the second cellular network 294 (e.g., a 5G network). When performing reception, the 5G Above6 RF signal may be obtained from the second cellular network 294 (e.g., the 5G network) through an antenna (e.g., the antenna 248) and may be pre-processed through the third RFFE 236. The third RFIC 226 may convert the pre-processed 5G Above6 RF signal into a baseband signal so that the signal can be processed by the second communication processor 214. According to an embodiment, the third RFFE 236 may be formed as a part of the third RFIC 226.

The electronic device 101 may include the fourth RFIC 228 separately or at least as a part of the third RFIC 226 according to an embodiment. In this case, the fourth RFIC 228 may convert the baseband signal generated by the second communication processor 214 into an RF signal (hereinafter, referred to as an IF signal) of an intermediate frequency band (e.g., about 9 GHz to about 11 GHz), and then may transfer the IF signal to the third RFIC 226. The third RFIC 226 may convert the IF signal into a 5G Above6 RF signal. When performing reception, the 5G Above6 RF signal may be received from the second cellular network 294 (e.g., the 5G network) through an antenna (e.g., the antenna 248) and converted into an IF signal by the third RFIC 226. The fourth RFIC 228 may convert the IF signal into a baseband signal so that the signal can be processed by the second communication processor 214.

According to an embodiment, the first RFIC 222 and the second RFIC 224 may be implemented as at least a part of a single chip or a single package. According to various embodiments, in FIG. 2A or 2B, when the first RFIC 222 and the second RFIC 224 are implemented as a single chip or a single package, the first RFIC 222 and the second RFIC 224 may be implemented as an integrated RFIC. In this case, the integrated RFIC may be connected to the first RFFE 232 and the second RFFE 234 to convert the baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least a part of a single chip or a single package. According to an embodiment, at least one antenna module of the first antenna module 242 or the second antenna module 244 may be omitted or combined with another antenna module to process RF signals of multiple corresponding bands.

According to an embodiment, the third RFIC 226 and the antenna 248 may be arranged on the same substrate to form the third antenna module 246. For example, the wireless communication module 192 or the processor 120 may be disposed on a first substrate (e.g., main PCB). In this case, the third RFIC 226 may be disposed in a partial area (e.g., the lower surface) of a second substrate (e.g., a sub PCB) separated from the first substrate, and the antenna 248 may be disposed in another partial area (e.g., upper surface), so that the third antenna module 246 is formed. By arranging the third RFIC 226 and the antenna 248 in the same substrate, it is possible to reduce the length of the transmission line therebetween. For example, this can reduce a signal in a high frequency band (e.g., about 6 GHz to about 60 GHz) used for 5G network communication to be lost (e.g., attenuated) by a transmission line. As a result, the electronic device 101 can improve the quality or speed of communication with the second cellular network 294 (e.g., the 5G network).

According to an embodiment, the antenna 248 may include an antenna array including multiple antenna elements that may be used for beamforming. In this case, the third RFIC 226 may include multiple phase shifters 238 corresponding to multiple antenna elements, for example, as a part of the third RFFE 236. When performing transmission, each of the multiple phase shifters 238 may shift the phase of the 5G Above6 RF signal to be transmitted to the outside (e.g., a base station of a 5G network) of the electronic device 101 through a corresponding antenna element. When performing reception, each of the multiple phase shifters 238 may shift the phase of the 5G Above6 RF signal received from the outside to the same or substantially the same phase through a corresponding antenna element. This enables transmission or reception through beamforming between the electronic device 101 and the outside.

The second cellular network 294 (e.g., the 5G network) may be operated independently from the first cellular network 292 (e.g., the legacy network) (e.g., stand-alone (SA)), or may be connected and operated (e.g., non-stand-alone (NSA)). For example, the 5G network may have only an access network (e.g., 5G radio access network (RAN) or next generation RAN (NG RAN)), and no core network (e.g., next generation core (NGC)). In this case, the electronic device 101 may access the access network of the 5G network, and then access an external network (e.g., the Internet) under the control of the core network (e.g., evolved packed core (EPC)) of the legacy network. Protocol information (e.g., LTE protocol information) for communication with a legacy network or protocol information (e.g., new radio (NR) protocol information) for communication with a 5G network may be stored in the memory 230, and may be accessed by other elements (e.g., the processor 120, the first communication processor 212, or the second communication processor 214).

Figure 3:
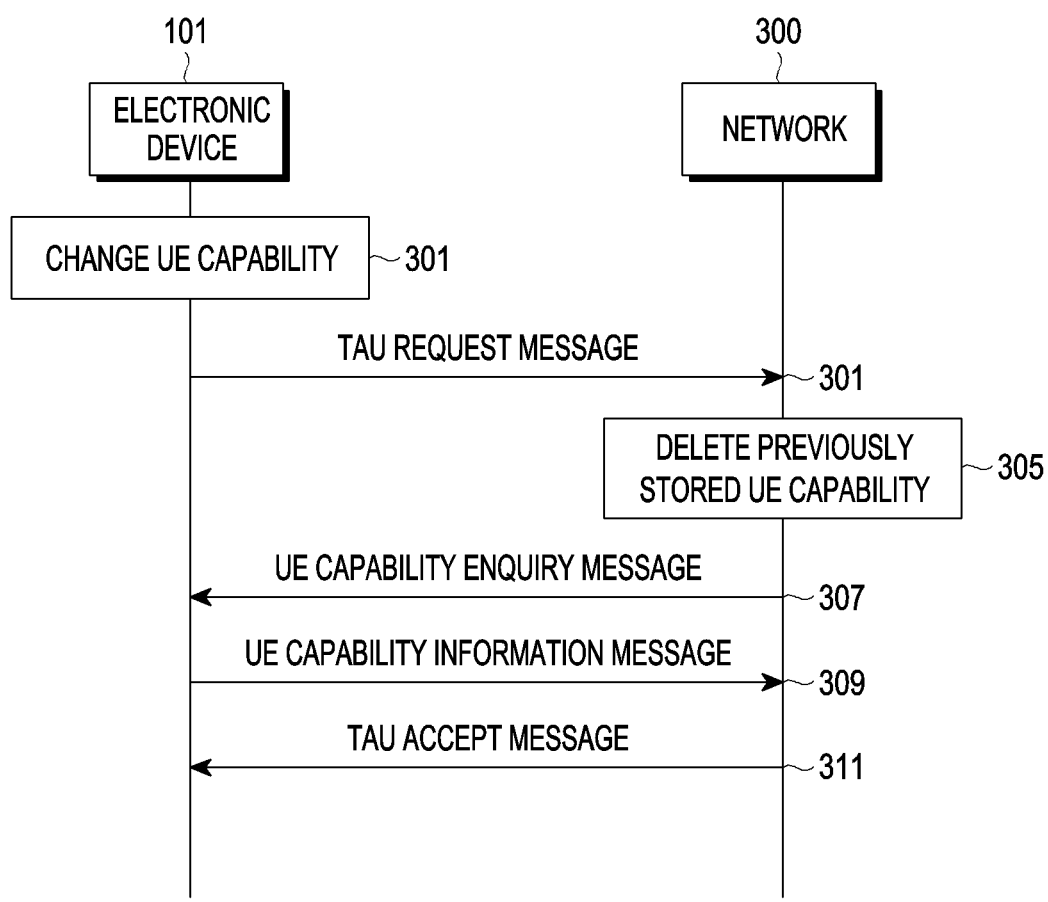
FIG. 3 is a flowchart illustrating operation methods of an electronic device and a network according to various embodiments.

FIG. 3 is a flowchart illustrating operation methods of an electronic device and a network according to various embodiments.

According to various embodiments, an electronic device 101 (for example, at least one of a processor 120, a first communication processor 212, a second communication processor 214, or an integrated communication processor 260) may change a user equipment (UE) capability in operation 301. For example, the UE capability may correspond to a file and/or data (or a data table) which can be stored in a memory (e.g., the memory 130 or a memory included in and/or referenced by at least one communication processor) of the electronic device 101. The UE capability may include an information element for generating a UE capability information message. Here, the change of the UE capability may refer, for example, to a change of at least a part of multiple information elements included in the UE capability. The electronic device 101 may change the UE capability, based on detection of an event requiring the change of the UE capability, and an event according to various embodiments will be described in greater detail below.

According to various embodiments, the electronic device 101 may transmit a tracking area update (TAU) request message to a network 300 in operation 303. For example, the electronic device 101 may transmit a TAU request message including a "UE radio capability information update needed" information element to the network 300. The "UE radio capability information update needed" information element is to indicate whether to cause the network to delete stored UE capability information. The "UE radio capability information update needed" information element may include, for example, a "URC upd" field of octet 1, and may be expressed in the form of a plug. For example, when the "URC upd" field of the corresponding information element corresponds to "1", it may refer, for example, to a UE capability update being requested, and when the "URC upd" field of the corresponding information element corresponds to "0", it may refer, for example, to no UE capability update being requested. For example, the electronic device 101 may transmit a TAU request message including the "UE radio capability information updated needed" information element having the "URC upd" field which corresponds to 1, to the network 300. In operation 305, the network 300 may delete the existing (e.g., previously stored) UE capability, based on the reception of the TAU request message. For example, the UE capability stored in the network 300 may correspond to, for example, information (for example, a file and/or data (or a data table)) based on at least one information element included in the UE capability information message received from a specific UE (for example, the electronic device 101).

According to various embodiments, in operation 307, the network 300 may transmit a UE capability enquiry message to the electronic device 101. For example, the network 300, in a radio resource control (RRC)-connected state, may transmit the UE capability enquiry message when additional UE capability information is needed. For example, the network 300 may perform a UE capability enquiry after AS security activation. In operation 309, the electronic device 101 may transmit a UE capability information message to the network 300, based on the reception of the UE capability enquiry message. For example, the electronic device 101 may generate the UE capability information message, based on at least a part of the UE capability stored in the electronic device 101. For example, changed UE capability information elements may be included in the UE capability information message. A process of transmission or receiving the UE capability enquiry message and the UE capability information message may be also called a UE capability transfer process. After the UE capability transfer process, the network 300 may transmit a TAU accept message in operation 311. According to the description above, the network 300 may identify the UE capability changed by the electronic device 101, and thus the UE capabilities of the electronic device 101 and the network 300 may be consistent with each other.

Figure 4:
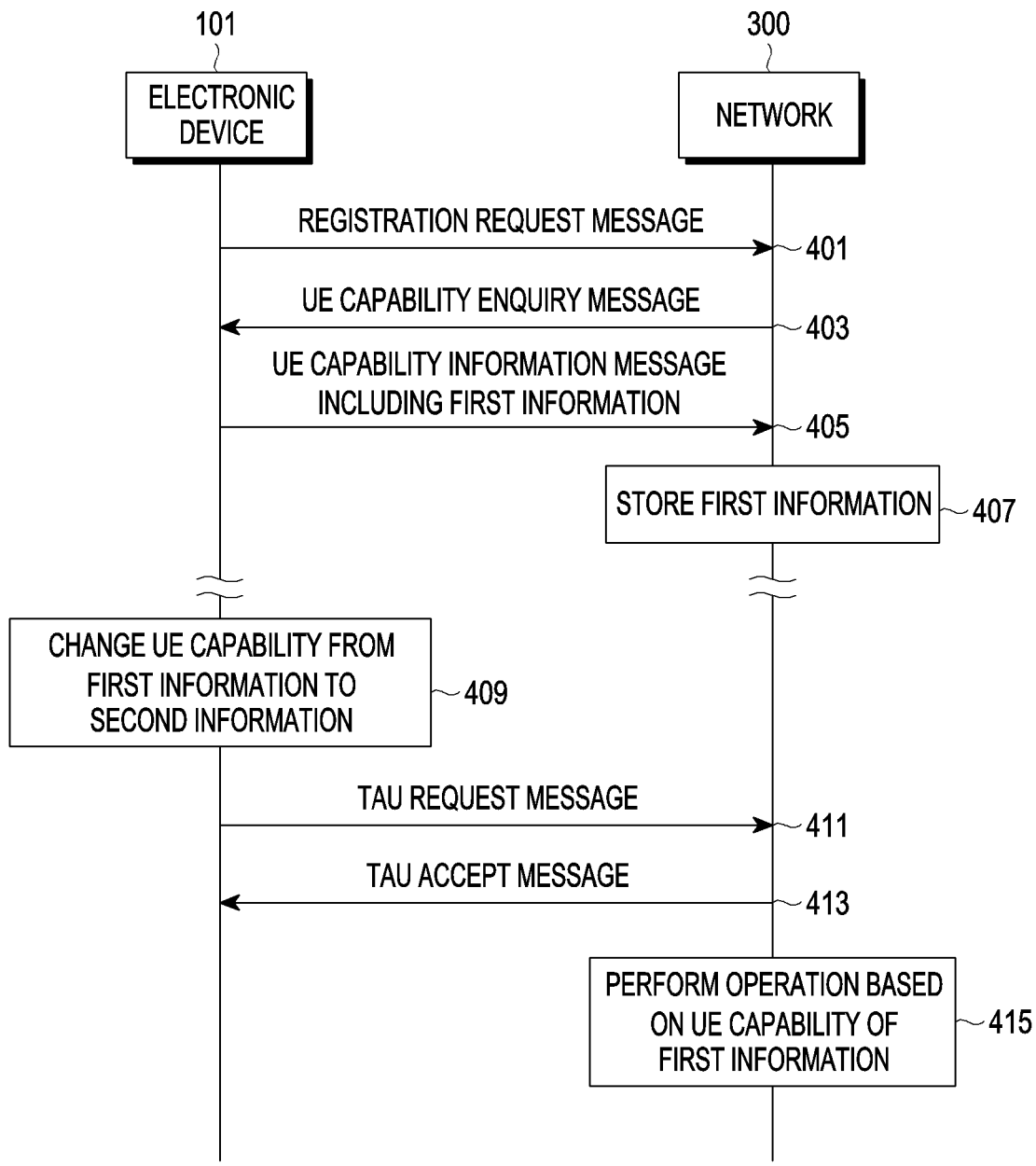
FIG. 4 is a flowchart illustrating operation methods of an electronic device and a network according to a comparative example with various embodiments.

FIG. 4 is a flowchart illustrating operation methods of an electronic device and a network according to a comparative example with various embodiments. At least a part of operations of an electronic device 101 according to a comparative example may be also performed by the electronic device 101 according to various embodiments.

According to the comparative example, the electronic device 101 (e.g., at least one of a processor 120, a first communication processor 212, a second communication processor 214, or an integrated communication processor 260) may transmit a registration request message to a network 300 in operation 401. For example, the electronic device 101 may transmit an attach request message when a registration of an evolved packet core (EPC) is needed, or may transmit a registration request message when a registration of a 5th-generation core (5GC), but the disclosure is not limited thereto. The network 300 may transmit a UE capability enquiry message to the electronic device 101 in operation 403. The electronic device 101 may transmit a UE capability information message including first information to the network 300 in operation 405. The first information may be, for example, at least one information element. In operation 407, the network 300 may store the first information included in the UE capability information message, as a UE capability for the electronic device 101. Accordingly, the network 300 may store and/or manage the UE capability of the electronic device 101 after the registration of the electronic device 101 in a core network. The network 300 may perform resource allocation for the electronic device 101 and/or a control of the electronic device 101, based on the UE capability of the electronic device 101.

According to the comparative example, the electronic device 101 may change the UE capability from the first information to second information in operation 409. For example, the electronic device 101 may change the UE capability when an over-temperature state is detected, but an event configured for the change is not limited and described in greater detail below. In operation 411, the electronic device 101 may transmit a TAU request message including a "UE radio capability information update needed" information element having a "URC upd" field which corresponds to "1", to the network 300. In operation 413, the network 300 may transmit a TAU accept message corresponding to the TAU request message to the electronic device 101. The network 300 may transmit the TAU accept message to the electronic device 101 without performing a UE capability transfer process. For example, in 3GPP, in relation to the UE capability transfer process, when a UE requests a UE capability change, the UE may request necessary NAS procedures from higher layers, and it indicates that a UE capability update is possible using a new RRC connection. However, in 3GPP, it is not mandatorily required for the network 300 to immediately perform the UE capability transfer process in response to the reception of the TAU accept message, and accordingly, depending on the implementation of the network 300, the UE capability transfer process may not be immediately performed. For example, when the electronic device 101 transmits or receives data in the RRC-connected state, the network 300 may suspend the UE capability transfer process, and during the suspension period, the UE capabilities between the electronic device 101 and the network 300 may not be consistent with each other. During the suspension period, the network may not transmit an RRC release message.

In this case, the network 300 cannot identify the change of the UE capability of the electronic device 101 from the first information to the second information. Accordingly, the network 300 may continuously identify the UE capability of the electronic device 101 as the stored first information. The network 300 may perform an operation based on the UE capability of the first information in operation 415. As there is inconsistency in that the UE capability managed by the electronic device 101 is the second information and the UE capability of the electronic device 101, managed by the network 300, is the first information, a problem may be caused in the operation of the network 300. For example, in a case where the electronic device 101 changes the UE capability from the first information to the second information for suppressing overheating in the over-temperature state, when the network 300 operates based on the first information, there is probability that the over-temperature state of the electronic device 101 cannot be solved. For example, the network 300 may maintain the existing bandwidth, command transmission of an SRS, command CA, or command DC, which may cause the over-temperature state to be worse. Alternatively, the network 300 may not perform an operation (for example, handover command, CA command, or SCG additional command) for a band which is not supported any longer by the electronic device 101, based on the first information before the change, and in this case, the electronic device 101 may not perform the corresponding command A problem of the inconsistency between the UE capabilities described above may occur, and thus a prompt synchronization of the UE capabilities between the electronic device 101 and the network 300 may be needed.

Figure 5A:
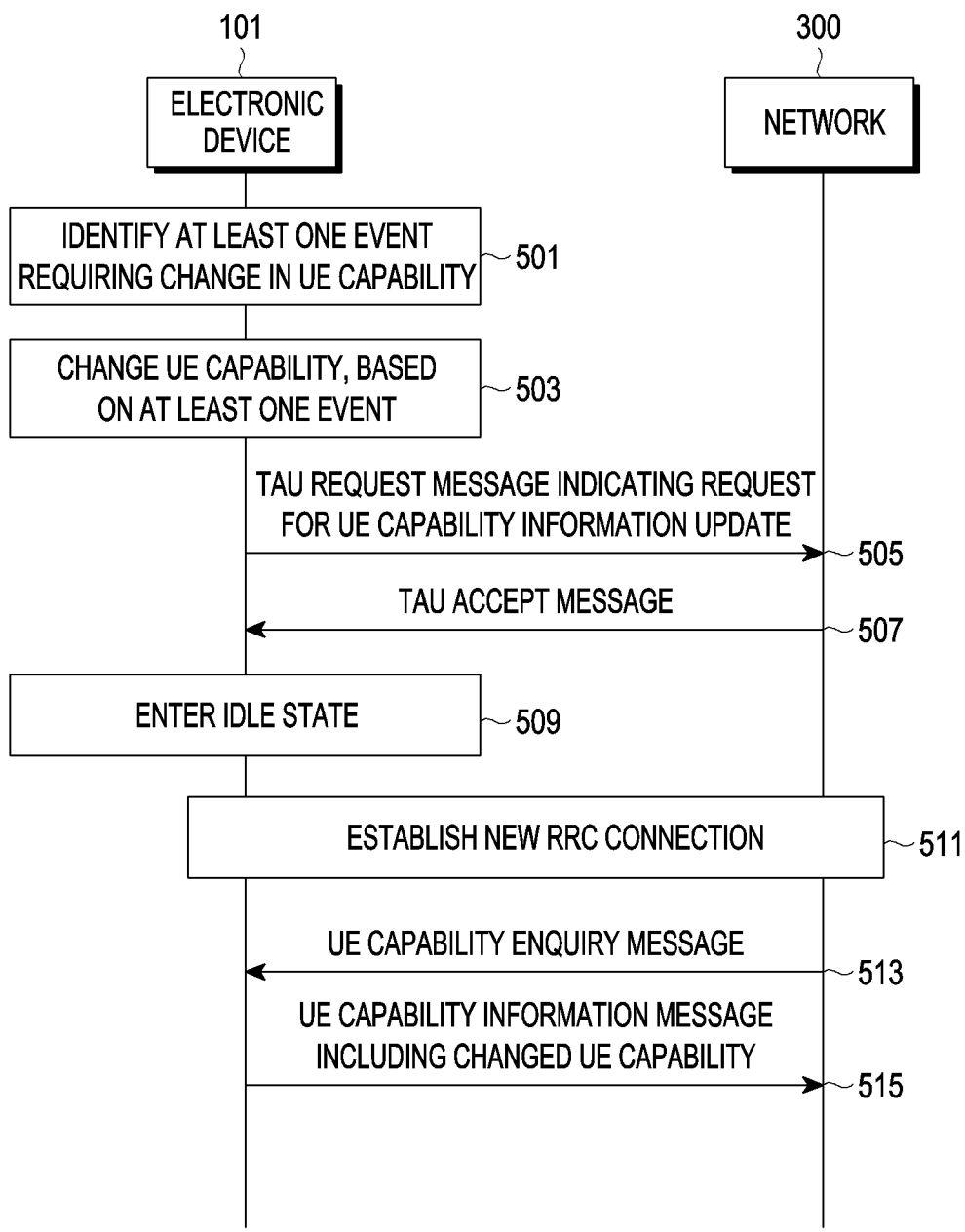
FIG. 5A is a flowchart illustrating operation methods of an electronic device and a network according to various embodiments.

FIG. 5A is a flowchart illustrating an operation method of an electronic device and a network according to various embodiments.

According to various embodiments, in operation 501, an electronic device 101 (for example, at least one of the processor 120, the first communication processor 212, the second communication processor 214, or the integrated communication processor 260) may identify at least one event requiring a change of a UE capability. In an example, the electronic device 101 may identify acquisition of information associated with an overheating state as an event requiring a change of a UE capability. In an example, the electronic device 101 may identify acquisition of information associated with a shortage of a battery capacity as an event requiring a change of a UE capability. The shortage of the battery capacity may be identified, for example, when the battery capacity is equal to or lower than a designated threshold capacity (for example, 15%), but the disclosure is not limited thereto. In an example, the electronic device 101 may identify acquisition of a command for deactivating a specific radio access technology (RAT) (or specific communication) upon a user's manipulation, as an event requiring a change of a UE capability. In an example, the electronic device 101 may identify satisfaction of a condition requiring deactivation of a specific RAT (or specific communication), as an event requiring a change of a UE capability. The condition requiring deactivation of the specific RAT (or specific communication) may include, for example, at least one operation associated with occurrence of cell reselection in a boundary area of a serving cell, failure in a RACH for a specific cell, or a Wi-Fi call, and the description on the condition will be made in greater detail below.

According to various embodiments, in operation 503, the electronic device 101 may change the UE capability, based on the at least one event. In an example, when the occurrence of the at least one event is identified, the electronic device 101 may change an information element configured as default regardless of the type of the at least one event. In this case, a configuration value of the information element may be configured as a fixed value. There is no limitation in a change value and/or the type of an information element to be changed. In another example, when the occurrence of the at least one event is identified, the electronic device 101 may change an information element configured as default regardless of the type of the at least one event, wherein a configuration value (or the level of change) of the information element may be determined based on information on the at least one event. In another example, when the occurrence of the at least one event is identified, the electronic device 101 may also select an information element to be changed, based on the type of the at least one event. In this case, the configuration value of the information element may be configured as a fixed value. In another example, when the occurrence of the at least one event is identified, the electronic device 101 may select an information element to be changed, based on the type of the at least one event, or may determine a configuration value (or the level of change) of the information element, based on information of the at least one event. It is illustrated that the operation (for example, operation 503) of changing the UE capability by the electronic device 101 is performed after the operation (for example, operation 501) of identifying the event and before other operations, but the illustration is a mere example and there is no limitation in a time point at which a UE capability change operation is performed.

According to various embodiments, in operation 505, the electronic device 101 may transmit a TAU request message indicating that updating of UE capability information is requested, to a network 300. For example, the electronic device 101 may transmit a TAU request message including a "UE radio capability information update needed" information element having a "URC upd" field which corresponds to "1", to the network 300. In operation 507, the network 300 may transmit a TAU accept message corresponding to the TAU request message to the electronic device 101. The network 300 may transmit the TAU accept message to the electronic device 101 without performing a process of transferring a UE capability.

According to various embodiments, in operation 509, the electronic device 101 may enter an idle state, based on the reception of the TAU accept message in a state in which no UE capability enquiry message is received. The reception of the TAU accept message in the state in which no UE capability enquiry message is received may refer, for example, to suspension of a procedure of transferring the UE capability by the network 300, and the electronic device 101 may enter the idle state to promptly perform the procedure of transferring the UE capability. In an embodiment, the electronic device 101 may enter the idle state, based on failure in reception of a UE capability enquiry message until a designated threshold time passes after transmission of the TAU request message, wherein there is no limitation in a condition for entering the idle state if any condition is related to a case in which no UE capability enquiry message is received and a UE capability information message has failed to be transmitted. The entering the idle state by the electronic device 101 may be represented as, but is not limited to, for example, performing a local release of an RRC connection, or declaration of radio link failure (RLF). In operation 511, the electronic device 101 may establish a new RRC connection with the network 300 in the idle state. For example, the electronic device 101 may not perform RRC re-establishment, based on the local release of the RRC connection or the declaration of the RLF, and may perform at least one operation for establishment of a new RRC connection. For example, the electronic device 101 may transmit an RRC connection request message (for example, an RRC connection request message of E-UTRA or an RRC setup request message of NR) to the network 300, based on the reception of the TAU accept message in the state in which no UE capability enquiry message is received. The electronic device 101 may receive an RRC connection setup message (for example, an RRC connection setup message of E-UTRA or an RRC setup message of NR) corresponding to the RRC connection request message from the network 300. The electronic device 101 may transmit an RRC connection setup complete message (for example, an RRC connection setup complete message of E-UTRA or an RRC setup complete message of NR) corresponding to the RRC connection setup message to the network 300. According to the procedure above, a new RRC connection may be established between electronic device 101 and the network 300 without re-establishing the existing RRC connection.

According to various embodiments, in operation 513, the electronic device 101 may receive a UE capability enquiry message from the network 300. Since the new RRC connection is established, the network 300 may transmit a UE capability enquiry message. The electronic device 101 may transmit a UE capability information message including the UE capability changed in operation 515, to the network 300, based on the reception of the UE capability enquiry message. The network 300 may store and/or manage the changed UE capability. According to the description above, transferring of the UE capability can be immediately performed in substance without a suspension period, and thus, a probability of having a problem due to inconsistency of the UE capabilities between the electronic device 101 and the network 300 can be reduced. A time taken to establish a new RRC connection can be relatively short. Accordingly, a data packet generated during the connection establishment time can be processed even through only an operation of retransmission via a higher layer, and thus a probability that a service is affected can be low.

Figure 5B:
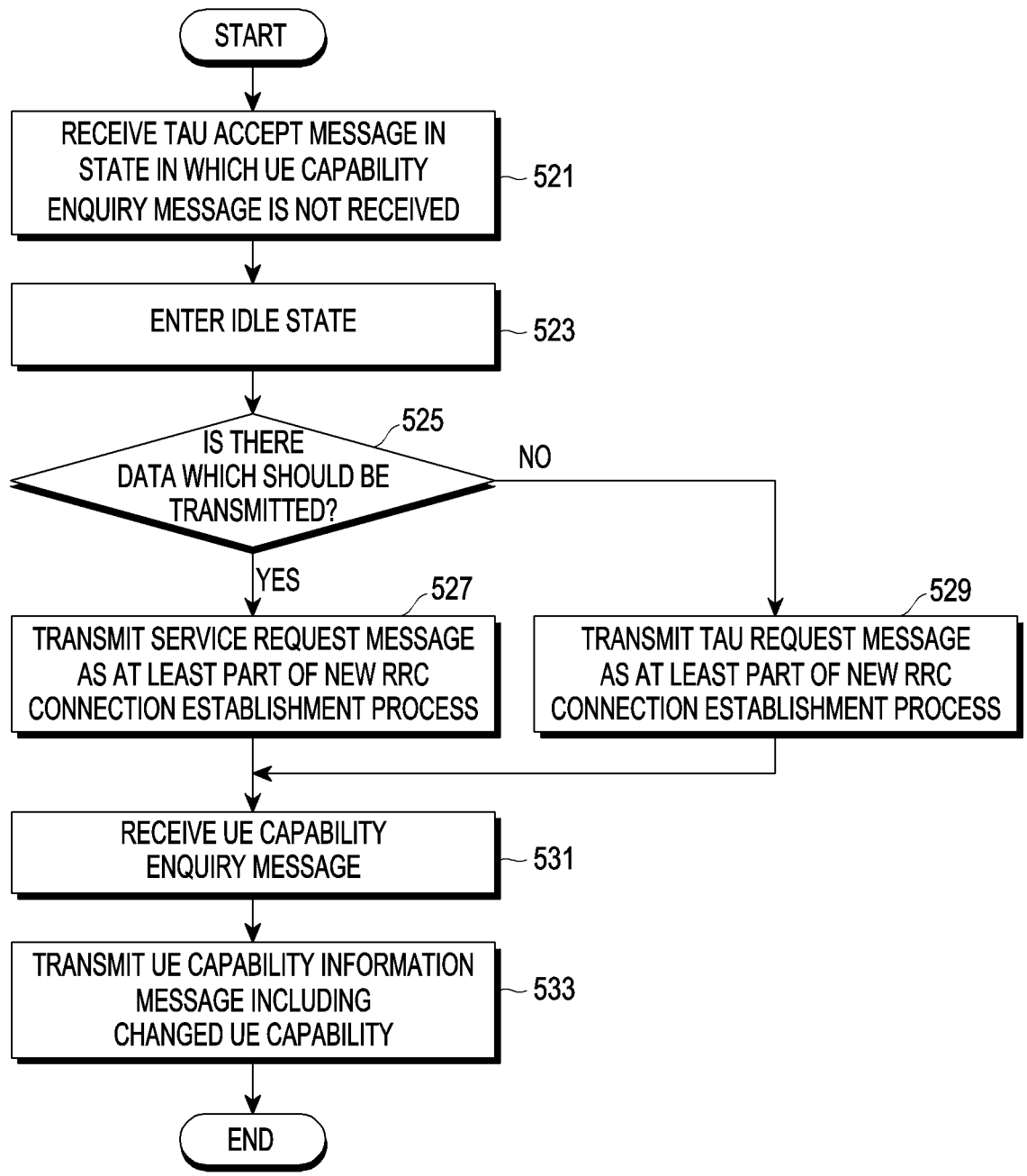
FIG. 5B is a flowchart illustrating an operation method of an electronic device according to various embodiments.

FIG. 5B is a flowchart illustrating an operation method of an electronic device according to various embodiments.

According to various embodiments, in operation 521, an electronic device 101 (for example, at least one of the processor 120, the first communication processor 212, the second communication processor 214, or the integrated communication processor 260) may receive a TAU accept message in a state in which no UE capability enquiry message is received. For example, as described in FIG. 5A, the electronic device 101 may change a UE capability and transmit a TAU request message indicating that updating of UE capability information is requested. After the transmission of the TAU, the electronic device 101 may receive, in operation 521, the TAU accept message in a state in which the electronic device 101 has failed to receive the UE capability enquiry message. As described in FIG. 5A, the electronic device 101 may enter an idle state in operation 523, based on the reception of the TAU accept message in a state in which no UE capability enquiry message is received. As described above, those skilled in the art would understand that a trigger for entering the idle state in the embodiment or other embodiments can be substituted to a satisfaction of another condition (for example, failure in receiving a UE capability enquiry message within a preconfigured period).

According to various embodiments, in operation 525, the electronic device 101 may determine whether data to be transmitted exists in a network 300. If the data to be transmitted exists (if "Yes" in operation 525), the electronic device 101 may transmit, in operation 527, a service request message to the network 300 as at least a part of a new RRC connection establishment process. For example, the electronic device 101 may transmit an RRC connection request message to the network 300, and receive an RRC connection setup message from the network 300. The electronic device 101 may transmit an RRC connection setup complete message including the service request message to the network 300. The network 300 may allocate a radio resource and/or a network resource, based on the reception of the service request message, and may transmit or receive data (or traffic) later. Upon the transmission of the RRC connection setup complete message including the service request message, data may be transmitted.

According to various embodiments, if the data to be transmitted does not exist (if "No" in operation 525), the electronic device 101 may transmit, in operation 529, a TAU request message to the network 300 as at least a part of a new RRC connection establishment process. For example, the electronic device 101 may transmit an RRC connection request message to the network 300 and receive an RRC connection setup message from the network 300. The electronic device 101 may transmit an RRC connection setup complete message including the TAU request message to the network 300. The electronic device 101 may receive a UE capability enquiry message from the network 300 in operation 531. The electronic device 101 may transmit a UE capability information message including the changed UE capability to the network 300 in operation 533. Accordingly, the changed UE capability can be shared with the network 300.

Figure 5C:
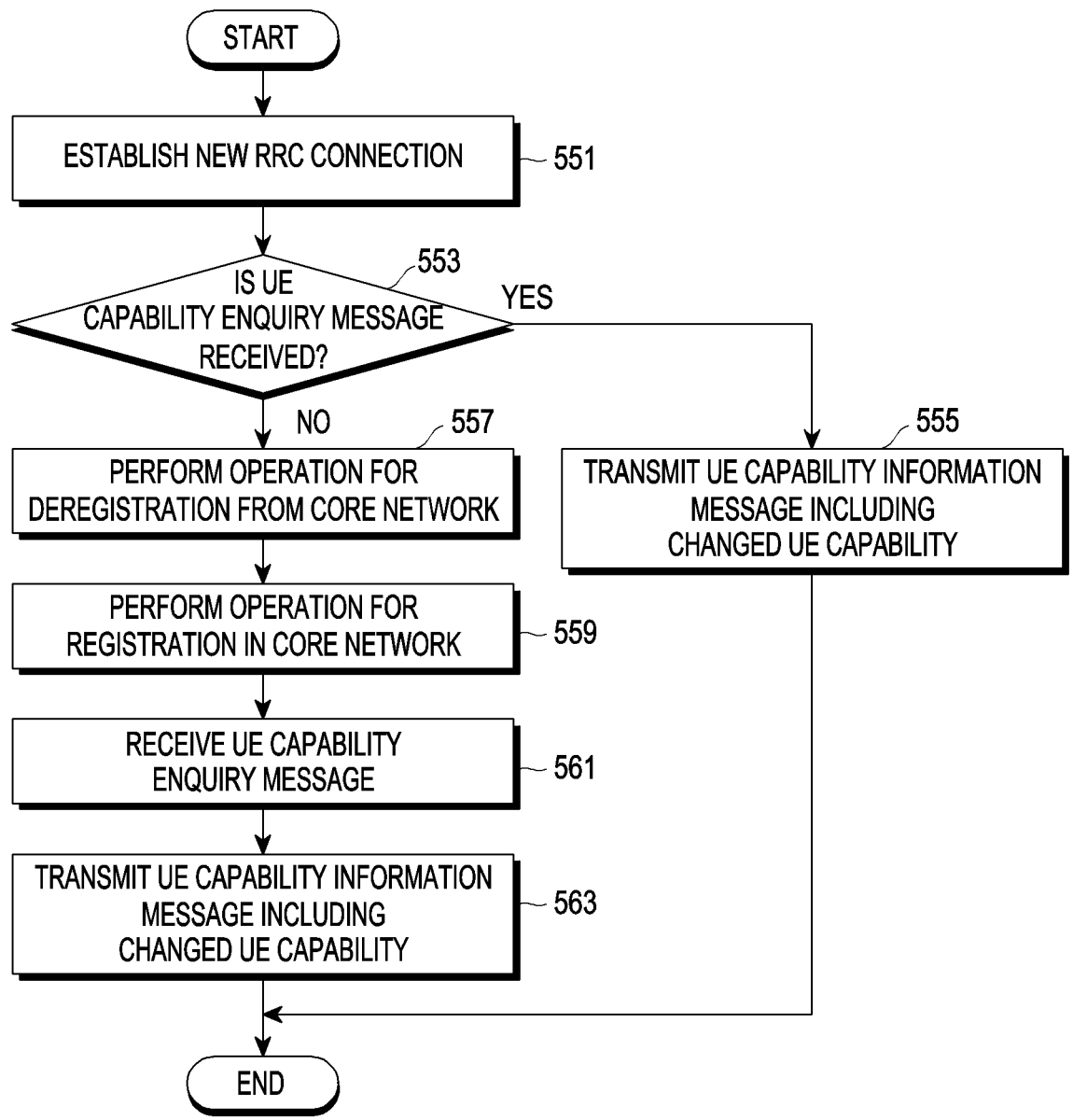
FIG. 5C is a flowchart illustrating an operation method of an electronic device according to various embodiments.

FIG. 5C is a flowchart illustrating an operation method of an electronic device according to various embodiments.

According to various embodiments, the electronic device 101 (for example, at least one of the processor 120, the first communication processor 212, the second communication processor 214, or the integrated communication processor 260) may establish a new RRC connection in operation 551. As described in FIG. 5A, the electronic device 101 may enter an idle state, based on reception of a TAU accept message in a state in which no UE capability enquiry message is received. The electronic device 101 may perform at least one operation for establishment of the new RRC connection in the idle state. Accordingly, the new RRC connection may be established between the electronic device 101 and the network 300. In FIG. 5A, it is illustrated that the transferring of the UE capability is performed after the establishment of the new RRC connection, but according to implementation of the network 300, the transferring of the UE capability may not be performed even after the new RRC connection.

According to various embodiments, the electronic device 101 may determine, in operation 553, whether a UE capability enquiry message is received from the network 300. If the UE capability enquiry message is received (if "Yes" in operation 553), the electronic device 101 may transmit, to the network 300, a UE capability information message including the changed UE capability in operation 555. This may correspond to the UE capability transferring process based on the new RRC connection, described in FIG. 5A. The failure in receiving the UE capability enquiry message may refer, for example, to failure in transferring the UE capability. If the UE capability enquiry message has failed to be received (if "No" in operation 553), the electronic device 101 may perform an operation of a deregistration from a core network in operation 557. For example, the electronic device 101 may perform an operation for deregistration of a core network, based on the failure of the UE capability enquiry message for a designated period. The electronic device 101 may perform an operation of deregistration from a core network, based on identification of another event (for example, reception of another type of message from the network 300) in a state in which no UE capability enquiry message is received, and there is no limitation in a reference for determining non-reception of the UE capability enquiry message. The electronic device 101 may transmit a message for deregistration (for example, a detach request message for EPC, or a deregistration request message for 5GC) to the network 300 as an operation for deregistration from a core network. The network 300 may deregister the electronic device 101, based on the reception of the message for deregistration. For example, the network 300 may delete information (for example, UE context) associated with the electronic device 101. The network 300 may transmit a message for accepting deregistration (for example, a detach accept message for EPC or a deregistration accept message for 5GC) to the electronic device 101.

According to various embodiments, the electronic device 101 may perform an operation for registration from a core network in operation 559 after the deregistration. For example, the electronic device 101 may transmit a registration request message (for example, an attach request message for EPC or a registration request message for 5GC), and in response to the registration request message, receive a registration accept message (for example, an attach accept message for EPC or a registration accept message for 5GC) from the network 300. The network 300 has deleted all the UE context for the electronic device 101, and thus, a UE capability may be needed. The electronic device 101 may receive a UE capability enquiry message from the network 300 in operation 561. In response to the UE capability enquiry message, the electronic device 101 may transmit a UE capability information message including the changed UE capability to the network 300 in operation 563. Accordingly, when the UE capability has not updated even after the establishment of the new RRC connection, the UE capabilities between electronic device 101 and the network 300 may be also synchronized.

Figure 5D:
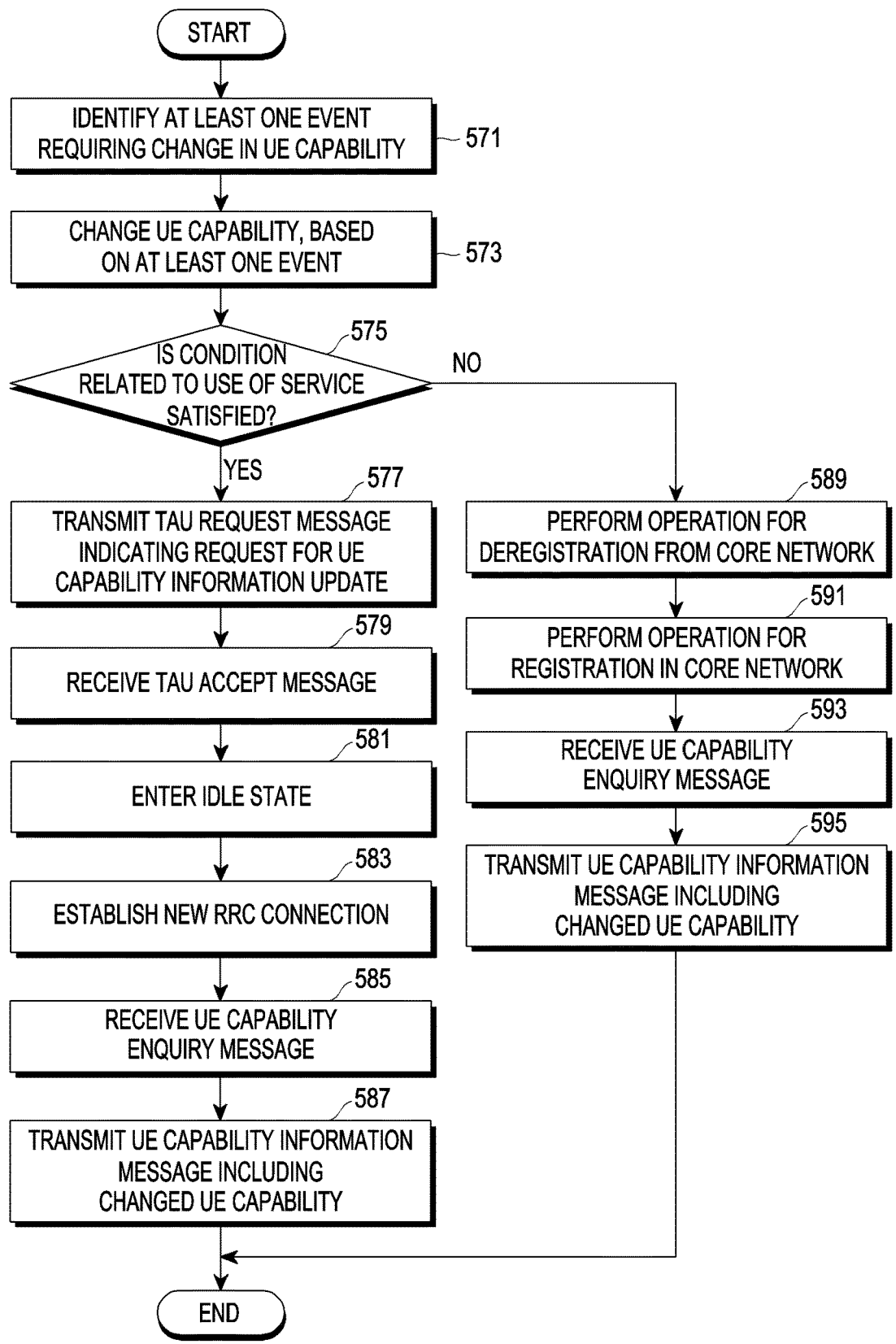
FIG. 5D is a flowchart illustrating an operation method of an electronic device according to various embodiments.

FIG. 5D is a flowchart illustrating an operation method of an electronic device according to various embodiments.

According to various embodiments, in operation 571, the electronic device 101 (for example, at least one of the processor 120, the first communication processor 212, the second communication processor 214, or the integrated communication processor 260) may identify at least one event requiring a change of a UE capability. In operation 573, the electronic device 101 may change the UE capability, based on the at least one event. The identification of the event and the change of the UE capability are described in FIG. 5A, and thus, the detailed description thereof will be omitted.

According to various embodiments, in operation 575, the electronic device 101 may determine whether a condition associated with service use is satisfied. For example, the electronic device 101 may determine whether a condition associated with the service use is satisfied, based on whether a TCP/UDP connection is established. There is no limitation in the condition associated with the service use if the condition is for determining whether the electronic device 101 uses and/or is to use a current service (for example, transmission or reception of user data). For example, the electronic device 101 may determine, based on the number of connections established based on TCP/UDP, that the service is in use when the number satisfies a designated condition (for example, when the number is equal to or greater than 1). For example, the electronic device 101 may determine that the service in use when the number of established PDU sessions satisfies a designated condition (for example, when the number is equal to or greater than 1). If the condition associated with the service is satisfied (if "Yes" in operation 575), the electronic device 101 may transmit, in operation 577, a TAU request message indicating that updating of UE capability information is requested. In operation 579, the electronic device 101 may receive a TAU accept message in a state in which no UE capability enquiry message is received. As described in FIG. 5A, the electronic device 101 may enter an idle state in operation 581, based on reception of the TAU accept message in the state in which no UE capability enquiry message is received. In operation 583, the electronic device 101 may perform at least one operation for establishing a new RRC connection in the idle state in operation 583. When the new RRC connection is established, the electronic device 101 may receive a UE capability enquiry message in operation 585. In operation 587, the electronic device 101 may transmit a UE capability information message including the changed UE capability to the network 300. As described above, a processing time of a procedure of establishing the new RRC connection may be shorter than that of the procedure of performing deregistration or registration of a core network. When the current service is in use or is planned to be used, the electronic device 101 may establish a new RRC connection to perform a UE capability transferring procedure.

According to various embodiments, if the condition associated with the service use is not satisfied (if "No" in operation 575), the electronic device 101 may perform an operation for deregistration from the core network in operation 589. In operation 591, the electronic device 101 may perform an operation for registration of the core network. The operation for deregistration and registration of the core network is described in FIG. 5C, and thus, the detailed description thereof will be omitted. In operation 593, the electronic device 101 may receive a UE capability enquiry message from the network 300. As described above, the deregistration of the core network has been performed, and thus, the network 300 may need to inquire of the electronic device 101 about the UE capability. In operation 595, the electronic device 101 may transmit the UE capability information message including the changed UE capability to the network 300, based on the reception of the UE capability enquiry message. When the service is not in use or is not planned to be used, a procedure of deregistration and registration of a core network having a higher possibility of performing the UE capability transferring procedure even though a relatively longer time is taken may be performed.

Figure 6:
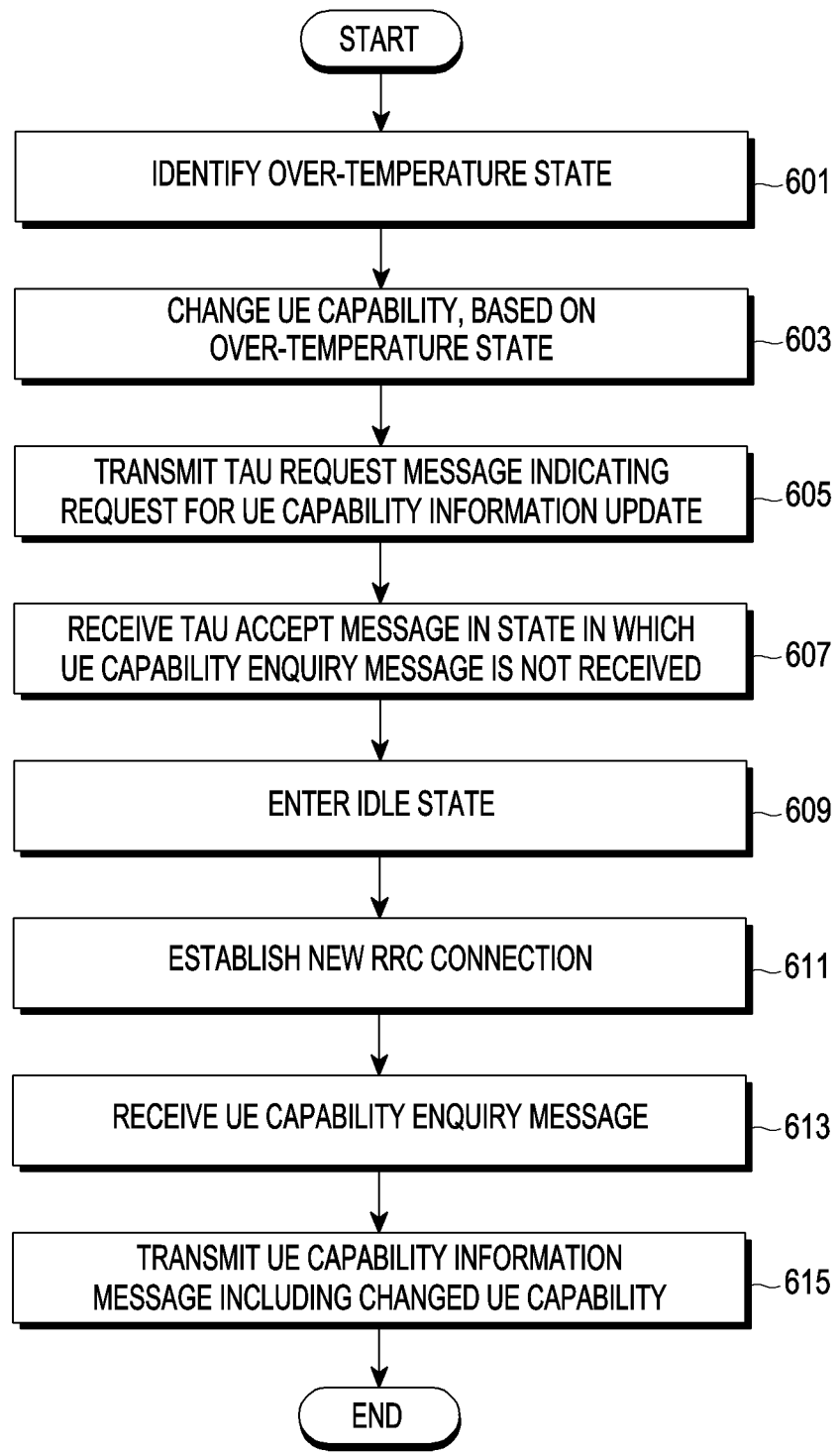
FIG. 6 is a flowchart illustrating an operation method of an electronic device according to various embodiments.

FIG. 6 is a flowchart illustrating an operation method of an electronic device according to various embodiments.

According to various embodiments, in operation 601, the electronic device 101 (for example, at least one of the processor 120, the first communication processor 212, the second communication processor 214, or the integrated communication processor 260) may identify an over-temperature state. For example, the electronic device 101 may include a sensor module 176 for measuring a temperature of the inside (or the surface) of the electronic device 101. The electronic device 101 may identify an indication of an overtemperature indicating that the measured temperature is equal to or higher than a threshold temperature, as the over-temperature state, and the description thereof is described with reference to FIG. 7A. The electronic device 101 may operate based on the measured temperature, and the description thereof is described in greater detail below with reference to FIG. 7B. For example, when the electronic device 101 executes an application (for example, a game application or a streaming application) requiring transmission or reception of massive data, the over-temperature state may occur.

According to various embodiments, in operation 603, the electronic device 101 may change a UE capability, based on the over-temperature state. In an example, the electronic device 101 may change an information element associated with carrier aggregation (CA) and/or an information element associated with dual connectivity (DC) of the UE capability. For example, the electronic device 101 may change the number of CCs of the CA (for example, change five CCs to two CCs) or deactivate the CA, based on the change of an item of supported Band Combination List of rf-Parameter included in a specific RAT (for example, NR) of UE- Capability RAT-Container of the UE capability. For example, the electronic device 101 may deactivate the DC, based on the change of an item of supported Band Combination List of rf-Parameter of UE-MRDC-Capability receive an INVITE message through the included in a specific RAT (for example, NR-EUTRA) of UE-Capability RAT-Container of the UE capability. Those skilled in the art would understand that the change of the information element or information elements in various embodiments corresponds to a mere example. Accordingly, the electronic device 101 may enter an idle state, based on failure in transferring the UE capability, wherein the information element of the UE capability information message transmitted in response to the UE capability enquiry message received based on the new RRC connection established in the idle state may differ from an information element previously reported to the network 300. The amount of heat generated in the electronic device 101 when the CA and/or the DC is performed may be greater than the amount of heat generated in the electronic device 101 when the CA and/or the DC is not performed. The electronic device 101 may deactivate the CA and/or the DC in the over-temperature state, and accordingly, there is a higher possibility of releasing the over-temperature state. When the CA is performed, as the CA is performed based on a relatively larger number of CCs, the amount of heat generated in the electronic device 101 may be relatively large. The electronic device 101 may adjust the number of CCs used for the CA to have a relatively smaller number of CCs in the over-temperature state, and accordingly, there is a higher possibility of releasing the over-temperature state.

In an embodiment, the electronic device 101 may change an information element associated with a layer. For example, the electronic device 101 may change at least one of maxNumberMIMO-LayersPDSCH of FeatureSetDownlinkPerCC, maxNumberMIMO-LayersCB-PUSCH of FeatureSetUplinkPerCC, or maxNumberMIMO-LayersNonCB-PUSCH of FeatureSetUplinkPerCC of the UE capability (for example, four layers to two layers). As communication is performed based on a relatively larger number of layers, the amount of heat generated in the electronic device 101 may be relatively large. The electronic device 101 may adjust the number of layers to have a relatively smaller number of layers in the over-temperature state, and accordingly, there is a higher possibility of releasing the over-temperature state.

For example, the electronic device 101 may change an information element associated with a bandwidth. For example, the electronic device 101 may change at least one of SupportedBandwidthDL and/or ChannelBW-90 mhz of FeatureSetDownlinkPerCC, or SupportedBandwidthUL and/or ChannelBW-90 mhz FeatureSetUplinkPerCC of the UE capability. As communication is performed based on a relatively larger bandwidth, the amount of heat generated in the electronic device 101 may be relatively large. The electronic device 101 may adjust the bandwidth part to have a relatively lower bandwidth in the over-temperature state, and accordingly, there is a higher possibility of releasing the over-temperature state. For example, the electronic device 101 may reduce information (for example, a bandwidth value) of SupportedBandwidthDL and/or SupportedBandwidthUL, and/or deactivate ChannelBW-90 mhz. In an example, the electronic device 101 may reduce the bandwidth to an initial carrier bandwidth, and this is a mere example, and there is no limitation in a value of the bandwidth part after the reduction. For example, the electronic device 101 may reduce the bandwidth to the initial carrier bandwidth (or another value) when the initial carrier bandwidth is equal to or higher than a threshold bandwidth (for example, 10 MHz or 20 MHz), and may change the bandwidth to a designated value (for example 10 MHz) when the initial carrier bandwidth is lower than the threshold bandwidth.

For example, the electronic device 101 may change an information element associated with a modulation and coding scheme (MCS). As communication is performed based on a relatively larger number of MCSs, the amount of heat generated in the electronic device 101 may be relatively large. For example, the electronic device 101 may reduce (for example, qam 256 to qam 64) at least one of supportedModulationOrderDL of FeatureSetDownlinkPerCC or supportedModulationOrderUL of FeatureSetUplinkPerCC of the UE capability. The electronic device 101 may adjust the number of MCSs to have a relatively smaller number of MCSs in the over-temperature state, and accordingly, there is a higher possibility of releasing the over-temperature state.

For example, the electronic device 101 may change an information element associated with a sounding reference signal (SRS). For example, the electronic device 101 may change srs-TxSwitch Parameter of BandCombinationList of the UE capability to "not supported". The amount of heat generated in the electronic device 101 when the SRS transmission is performed may be larger than the amount of heat generated in the electronic device 101 when the SRS transmission is not performed. The electronic device 101 may deactivate the SRS transmission in the over-temperature state, and accordingly, there is a higher possibility of releasing the over-temperature state.

For example, the electronic device 101 may change an information element associated with a supported radio access technology (RAT) and/or communication system. For example, NR may be deleted from UE-capabilityRAT-container of the UE capability. The amount of heat generated in the electronic device 101 when a specific RAT is activated may be larger than the amount of heat generated in the electronic device 101 when another RAT is activated. The electronic device 101 may deactivate the specific RAT in the over-temperature state, and accordingly, there is a higher possibility of releasing the over-temperature state.

According to various embodiments, in operation 605, the electronic device 101 may transmit a TAU request message indicating that updating of the UE capability information is requested. In operation 607, the electronic device 101 may receive a TAU accept message in a state in which no UE capability enquiry message is received. The electronic device 101 may enter an idle state in operation 609, based on the reception of the TAU accept message in the state in which no UE capability enquiry message is received. The electronic device 101 may establish a new RRC connection in operation 611 in the idle state. In operation 613, the electronic device 101 may receive a UE capability enquiry message, based on the new RRC connection. In operation 615, the electronic device 101 may transmit the UE capability information message including the changed UE capability, based on the UE capability enquiry message.

Figure 7A:
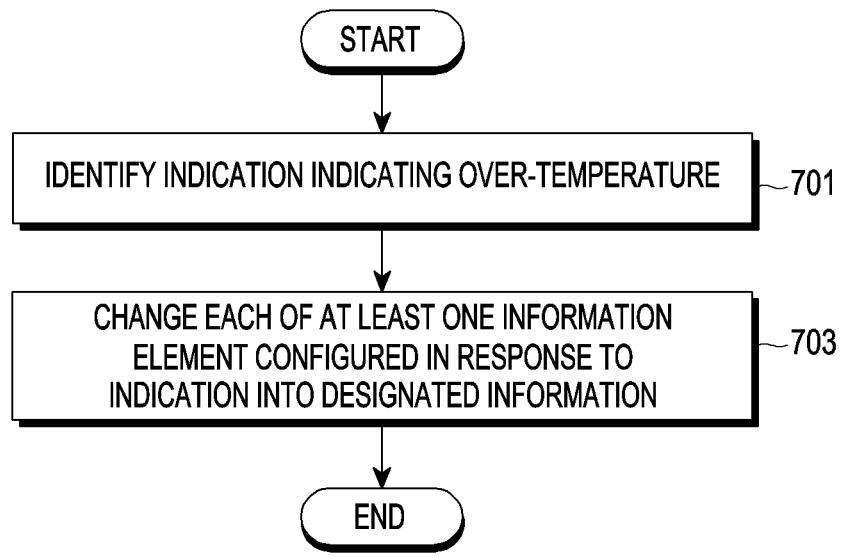
FIG. 7A is a flowchart illustrating an operation method of an electronic device according to various embodiments.

FIG. 7A is a flowchart illustrating an operation method of an electronic device according to various embodiments.

According to various embodiments, in operation 701, the electronic device 101 (for example, at least one of the first communication processor 212, the second communication processor 214, or the integrated communication processor 260) may identify an indication indicating an overtemperature. For example, the processor 120 may acquire temperature information from the sensor module 176. For example, the processor 120 may determine whether the acquired temperature information is equal to or greater than a designated threshold temperature (for example, 43° C.). When the acquired temperature information is equal to or greater than the designated threshold temperature, the processor 120 may provide an indication indicating the overtemperature to a communication processor (for example, at least one of the first communication processor 212, the second communication processor 214, or the integrated communication processor 260). In another implementation example, the communication processor (for example, at least one of the first communication processor 212, the second communication processor 214, or the integrated communication processor 260) may directly acquire temperature information from the sensor module 176. In this case, the communication processor (for example, at least one of the first communication processor 212, the second communication processor 214, or the integrated communication processor 260) may determine whether the acquired temperature information is equal to or greater than the designated threshold temperature.

Based on the acquisition of the indication (or based on the acquired temperature information being equal to or greater than the designated threshold temperature), the electronic device 101 may change each of at least one information element configured in response to the indication to designated information in operation 703. At least one of an information element associated with deactivation of the CA and/or the DC, an information element associated with reduction in the number of CCs of the CA, an information element associated with reduction in the bandwidth, an information element associated with reduction in the number of layers, an information element associated with reduction in the number of MCSs, an information element associated with deactivation of SRS transmission antenna switching, or an information element associated with deactivation of a specific RAT may be pre-configured as an information element to be changed in response to the indication indicating the overtemperature. In an example, when the over-temperature indication is identified, the electronic device 101 may deactivate the CA and/or the DC, reduce the bandwidth (for example, change to 20 MHz), change the number of layers to 2, change the number of MCSs to a number corresponding to 64 QAM, and deactivate SRS transmission, so as to change the UE capability, but there is no limitation in an information element of an object to be changed and information corresponding to the corresponding information element.

Figure 7B:
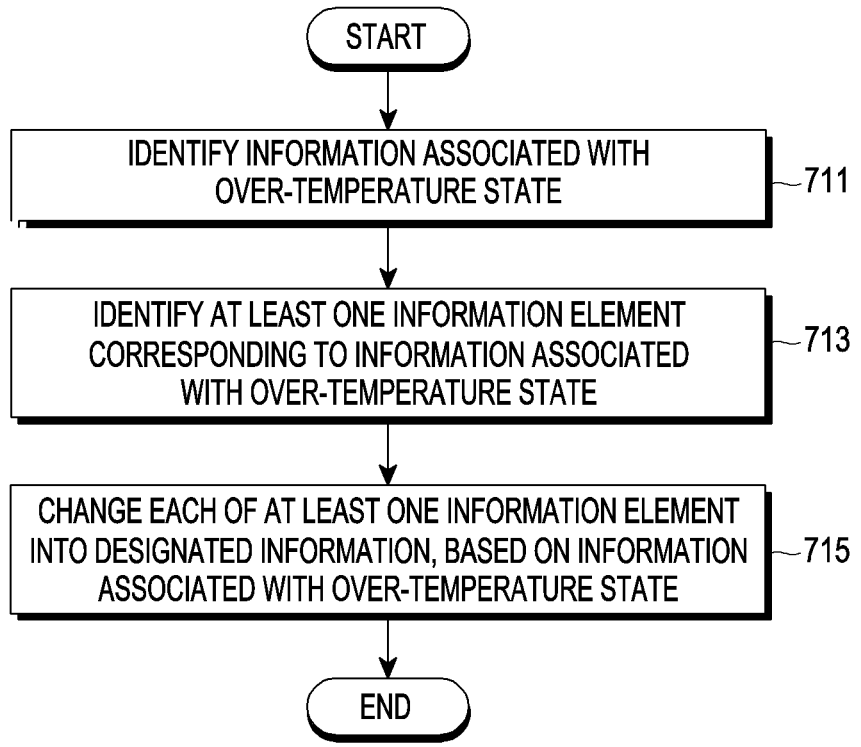
FIG. 7B is a flowchart illustrating an operation method of an electronic device according to various embodiments.

FIG. 7B is a flowchart illustrating an operation method of an electronic device according to various embodiments.

According to various embodiments, in operation 711, the electronic device 101 (for example, at least one of the processor 120, the first communication processor 212, the second communication processor 214, or the integrated communication processor 260) may identify information associated with an over-temperature state. For example, the electronic device 101 may manage multiple temperature ranges. The electronic device 101 may identify a temperature range including the measured temperature, as the information associated with the over-temperature state.

According to various embodiments, in operation 713, the electronic device 101 may identify at least one information element corresponding to the information associated with the over-temperature state. In operation 715, the electronic device 101 may change each of at least one information element to designated information (or a designated level), based on the information associated with the over-temperature state. For example, the electronic device 101 may identify at least one information element of an object to be changed, based on the temperature range including the measured temperature. For example, the electronic device 101 may identify information of the information element of the object to be changed, based on the temperature range including the measured temperature. In an example, the electronic device 101 may change a relatively smaller number of information elements when the over-temperature state in a relatively lower temperature range is identified, and may change a relatively larger number of information elements when the over-temperature state in a relatively higher temperature range is identified. For example, the electronic device 101 may deactivate the CA and the DC when the temperature range of 40° C. to 50° C. is identified, may deactivate SRS transmission antenna switching while deactivating the CA and the DC when the temperature range of 50° C. to 60° C. is identified, and may deactivate the CA and the DC, reduce the bandwidth, and deactivate the SRS transmission antenna switching when the temperature range of 60° C. to 70° C. is identified, but the above-described information element of the object to be changed is a mere example. In an example, the electronic device 101 may change information on a specific information element to a value configured for a relatively higher quality when the over-temperature state in a relatively lower temperature range is identified, and may change information on a specific information element to a value configured for a relatively lower quality when the over-temperature state in a relatively higher temperature range is identified. For example, the electronic device 101 may configure the number of layers as 4 when the temperature range of 40° C. to 50° C. is identified, and configure the number of layers as 2 when the temperature range of 50° C. to 60° C. is identified, but the above-mentioned numerical value is a mere example.

In the embodiment above, it is illustrated that information of the specific information element corresponds to the specific temperature range, but it is illustrative. The electronic device 101 according to various embodiments may be implemented to reduce information of a specific information element of a current UE capability when the over-temperature state is identified. For example, when the over-temperature state is identified, the electronic device 101 may reduce the bandwidth to 10 MHz when the bandwidth of the current UE capability is 20 MHz, and may reduce the bandwidth to 20 MHz when the bandwidth of the current UE capability is 40 MHz. For example, even though the same temperature is measured, information after the change may be different according to the current UE capability.

Figure 7C:
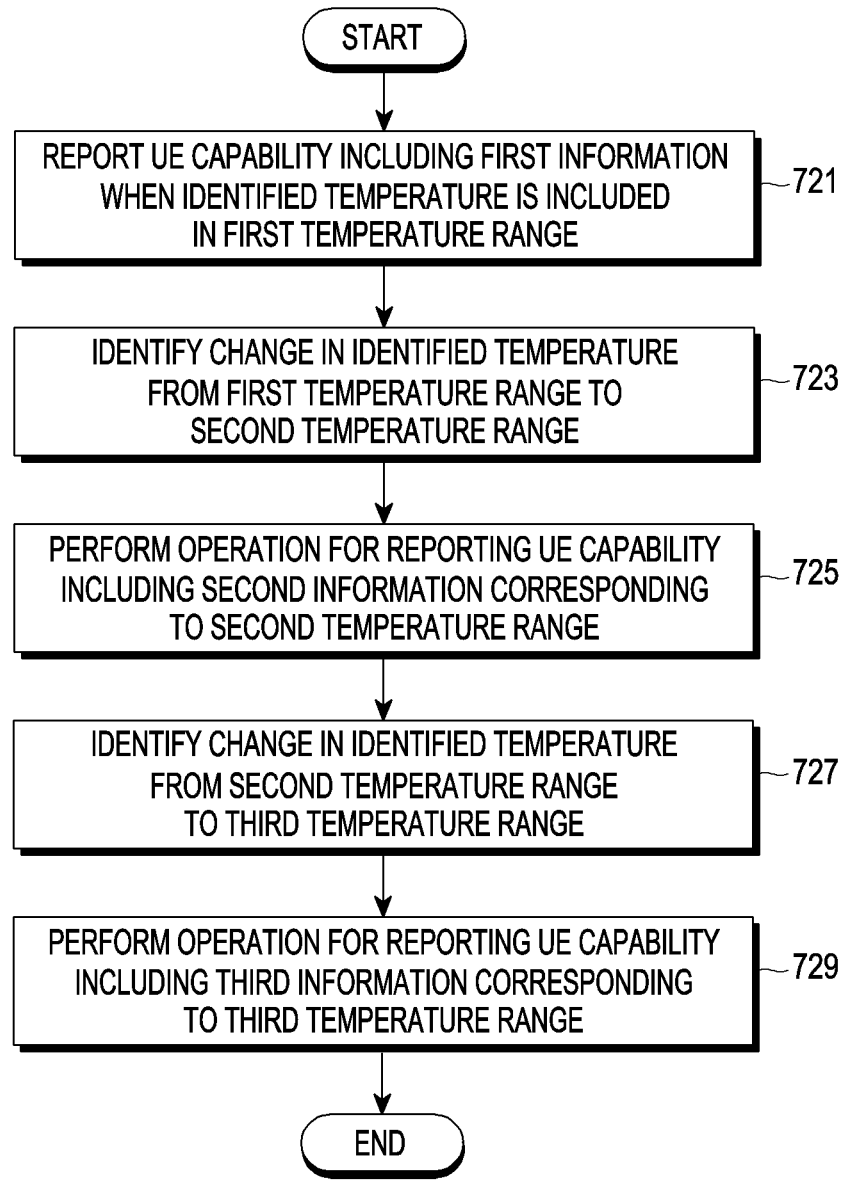
FIG. 7C is a flowchart illustrating an operation method of an electronic device according to various embodiments.

FIG. 7C is a flowchart illustrating an operation method of an electronic device according to various embodiments.

According to various embodiments, in operation 721, the electronic device 101 (for example, at least one of the processor 120, the first communication processor 212, the second communication processor 214, or the integrated communication processor 260 may report a UE capability including first information to the network 300 when the temperature identified by the sensor module 176 of the electronic device 101 is included in a first temperature range. In operation 723, the electronic device 101 may identify that the temperature identified by the sensor module 176 is changed from the first temperature range to a second temperature range. For example, the first temperature range may be higher than the second temperature range, but may be lower than the second temperature range. In operation 725, the electronic device 101 may perform an operation of reporting a UE capability including second information corresponding to the second temperature range (for example, at least a part of operations of FIGS. 5A to 5D). In an example, the electronic device 101 may configure the second information, based on an information element configured in response to the second information and/or information of the information element. The operation of reporting the UE capability including the second information may be performed, for example, by at least a part of FIGS. 5A to 5D. In another example, the electronic device 101 may identify the second information as the level of change of information corresponding to the second temperature range is applied to the first information.

According to various embodiments, in operation 727, the electronic device 101 may identify that the temperature identified by the sensor module 176 is changed from the second temperature range to a third temperature range. For example, the second temperature range may be higher than the third temperature range, but may be lower than the third temperature range. In operation 729, the electronic device 101 may perform an operation of reporting the UE capability including third information corresponding to the third temperature range. In an example, the electronic device 101 may configure the third information, based on an information element configured in response to the third information and/or information of the information element. The operation of reporting the UE capability including the third information may be performed, for example, by at least a part of FIGS. 5A to 5D. In another example, the electronic device 101 may identify the third information as the level of change of information corresponding to the third temperature range is applied to the second information. As described above, the electronic device 101 may perform additional UE capability change and report the same to the network 300 after changing a UE capability and reporting the same to the network 300 once.

Figure 8:
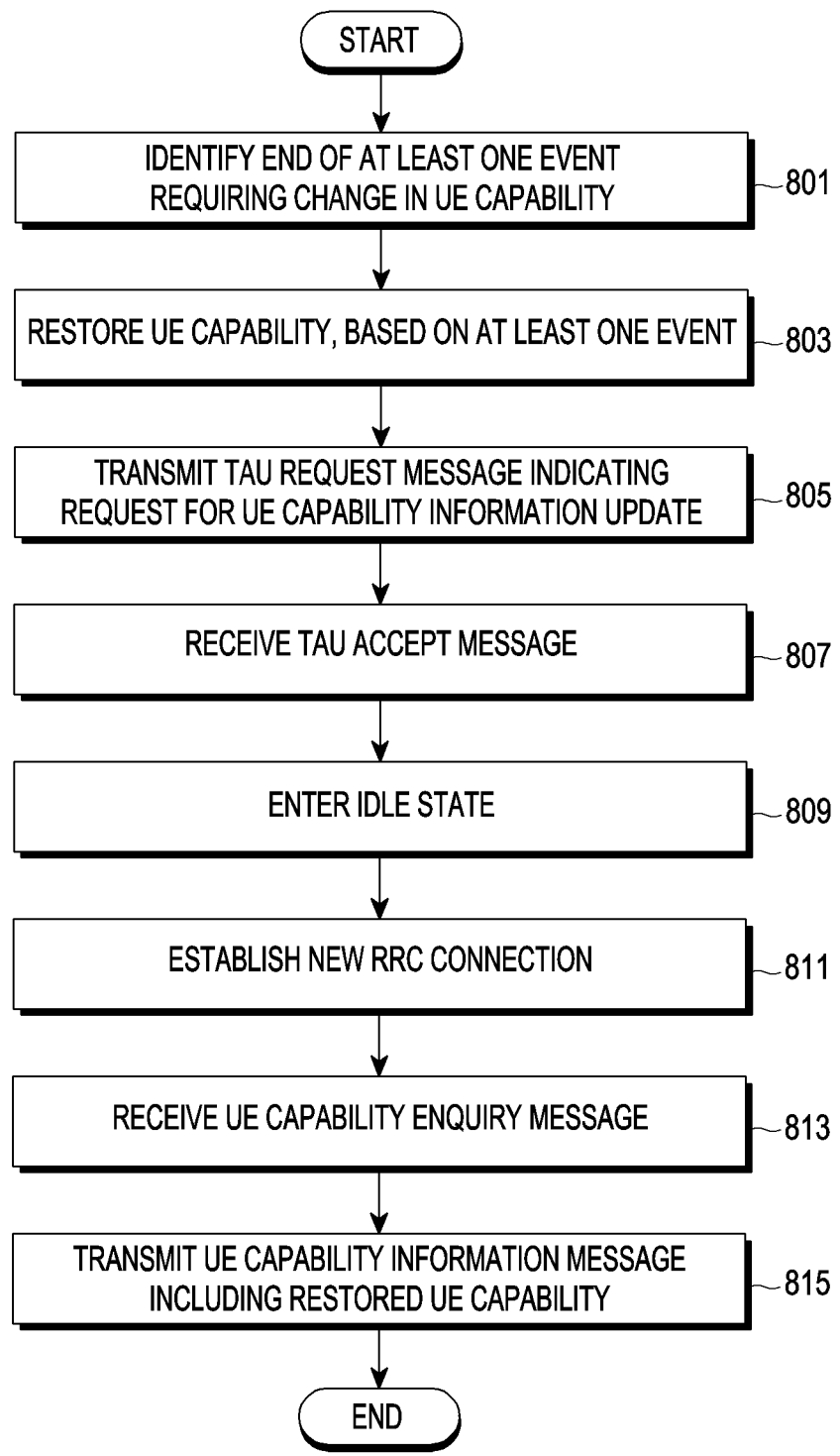
FIG. 8 is a flowchart illustrating an operation method of an electronic device according to various embodiments.

FIG. 8 is a flowchart illustrating an operation method of an electronic device according to various embodiments.

According to various embodiments, in operation 801, the electronic device 101 (for example, at least one of the processor 120, the first communication processor 212, the second communication processor 214, or the integrated communication processor 260) may identify termination of at least one event requiring a change of a UE capability. For example, the electronic device 101 assumes that a procedure of changing the UE capability, based on the occurrence of the event, and reporting the changed UE capability to the network 300, for example, a procedure by at least one of FIGS. 5A to 5D, is performed. The electronic device 101 may identify the termination of the event in operation 801 after reporting the changed UE capability. For example, when the UE capability is changed by an over-temperature state, the electronic device 101 may identify release of the over-temperature state as termination of the event.

According to various embodiments, in operation 803, the electronic device 101 may restore the UE capability, based on the termination of the at least one event. The electronic device 101 may restore changed information of an information element changed based on the occurrence of the event to information before the change. In operation 805, the electronic device 101 may transmit the TAU request message indicating that updating of UE capability information is requested, to the network 300. In operation 807, the electronic device 101 may receive a TAU accept message to the network 300. In operation 809, the electronic device 101 may enter an idle state, based on reception of the TAU accept message in a state in which no UE capability enquiry message is received. In operation 811, the electronic device 101 may perform at least one operation for establishment of a new RRC connection in the idle state. In operation 813, the electronic device 101 may receive a UE capability enquiry message, based on the new RRC connection. In operation 815, the electronic device 101 may transmit a UE capability information message including the restored UE capability to the network 300. Accordingly, even when the UE capability is restored upon the termination of the event, the UE capabilities of the electronic device 101 and the network 300 may be synchronized.

Figure 9A:
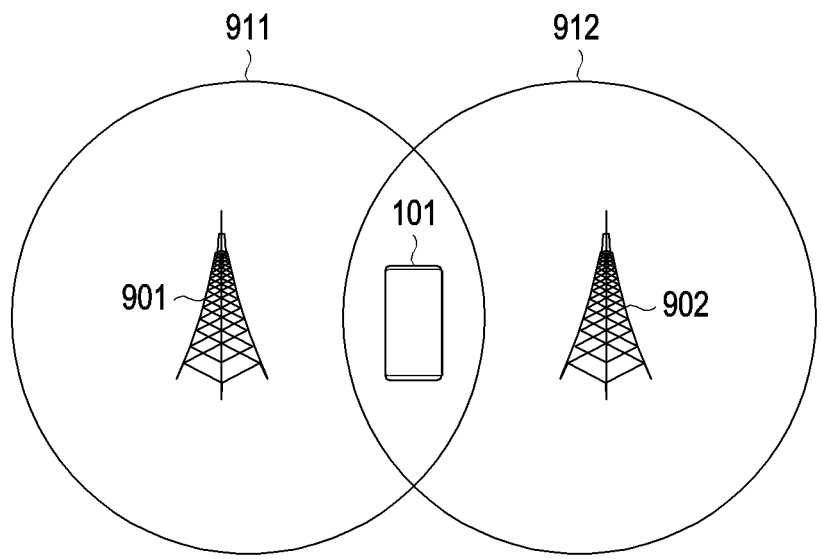
FIG. 9A illustrates an electronic device and cell coverage according to various embodiments.

FIG. 9A illustrates an electronic device and cell coverage according to various embodiments.

According to various embodiments, a first cell 901 supporting a first RAT (for example, NR) and/or a first communication system (for example, 5GS) and a second cell 902 supporting a second RAT (for example, E-UTRA) and/or a second communication system (for example, EPS) may be supported. The first cell 901 may support first coverage 911, and the second cell 902 may support second coverage 912. The electronic device 101 may be included in the coverage 911, but may be located around the edge of the first coverage 911. In this case, there is a possibility that the electronic device 101 performs cell reselection multiple times. The cell reselection may be performed based on the fact that the strength of a signal from a cell is relatively low in the edge of the first coverage 911. There is a possibility that the electronic device 101 reselects the first cell 901 after performing reselection of the second cell 902, and accordingly, cell reselection may be frequently performed. Upon the frequent cell reselection, it may be difficult to provide a stable communication service.

Figure 9B:
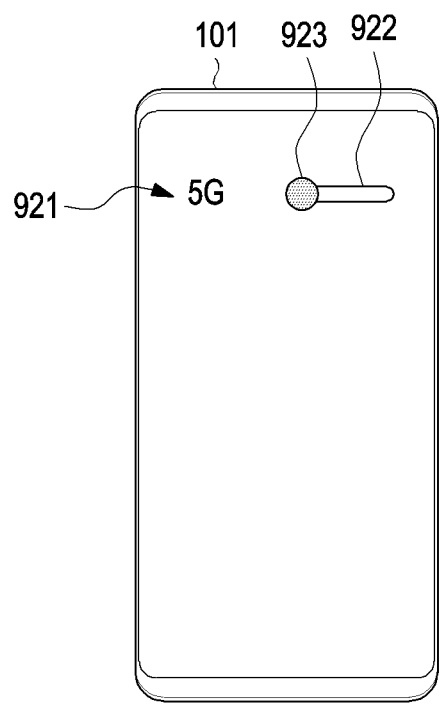
FIG. 9B illustrates a screen displayed by an electronic device according to various embodiments.

FIG. 9B illustrates a screen displayed by an electronic device according to various embodiments.

As shown in FIG. 9A, cell reselection may be frequently performed when the electronic device 101 is in the edge of the cell coverage, and thus, it may be difficult to provide a stable communication service. In order to provide a stable communication service, the electronic device 101 may deactivate a specific RAT and/or communication service (for example, NR and/or 5GS). For example, the electronic device 101 may display a UI including text 921, a slide bar 922, and an indicator 923, which indicate a specific communication service, 5G, as shown in FIG. 9B. For example, the electronic device 101 may display a UI (or a pop-up window including an object for calling a UI), based on occurrence of cell reselection (or handover or redirection) by a designated threshold number or more of times during a designated period. The electronic device 101 may display a UI, based on a UI call command of a user, and there is no limitation in an event for displaying a UI. The electronic device 101 may identify a command (for example, a touch, a drag, or a flick) from a user, which causes movement of the indicator 923. The electronic device 101 may change the location of the indicator 923, based on the identified command For example, the electronic device 101 may deactivate the specific RAT and/or communication service (for example, NR and/or 5GS) while the indicator 923 is disposed at a first position (for example, a left position). For example, the electronic device 101 may activate the specific RAT and/or communication service (for example, NR and/or 5GS) while the indicator 923 is disposed at a second position (for example, a right position).

Figure 9C:
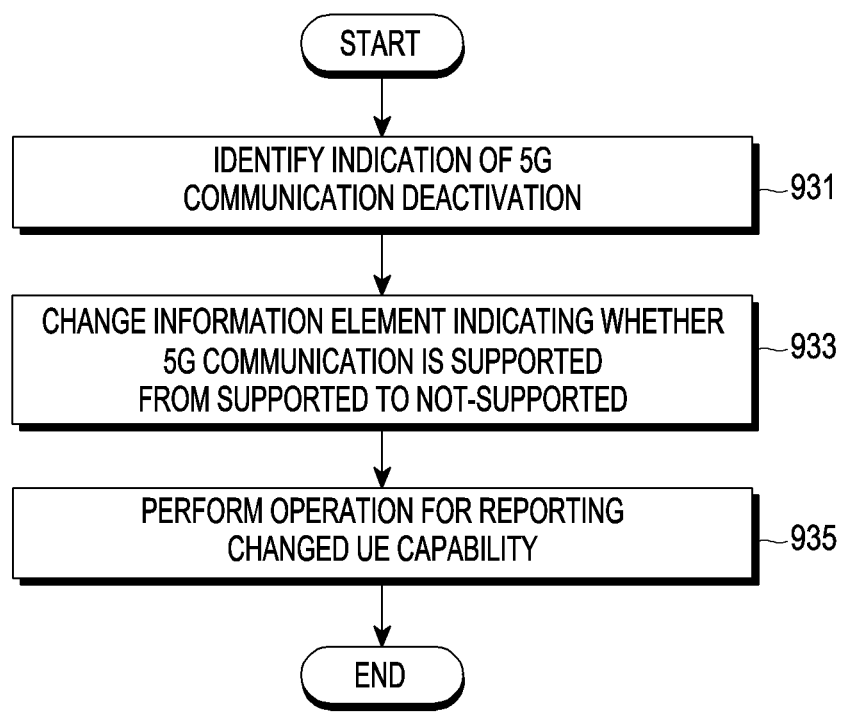
FIG. 9C is a flowchart illustrating an operation method of an electronic device according to various embodiments.

FIG. 9C is a flowchart illustrating an operation method of an electronic device according to various embodiments.

According to various embodiments, in operation 931, the electronic device 101 (for example, at least one of the first communication processor 212, the second communication processor 214, or the integrated communication processor 260) may identify an indication of 5G communication deactivation. As described in FIG. 9B, the electronic device 101 (for example, the processor 120) may identify a command for deactivating 5G communication, and may provide the same to a communication processor (for example, at least one of the first communication processor 212, the second communication processor 214, or the integrated communication processor 260). In operation 933, the communication processor (for example, at least one of the first communication processor 212, the second communication processor 214, or the integrated communication processor 260) may change an information element relating to whether 5G communication (or NR) is supported, from a supported configuration to an unsupported configuration. For example, NR may be deleted from UE-capabilityRAT-container of the UE capability. In operation 935, the electronic device 101 according to various embodiments may perform an operation of reporting the changed UE capability (for example, at least a part of operations described in FIGS. 5A to 5D).

Figure 9D:
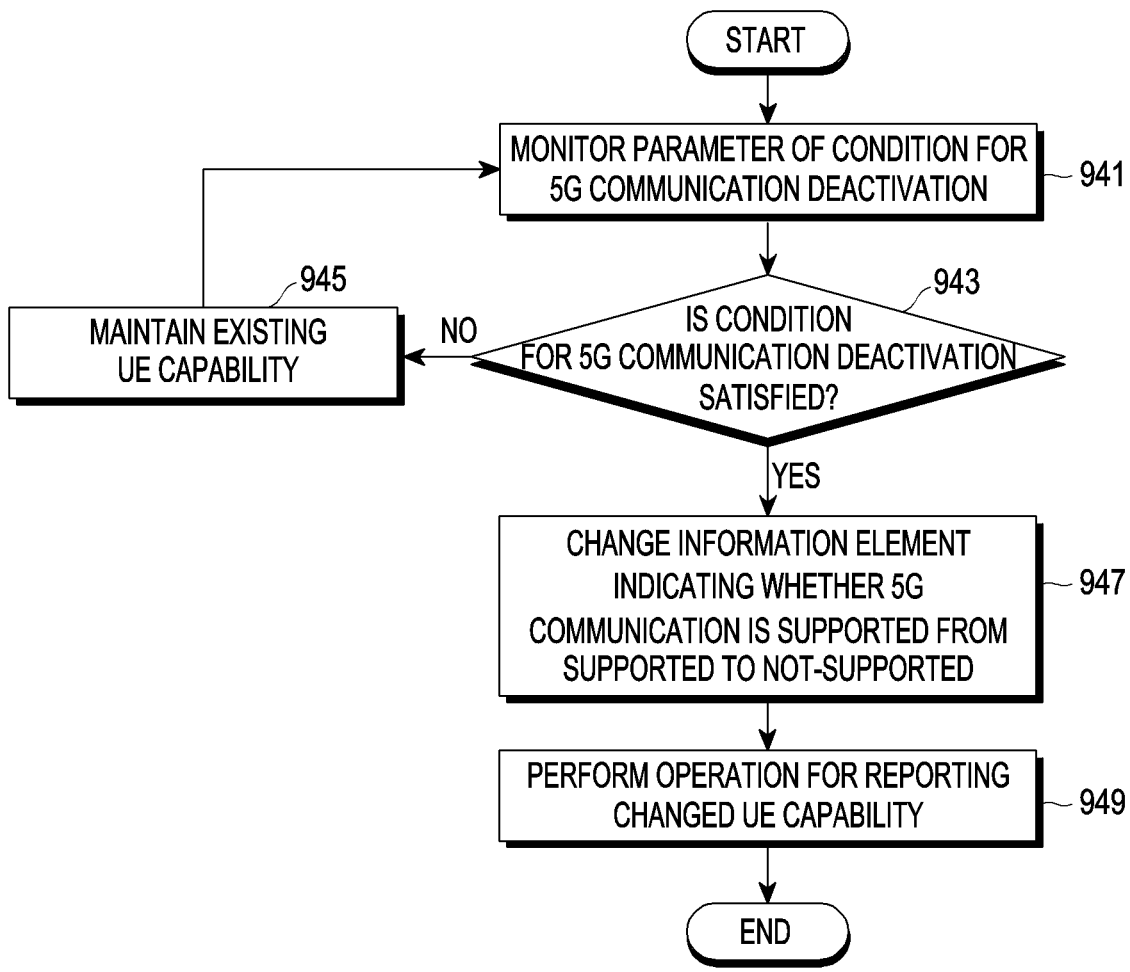
FIG. 9D is a flowchart illustrating an operation method of an electronic device according to various embodiments.

FIG. 9D is a flowchart illustrating an operation method of an electronic device according to various embodiments.

According to various embodiments, in operation 941, the electronic device 101 (for example, at least one of the first communication processor 212, the second communication processor 214, or the integrated communication processor 260) may monitor a parameter for a condition for 5G communication deactivation. In operation 943, the electronic device 101 may determine whether the condition for 5G communication deactivation is satisfied, using the monitored parameter. In an example, the electronic device 101 may determine that the condition for 5G communication deactivation has been satisfied, based on the cell reselection being performed a threshold number or more of times during a threshold period. In another example, the electronic device 101 may determine that the condition for 5G communication deactivation has been satisfied, based on an RRC connection to a cell supporting 5G communication has failed a threshold number or more of times during a threshold period. In another example, the electronic device 101 may determine that the condition for 5G communication deactivation has been satisfied, based on a reception strength of a signal from a specific cell satisfying a designated condition (for example, a threshold strength or lower). In addition to the examples above, those skilled in the art would understand that any condition corresponding to a case in which performing stable 5G communication is impossible may be implemented as the 5G communication deactivation condition.

According to various embodiments, if the condition for 5G communication deactivation has failed to be satisfied (if "No" in operation 943), the electronic device 101 may maintain the existing UE capability in operation 945. The electronic device 101 may continue monitoring a parameter as in operation 941, while maintaining the existing UE capability. If the condition for 5G communication deactivation has been satisfied (if "Yes" in operation 943), the electronic device 101 may change, in operation 947, an information element indicating whether 5G communication (or RAT) is supported, from a supported configuration to an unsupported configuration. In operation 949, the electronic device 101 may perform an operation (for example, at least a part of operations described in FIGS. 5A to 5D) of reporting the changed UE capability.

As described above, the electronic device 101 may deactivate 5G communication automatically, rather than based on a user command For example, the electronic device 101 may support an automatic selection mode related to a selection of a communication mode. In the automatic selection mode, the electronic device 101 may determine whether to activate or deactivate specific communication, based on the parameter to be monitored.

Although not shown, the electronic device 101 may identify that 5G communication is activated again. For example, the electronic device 101 may identify a 5G communication activation command (for example, a touch, a drag, or a flick) through a UI as shown in FIG. 9B. The electronic device 101 may determine whether to automatically activate 5G communication, based on the parameter to be monitored. For example, the electronic device 101 may activate 5G communication again, based on deterioration of a communication quality of another RAT (for example, E-UTRA), but there is no limitation in a condition for 5G communication reactivation. The electronic device 101 may restore the UE capability, based on the 5G communication activation. The electronic device 101 may change an information element relating to whether 5G communication is supported, from an unsupported configuration to a supported configuration. In operation 949, the electronic device 101 may perform an operation (for example, at least a part of operations described in FIGS. 5A to 5D) of reporting the changed UE capability.

Figure 10A:
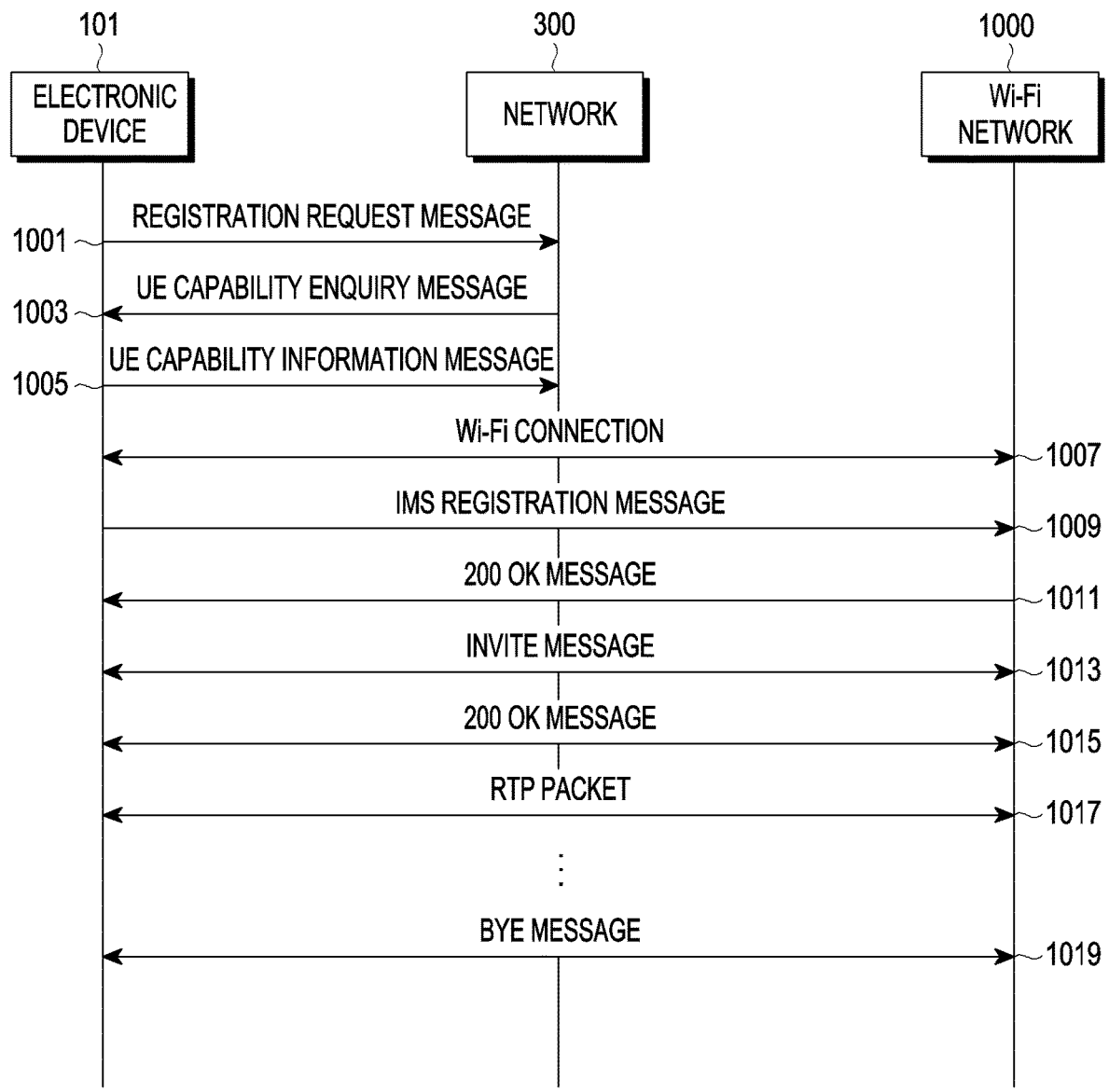
FIG. 10A is a flowchart illustrating an operation method of an electronic device according to various embodiments.

FIG. 10A is a flowchart illustrating an operation method of an electronic device according to various embodiments.

According to various embodiments, in operation 1001, the electronic device 101 (for example, at least one of the processor 120, the first communication processor 212, the second communication processor 214, or the integrated communication processor 260) may transmit a registration request message (for example, an attach request message for EPC or a registration request message for 5GC) to the network 300. In operation 1003, the electronic device 101 may receive a UE capability enquiry message from the network 300. In operation 1005, the electronic device 101 may transmit a UE capability information message to the network 300, based on the reception of the UE capability enquiry message. The network 300 may store and/or manage a UE capability of the electronic device 101, based on information included in the UE capability information message.

According to various embodiments, in operation 1007, the electronic device 101 (for example, a Wi-Fi module) may establish a Wi-Fi connection with a Wi-Fi network 1000. The operation of establishing the Wi-Fi connection may follow at least a part of sub specifications of 802.11, and the description of the corresponding operation will be omitted. In operation 1009, the electronic device 101 may transmit an IMS registration message to an IMS server (for an IMS core) (unshown) through the Wi-Fi network 1000, based on the Wi-Fi connection. The IMS registration message may correspond to a session initiation protocol (SIP)-based message, and may be transmitted to the IMS server through, for example, the Wi-Fi network 1000, ePDG, etc., but is not limited thereto. When the electronic device 101 is registered in the IMS server, the IMS server may transmit a 200 OK message to the electronic device 101 through the Wi-Fi network 1000. In operation 1011, the electronic device 101 may receive the 200 OK message from the Wi-Fi network 1000.

According to various embodiments, in operation 1013, the electronic device 101 may transmit or receive an INVITE message through the Wi-Fi network 1000. When the electronic device 101 corresponds to a mobile originating (MO) terminal, the electronic device 101 may transmit the INVITE message. When the electronic device 101 corresponds to a mobile terminated (MT) terminal, the electronic device 101 may receive an INVITE message. In operation 1015, the electronic device 101 may transmit or receive the 200 OK message. For example, the electronic device 101 may transmit the INVITE message, and receive the 200 OK message when the MT terminal has accepted the reception. For example, when the electronic device 101 has received the INVITE message and the call reception acceptance is identified, the 200 OK message may be transmitted. Although not shown, between the transmission or reception of the INVITE message and the transmission or reception of the 200 OK message, other SIP messages (for example, a TRYING message and a RINGING message) may be transmitted or received. A session may be established between the electronic device 101 and another terminal, based on the reception of the 200 OK message. In operation 1017, the electronic device 101 may transmit and/or receive an RTP packet to or from another terminal, based on the established session. Accordingly, multimedia data for a call may be transmitted or received. According to various embodiments, in operation 1019, the electronic device 101 may transmit or receive a BYE message, based on a call end.

Switching between the network 300 and the Wi-Fi network 1000, for example, switching between LTE communication and Wi-Fi and switching between 5G communication and Wi-Fi are defined in the 3GPP standard. For example, for switching between 5G communication and Wi-Fi, an N3IWF entity may be required. However, according to a network business operator, the N3IWF entity may not be implemented. In this case, the switching between 5G communication and Wi-Fi may not be performed. Accordingly, it may be advantageous for the electronic device 101 to deactivate 5G communication, for use of a seamless call service.

Figure 10B:
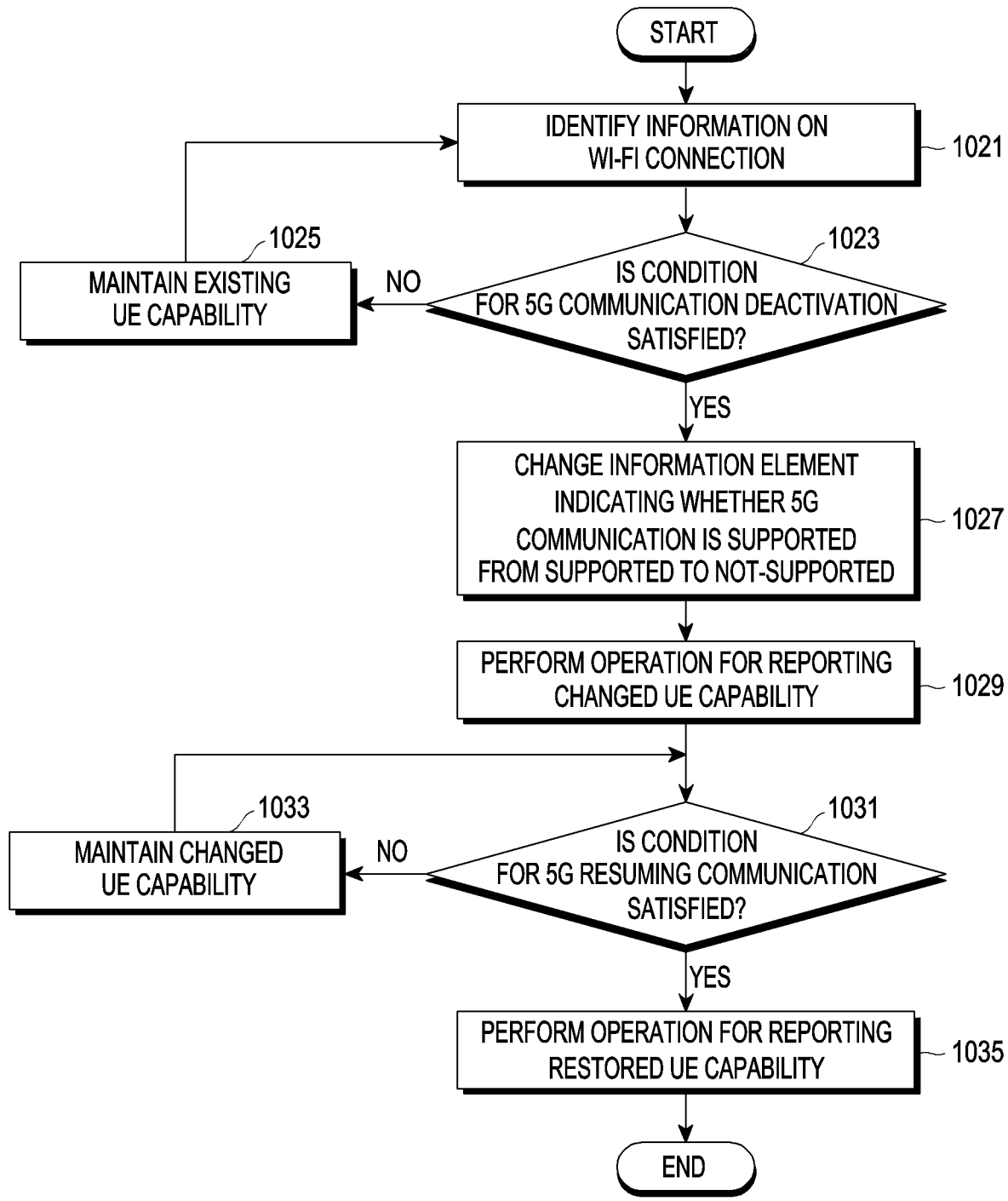
FIG. 10B is a flowchart illustrating an operation method of an electronic device according to various embodiments.

FIG. 10B is a flowchart illustrating an operation method of an electronic device according to various embodiments.

According to various embodiments, in operation 1021, the electronic device 101 (for example, at least one of the first communication processor 212, the second communication processor 214, or the integrated communication processor 260) may identify information on a Wi-Fi connection. For example, when the information on the Wi-Fi connection through a Wi-Fi module is identified, the processor 120 may provide the information to a communication processor (for example, at least one of the first communication processor 212, the second communication processor 214, or the integrated communication processor 260). For example, the information on the Wi-Fi connection may correspond to an indication indicating a state in which the Wi-Fi connection is established by the Wi-Fi module, but there is no limitation in the format of the information if the information indicates that the Wi-Fi connection has been established.

According to various embodiments, in operation 1023, the electronic device 101 may determine whether a condition for 5G communication deactivation is satisfied. For example, the electronic device 101 may identify, as satisfaction of the condition for 5G communication deactivation, at least one of the transmission and/or reception of at least a part of multiple messages for the Wi-Fi connection in operation 1007, the transmission or reception of the IMS registration message in operation 1009, the transmission or reception of the 200 OK message in operation 1011, the transmission or reception of the INVITE message in operation 1013, the transmission or reception of the 200 OK message in operation 1015, and the transmission or reception of the at least one RPT packet in operation 1017 in FIG. 10A. If the condition for 5G communication deactivation has failed to be satisfied (if "No" in operation 1023), the electronic device 101 may maintain the existing UE capability in operation 1025. The electronic device 101 may continue monitoring a parameter as in operation 1021, while maintaining the existing UE capability. If the condition for 5G communication deactivation has been satisfied (if "Yes" in operation 1023), the electronic device 101 may change, in operation 1027, an information element relating to whether 5G communication (or RAT) is supported, from a supported configuration to an unsupported configuration. In operation 1029, the electronic device 101 may perform an operation (for example, at least a part of operations described in FIGS. 5A to 5D) of reporting the changed UE capability.

According to various embodiments, in operation 1031, the electronic device 101 may determine whether a condition for resuming 5G communication is satisfied. For example, the electronic device 101 may identify, as satisfaction of the condition for resuming 5G communication, at least one of the transmission or reception of the BYE message, the release of the SIP session, the deregistration from the IMS server, or the Wi-Fi disconnection described in FIG. 10A. If the condition for resuming 5G communication has failed to be satisfied (if "No" in operation 1031), the electronic device 101 may maintain the changed UE capability in operation 1033. If the condition for resuming 5G communication has been satisfied (if "Yes" in operation 1031), the electronic device 101 may perform an operation of reporting the restored UE capability in operation 1035. The electronic device 101 may change an information element relating to whether 5G communication (or RAT) is supported, from a unsupported configuration to a supported configuration, based on the satisfaction of the condition for resuming 5G communication. The electronic device 101 may perform an operation (for example, at least a part of operations described in FIGS. 5A to 5D) of reporting the changed UE capability.

Figure 11:
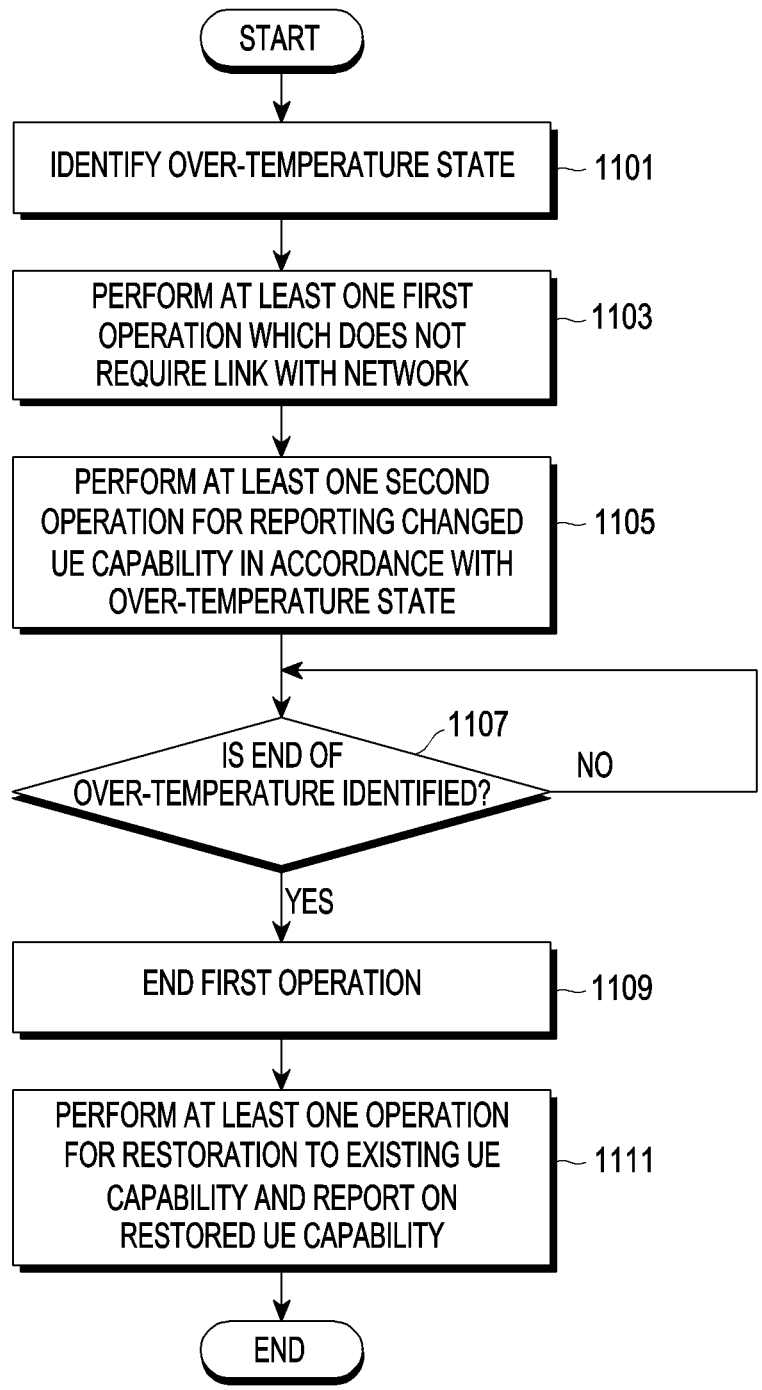
FIG. 11 is a flowchart illustrating an operation method of an electronic device according to various embodiments.

FIG. 11 is a flowchart illustrating an operation method of an electronic device according to various embodiments.

According to various embodiments, in operation 1101, the electronic device 101 (for example, at least one of the processor 120, the first communication processor 212, the second communication processor 214, or the integrated communication processor 260) may identify an over-temperature state. For example, as described in FIG. 7A, the electronic device 101 may identify, as an over-temperature state, an indication of an overtemperature indicating that the measured temperature corresponds to a threshold temperature or higher. As described in FIG. 7B, the electronic device 101 may operate based on the measured temperature (or the temperature range including the measured temperature).

According to various embodiments, in operation 1103, the electronic device 101 may perform at least one first operation in which association (e.g., link) with the network 300 is not required. In an example, the electronic device 101 may perform, as a first operation, adjustment of the number of antennas for reception, and the description thereof will be made in greater detail below. In another example, the electronic device 101 may perform, as a first operation, adjustment of transmission power, and the description thereof will be made below. Those skilled in the art would understand that an operation is performed as the least one first operation unless the operation necessarily requires reporting of the changed information to the network 300. For example, the more the number of antennas for reception, the amount of heat generated in the electronic device 101 gets relatively larger. Accordingly, in the overheating state, the electronic device 101 may reduce the number of antennas for reception, thereby reducing the amount of heat generation.

According to various embodiments, in operation 1105, the electronic device 101 may perform at least one second operation of reporting a UE capability changed in response to the over-temperature state. For example, as described with reference to FIG. 6, the electronic device 101 may perform at least one of the change of the information element associated with CA and/or the information element associated with DC of the UE capability, the change of the information element associated with the layer, the change of the information element associated with the bandwidth, the change of the information element associated with the modulation and coding scheme (MCS), the change of the information element associated with the sounding reference signal (SRS), or the change of the information element associated with the supported radio access technology (RAT) and/or communication system, and there is no limitation in the type of the changed information element. For example, the change of the UE capability may be at least partially identical to the change of the UE capability described with reference to at least one of FIG. 5A, 5B, 5C, 5D, 6, 7A, 7B, 8, 9A, 9B, 9C, 9D, 10A, or 10B. The electronic device 101 may perform an operation (for example, at least a part of operations in FIGS. 5A to 5D) of reporting the changed UE capability to the network 300. The electronic device 101 may transmit a UE capability information message including the changed UE capability, based on reception of a UE capability enquiry message from the network 300 after transmission of a TAU request message. After the transmission of the TAU request message, the electronic device 101 may receive an RRC disconnection message from the network 300, and may establish a new RRC connection, based on the reception of the RRC disconnection message. The electronic device 101 may receive the UE capability enquiry message and transmit the UE capability information message including the changed UE capability, based on the new RRC connection.

According to various embodiments, in operation 1107, the electronic device 101 may determine whether the overtemperature ends. If it is identified that the overtemperature does not end (if "No" in operation 1107), the electronic device 101 may maintain the UE capability change state and the first operation. If it is identified that the overtemperature ends (if "Yes" in operation 1107), the electronic device 101 may terminate the first operation in operation 1109. For example, when the number of antennas for reception is adjusted upon the first operation, the electronic device 101 may restore the number of antennas for reception to a number before the adjustment. When the electronic device 101 has performed backoff of the transmission power, as the first operation, the electronic device 101 may suspend the backoff. In operation 1111, the electronic device 101 may restore the UE capability to the existing UE capability and perform at least one operation of reporting the restored UE capability. For example, the electronic device 101 may change the UE capability as the second operation. The electronic device 101 may restore the UE capability to the information before the change and perform at least one operation of reporting the same to the network 300, based on the end of the overtemperature.

Figure 12:
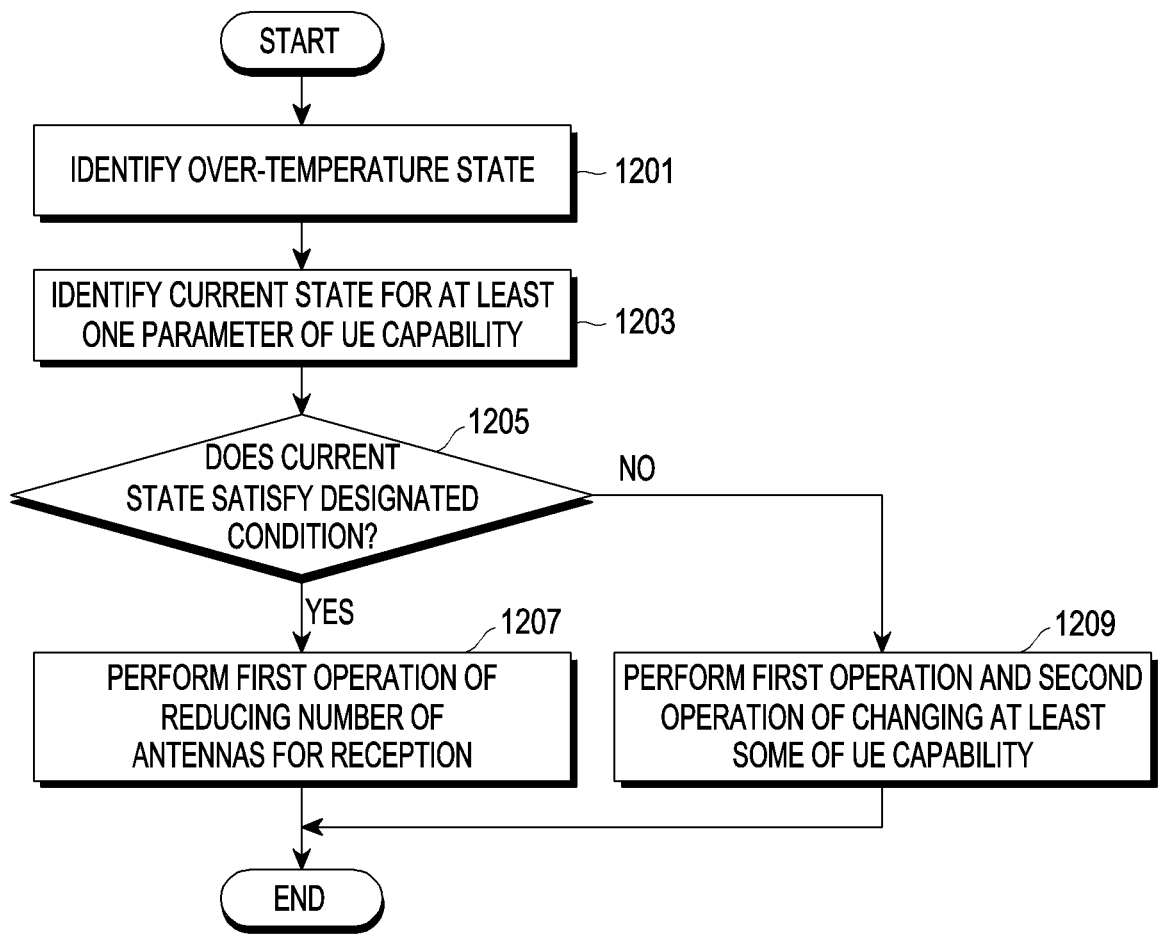
FIG. 12 is a flowchart illustrating an operation method of an electronic device according to various embodiments.
Figure 13:
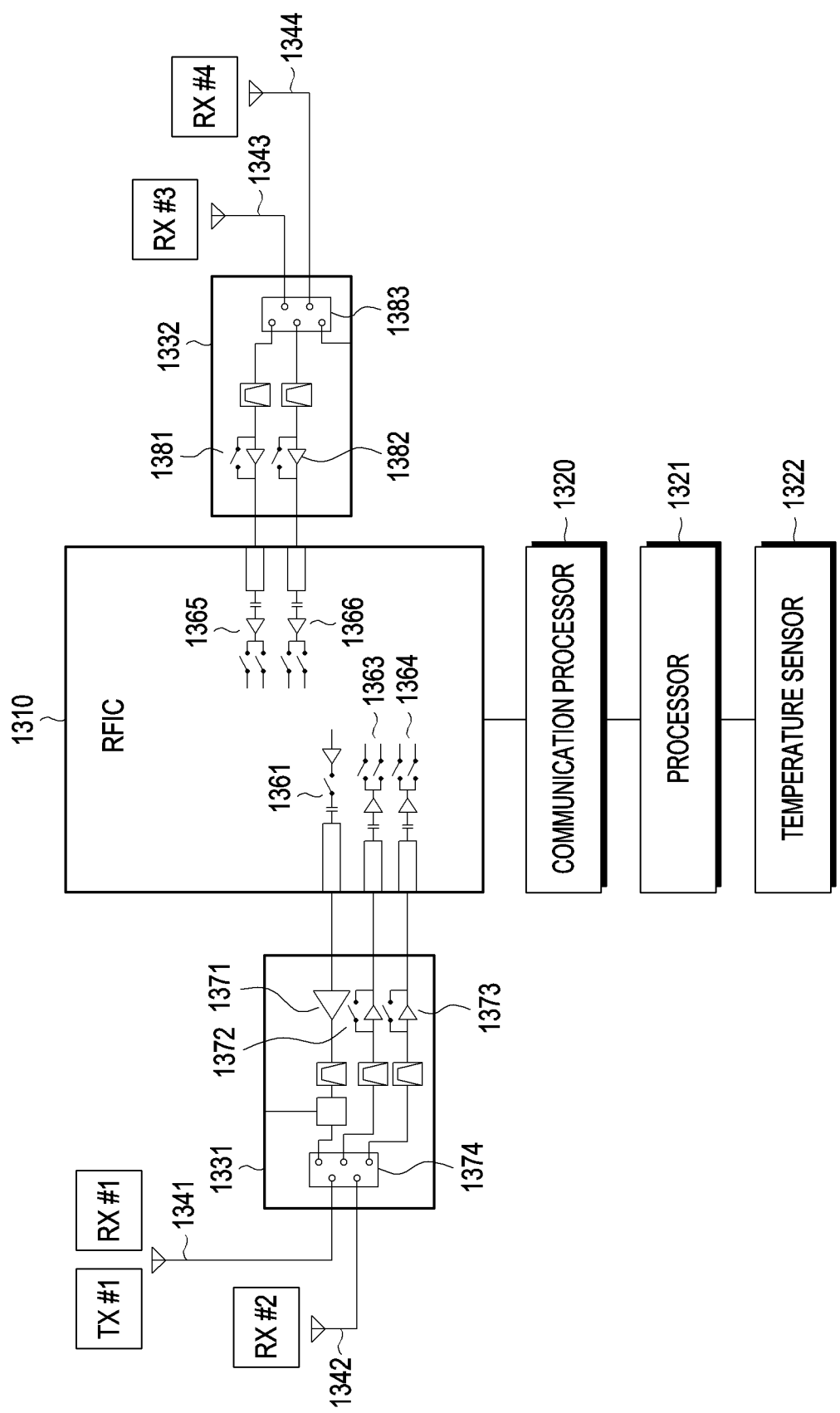
FIG. 13 is a block diagram illustrating an electronic device according to various embodiments.

FIG. 12 is a flowchart illustrating an operation method of an electronic device according to various embodiments. An embodiment of FIG. 12 is described with reference to FIG. 13. FIG. 13 is a block diagram illustrating an electronic device according to various embodiments.

According to various embodiments, in operation 1201, the electronic device (for example, at least one of the processor 120, the first communication processor 212, the second communication processor 214, or the integrated communication processor 260) may identify an over-temperature state. In operation 1203, the electronic device 101 may identify a current state of at least one parameter of a UE capability. In operation 1205, the electronic device 101 may determine whether the current state satisfies a designated condition. In an example, the electronic device 101 may determine whether the electronic device 101 performs CA, as a part of the operation of determining whether the designated condition is satisfied. For example, when the CA is not performed, it may be determined that the designated condition is satisfied. In an example, the electronic device 101 may determine whether the electronic device 101 performs DC, as a part of the operation of determining whether the designated condition is satisfied. For example, when the DC is not performed, it may be determined that the designated condition is satisfied. In an example, the electronic device 101 may determine whether the electronic device 101 performs SRS transmission and/or has received an SRS configuration from the network 300, as a part of the operation of determining whether the designated condition is satisfied. For example, when the SRS transmission is not performed, and/or when the SRS configuration has not been received, it may be determined that the designated condition is satisfied. In an example, the electronic device 101 may determine whether a current supported bandwidth (for example, supportedbandwidth) of the electronic device 101 is identical or similar to an initial carrier bandwidth (initialcarrierbandwidth), as a part of the operation of determining whether the designated condition is satisfied. The initial carrier bandwidth may be acquired from system information. For example, when the initial carrier bandwidth is identical or similar to the current supported bandwidth, it may be determined that the designated condition is satisfied. There is no limitation in the designated condition if the condition causes no change in operations performed by the electronic device 101 and the network 300 upon the change of the UE capability. For example, in a case where the CA or the DC is not currently performed, even when an information element for the CA or the DC of the UE capability is deactivated, there is no change in the operations of the electronic device 101 and the network 300, and accordingly, there is a low possibility that the over-temperature state is resolved according to the change of the UE capability.

According to various embodiments, if the designated condition is satisfied (if "Yes" in operation 1205), the electronic device 101 may perform, in operation 1207, a first operation of reducing the number of antennas for reception. If the designated condition is not satisfied (if "No" in operation 1205), the electronic device 101 may perform, in operation 1209, the first operation of reducing the number of antennas for reception and a second operation of changing at least a part of the UE capability. Referring to FIG. 13, an electronic device (e.g., the electronic device 101 of FIG. 1) according to various embodiments may include a communication processor (e.g., including processing circuitry) 1320 (for example, at least one of the first communication processor 212, the second communication processor 214, or the integrated communication processor 260), a processor (e.g., including processing circuitry) 1321 (for example, the processor 120), a temperature sensor 1322 (for example, the sensor module 176), an RFIC 1310 (for example, at least one of the first RFIC 222, the second RFIC 224, the third RFIC 226, or the fourth RFIC 228), a first RFFE 1331, a second RFFE 1332, a first antenna 1341, a second antenna 1342, a third antenna 1343, and a fourth antenna 1344. The communication processor 1320 may control at least a part of the RFIC 1310 or the RFFEs 1331 and 1332 to adjust the number of antennas for reception.

According to various embodiments, when performing transmission, the RFIC 1310 may convert a baseband signal generated by the communication processor 1320 into a radio frequency (RF) signal. For example, the RFIC 1310 may transmit the RF signal to the first antenna 1341 through the first RFFE 1331. Alternatively, when performing reception, the RFIC 1310 may convert an RF signal received from the RFFE (for example, the first RFFE 1331 or the second RFFE 1332) into a baseband signal to provide the same to the communication processor 1320. The RFIC 1310 may include a component 1361 for transmission and components 1363, 1364, 1365, and 1366 for reception. The first RFFE 1331 may include a component 1371 for transmission, components 1372 and 1373 for reception, and a switch 1374. The switch 1374 may control a connection between each of the components 1371, 1372, and 1373 and each of the antennas 1341 and 1342. The second RFFE 1332 may include components 1381 and 1382 for reception and a switch 1383. The switch 1383 may control a connection between each of the components 1381 and 1382 and each of the antennas 1343 and 1344. Here, the first antenna 1341 may be used both for transmission and reception, and may be called a PRX antenna. The second antenna 1342, the third antenna 1343, and the fourth antenna 1344 may be used for reception, and may be called DRX antennas. The electronic device 101 may use a DRX antenna for SRS transmission. Although not shown, the electronic device 101 may further include a switching structure for allowing an RF signal for an SRS to be applied to the DRX antennas 1342, 1343, and 1344. For example, when the UE capability of the electronic device 101 is configured as 1t4r, the electronic device 101 may apply the RF signal sequentially (for example, according to an SRS transmission timing) to the first antenna 1341 corresponding to the PRX antenna, and the second antenna 1342, the third antenna 1343, and the fourth antenna 1344 corresponding to the DRX antennas. For example, when the UE capability of the electronic device 101 is configured as 1t2r, the electronic device 101 may apply the RF signal sequentially (for example, according an SRS transmission timing) to the first antenna 1341 corresponding to the PRX antenna and one of the DRX antennas.

For example, when the number of antennas for reception is configured as four, the communication processor 1320 may control at least a part of the RFIC 1310 and the RFFEs 1331 and 1332 so as to perform reception through all of the first antenna 1341, the second antenna 1342, the third antenna 1343, and the fourth antenna 1344. The processor 1321 may provide information indicating an over-temperature state to the communication processor 1320, based on temperature information acquired from the temperature sensor 1322. The communication processor 1320 may perform a first operation of adjusting the number of antennas for reception, based on the acquired information indicating the over-temperature state. For example, the communication processor 1320 may adjust the number of antennas for reception to two. In this case, the communication processor 1320 may control the RFIC 1310 and the second RFFE 1332 so that a reception operation through the third antenna 1343 and the fourth antenna 1344 is not to be performed. In this case, at least a part of the components 1365, 1366, 1381, and 1382 and the antenna 1383 may be controlled so that signals are not to be received from the antennas 1343 and 1344.

Alternatively, the communication processor 1320 may adjust the number of antennas for reception to one. In this case, the communication processor 1320 may control the RFIC 1310 and the RFFEs 1331 and 1332 so that a reception operation through the second antenna 1342, the third antenna 1343, and the fourth antenna 1344 is not to be performed. In this case, at least a part of the components 1364, 1365, 1366, 1381, and 1382 and the antennas 1374 and 1383 may be controlled so that signals are not to be received from the antennas 1342, 1343, and 1344. The electronic device 101 may decrease or increase the number of currently operating antennas for reception, and there is no limitation in the decreasing or increasing number.

According to various embodiments, the electronic device 101 may perform the first operation of decreasing the number of antennas for reception when the temperature sensed by the sensor module 176 is included in a first temperature range. The electronic device 101 may be configured to perform a second operation of changing at least a part of the UE capability when the temperature sensed by the sensor module 176 is included in a second temperature range differing from the first temperature range. Here, the second temperature range may be higher than the first temperature range, but may be lower than the first temperature range according to implementation.

Figure 14:
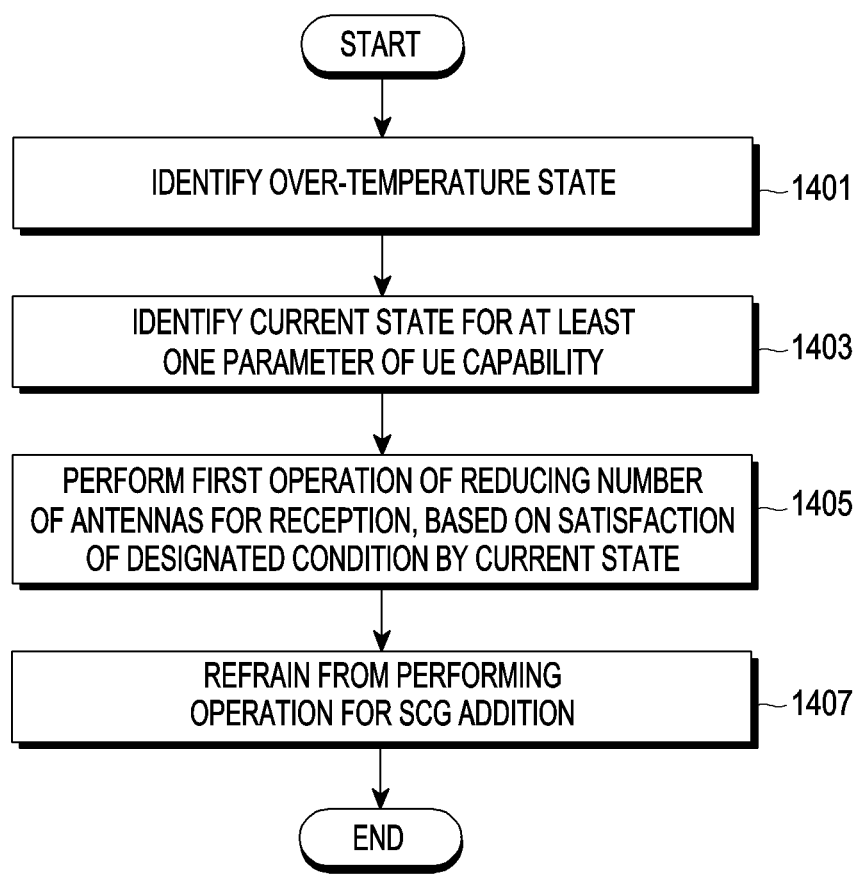
FIG. 14 is a flowchart illustrating an operation method of an electronic device according to various embodiments.

FIG. 14 is a flowchart illustrating an operation method of an electronic device according to various embodiments.

According to various embodiments, in operation 1401, the electronic device 101 (for example, at least one of the processor 120, the first communication processor 212, the second communication processor 214, or the integrated communication processor 260) may identify an over-temperature state. In operation 1403, the electronic device 101 may identify a current state of at least one parameter of a UE capability. In operation 1405, the electronic device 101 may perform a first operation of reducing the number of antennas for reception, based on the current state satisfying a designated condition. As described above in FIG. 12, the electronic device 101 may perform the first operation only, without performing an operation of changing and reporting the UE capability when there is no change in the operations of the electronic device 101 and the network 300 according to the change of the UE capability. The UE capability has not changed, and thus, there is a possibility that the network 300 performs, for example, an operation for DC.

According to various embodiments, in operation 1407, the electronic device 101 may refrain from performing an operation of adding a secondary cell group (SCG). In an example, when an RRC reconfiguration message including a measurement object (MO) for adding the SCG is received, the electronic device 101 may refrain from performing measurement of the corresponding MO and/or measurement report (MR). When the RRC reconfiguration message for adding the SCG is received, the electronic device 101 may refrain from performing an operation of adding the SCG, for example, performing a RACH procedure for the SCG, and may transmit a SCG failure message to the network 300.

Although not shown, the electronic device 101 may also refrain from performing CA or SRS transmission. For example, the UE capability has not been changed, and thus, there is a possibility that the network 300 performs, for example, an operation for the CA or the SRS. The electronic device 101 may refrain from performing the operation for the CA even when the RRC reconfiguration message for the CA is received. The electronic device 101 may refrain from performing SRS transmission even when the RRC reconfiguration message includes the SRS configuration.

Figure 15:
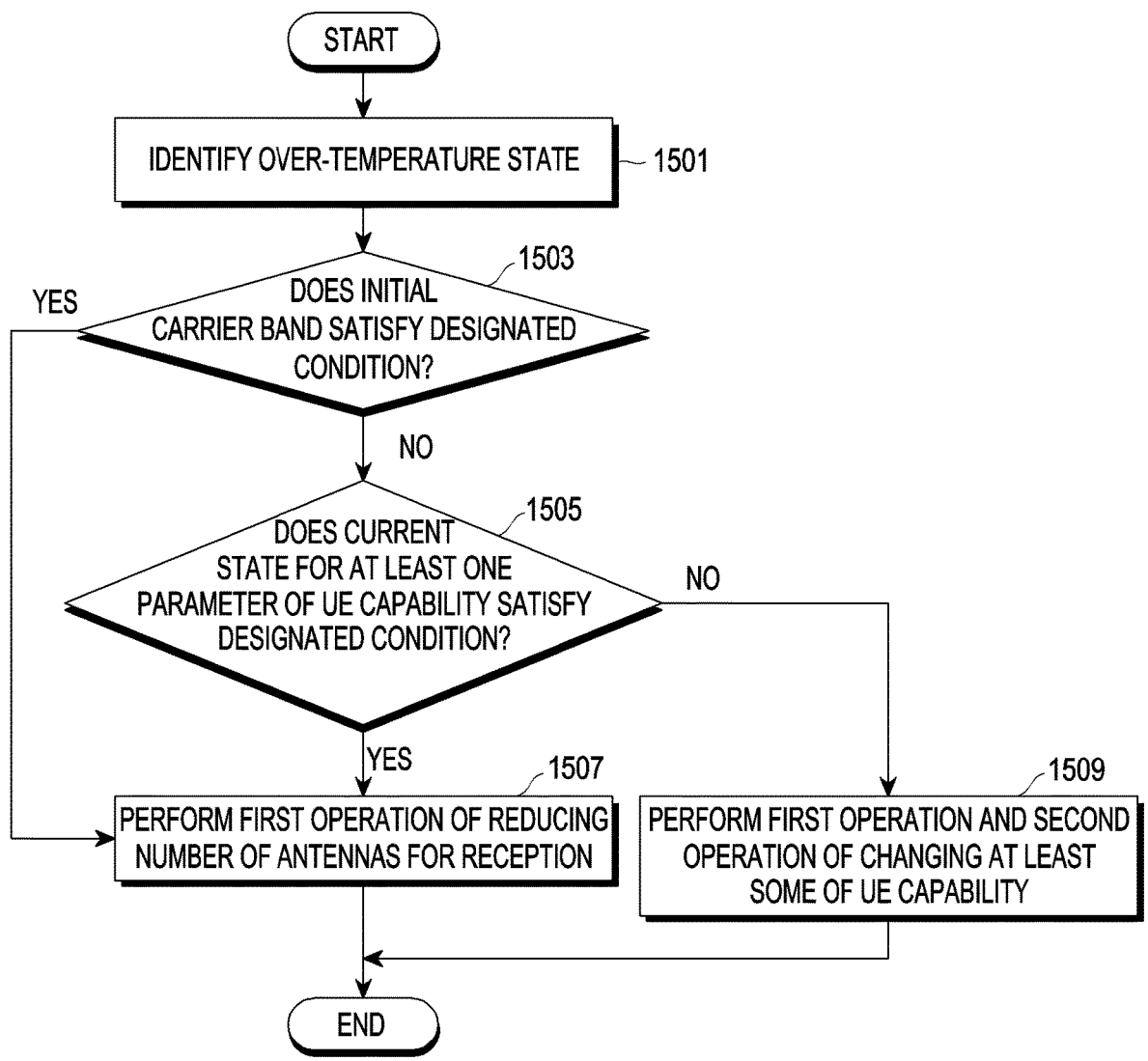
FIG. 15 is a flowchart illustrating an operation method of an electronic device according to various embodiments.

FIG. 15 is a flowchart illustrating an operation method of an electronic device according to various embodiments.

According to various embodiments, in operation 1501, the electronic device 101 (for example, at least one of the processor 120, the first communication processor 212, the second communication processor 214, or the integrated communication processor 260) may identify an over-temperature state. In operation 1503, the electronic device 101 may determine whether an initial carrier bandwidth (initial carrier band width) satisfies a designated condition. For example, the electronic device 101 may identify whether the initial carrier bandwidth is included in a designated range (for example, 10 MHz or lower, or 20 MHz or lower). For example, 10 MHz may correspond to a value configured for stable performance of a voice over NR (VoNR) service or an ultra-reliable low-latency communication (URLLC) service. The VoNR service has a relatively low data rate used for a call service, and a QoS class identifier (QCI) is a guaranteed bit rate (GBR) type, and thus, the service can be stably performed even when the UE capability is changed and/or the number of antennas for reception is adjusted. The URLLC service corresponds to a service for low latency and high reliability, and may thus not require high data rate. For example, in the 3GPP TS 22.186, a KPI of V2X is provided, and a data rate of about 53 Mbps may be required, wherein the data rate of about 53 Mbps corresponds to a data rate which can be supported in a 10 MHz bandwidth. For example, when only one CC is used for a 10 MHz bandwidth in 5G communication, a data rate of about 84 Mbps may be acquired with reference to 2×2 MIMO and 64 QAM, which may be higher than 53 Mbps required in URLLC. For example, 20 MHz may correspond to a bandwidth which allows performing the URLLC service or the VoNR service while securing stable performance of other services. Alternatively, 20 MHz may correspond to a bandwidth which can secure stable provision of a service (for example, an eMBB service) requiring a relatively higher data rate.

According to various embodiments, if the initial carrier bandwidth satisfies the designated condition (if "Yes" in operation 1503), the electronic device 101 may perform, in operation 1507, a first operation of reducing the number of antennas for reception. If the initial carrier bandwidth has failed to satisfy the designated condition (if "Yes" in operation 1503), the electronic device 101 may determine, in operation 1505, whether a current state of at least one parameter of the UE capability satisfies a designated condition. The determining of whether the designated condition in operation 1505 is satisfied may be identical or similar to the description made in FIG. 13. If the designated condition is satisfied (if "Yes" in operation 1505), the electronic device 101 may perform, in operation 1507, the first operation of reducing the number of antennas for reception. If the designated condition has failed to be satisfied (if "No" in operation 1505), the electronic device 101 may perform, in operation 1509, the first operation and a second operation of changing at least a part of the UE capability. As described above, when the initial carrier bandwidth is lower than a specific bandwidth, the electronic device 101 may be configured not to adjust the UE capability in order to stably perform a specific service (for example, a VoNR service or a URLLC service).

Figure 16:
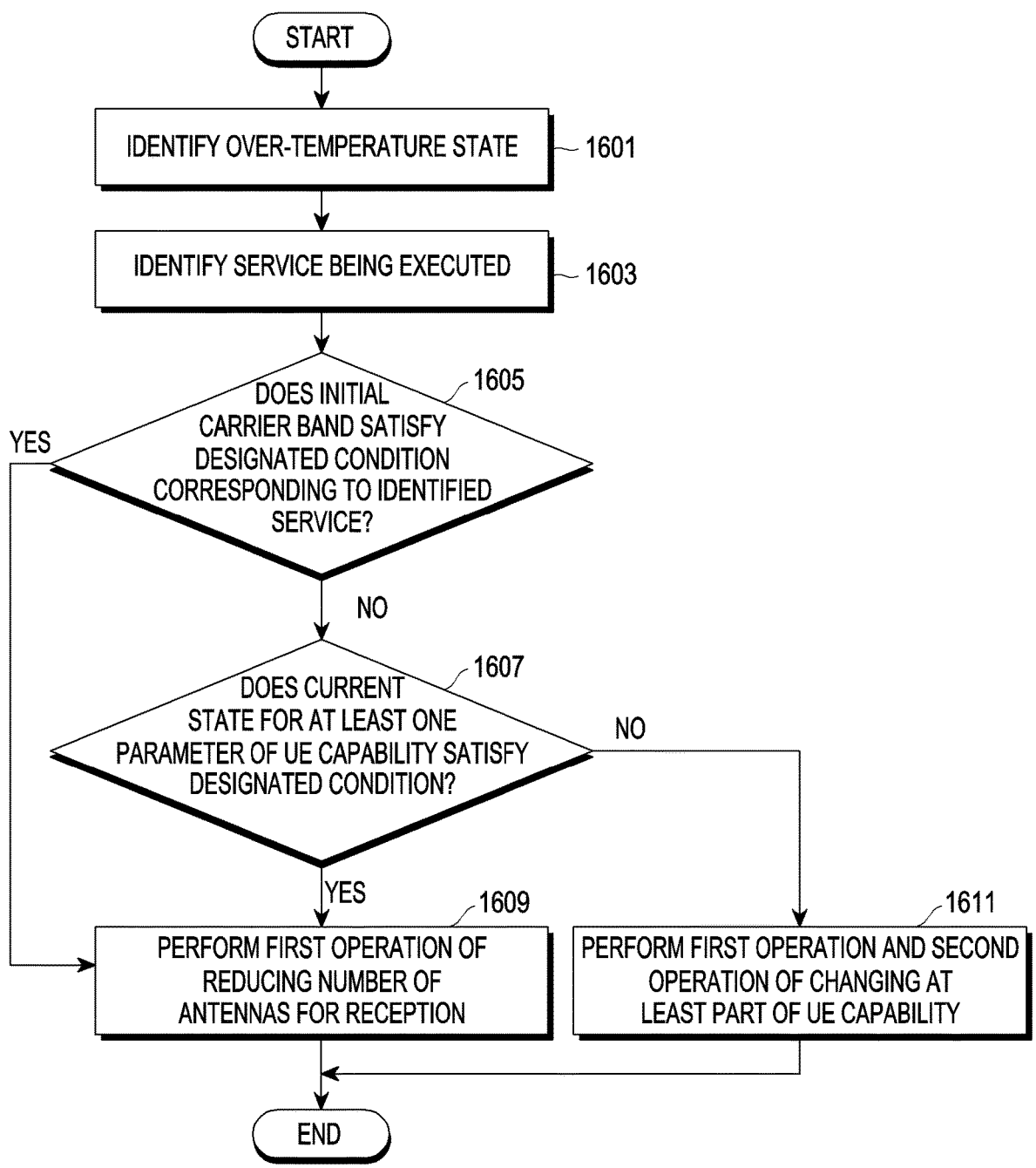
FIG. 16 is a flowchart illustrating an operation method of an electronic device according to various embodiments.

FIG. 16 is a flowchart illustrating an operation method of an electronic device according to various embodiments.

According to various embodiments, in operation 1601, the electronic device 101 (for example, at least one of the processor 120, the first communication processor 212, the second communication processor 214, or the integrated communication processor 260) may identify an over-temperature state. In operation 1603, the electronic device 101 may identify a service that is being performed. In an example, when the over-temperature state is identified, the processor 120 may provide, to a communication processor (for example, at least one of the first communication processor 212, the second communication processor 214, or the integrated communication processor 260), information on the over-temperature state and information on the type (for example, a slice/service type (SST)) of service that is being performed together. The communication processor (for example, at least one of the first communication processor 212, the second communication processor 214, or the integrated communication processor 260) may identify a service that is being performed, based on the information on the type of service that is being performed, the information being received together with the information on the over-temperature state. In another example, the communication processor (for example, at least one of the first communication processor 212, the second communication processor 214, or the integrated communication processor 260) may establish at last one protocol data unit (PDU) session before identifying the over-temperature state. The communication processor (for example, at least one of the first communication processor 212, the second communication processor 214, or the integrated communication processor 260) may transmit a PDU session establishment request message to the network, based on a network request (for example, a network connection request) received from an application. The PDU session establishment request message may include the SST. In this case, the communication processor (for example, at least one of the first communication processor 212, the second communication processor 214, or the integrated communication processor 260) may store information on the SST in advance. When the information on the over-temperature state is received from the processor 120, the communication processor (for example, at least one of the first communication processor 212, the second communication processor 214, or the integrated communication processor 260) may identify the prestored service that is being performed, based on the reception.

According to various embodiments, in operation 1605, the electronic device 101 may determine whether an initial carrier bandwidth satisfies a designated condition corresponding to the identified service. If the initial carrier bandwidth satisfies the designated condition corresponding to the identified service (if "Yes" in operation 1605), the electronic device 101 may perform, in operation 1609, a first operation of reducing the number of antennas for reception, without changing the UE capability. For example, when a URLLC service is being performed, the electronic device 101 may determine whether the initial carrier bandwidth is lower than 10 MHz. The electronic device 101 may determine whether the initial carrier bandwidth is lower than 20 MHz when the URLLC service is being performed, in order to stably perform services other than the URLLC. For example, when an eMBB service is being performed, the electronic device 101 may determine whether the initial carrier bandwidth is lower than 20 MHz. The bandwidths described above for comparison between services are illustrative. In addition, the scheme of identifying the provided service, based on the SST, is also illustrative. In an embodiment, the electronic device 101 may determine whether the initial carrier bandwidth satisfies a designated condition corresponding to a data rate in use. For example, the electronic device 101 may identify the data rate in use, and may identify a bandwidth for stably supporting the identified data rate. When the initial carrier bandwidth is lower than the identified bandwidth, the electronic device 101 may perform the first operation of reducing the number of antennas for reception, without changing the UE capability.

According to various embodiments, if the initial carrier band has failed to satisfy the designated condition corresponding to the identified service (if "No" in operation 1605), the electronic device 101 may determine, in operation 1607, whether a current state of at least one parameter of the UE capability satisfies a designated condition. If the current state of the at least one parameter for the UE capability satisfies the designated condition (if "Yes" in operation 1607), the electronic device 101 may perform, in operation 1609, the first operation of reducing the number of antennas for reception, without changing the UE capability. If the current state of the at least one parameter of the UE capability has failed to satisfy the designated condition (if "No" in operation 1607), the electronic device 101 may perform, in operation 1611, the first operation and a second operation of changing at least a part of the UE capability.

Figure 17:
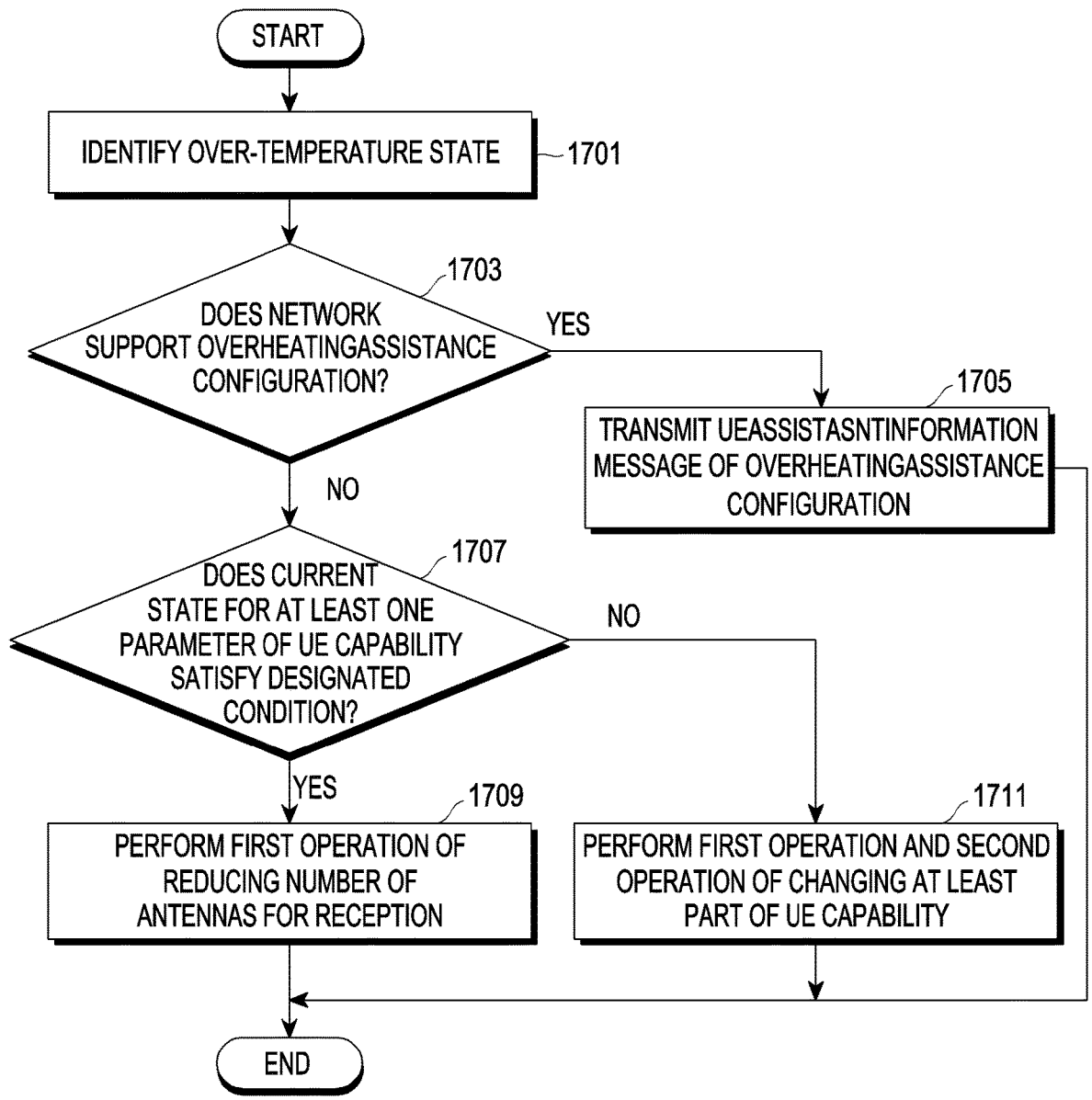
FIG. 17 is a flowchart illustrating an operation method of an electronic device according to various embodiments.

FIG. 17 is a flowchart illustrating an operation method of an electronic device according to various embodiments.

According to various embodiments, in operation 1701, the electronic device 101 (for example, at least one of the processor 120, the first communication processor 212, the second communication processor 214, or the integrated communication processor 260) may identify an over-temperature state. In operation 1703, the electronic device 101 may determine whether the network 300 supports an Overheating Assistance configuration. For example, the electronic device 101 may determine that the network supports the Overheating Assistance configuration when receiving otherconfig including the Overheating Assistance configuration. The electronic device 101 may determine that the network does not support the Over heating Assistance configuration when receiving no otherconfig including the Over heating Assistance configuration.

According to various embodiments, if it is determined that the network 300 supports the Over heating Assistance configuration (if "Yes" in operation 1703), the electronic device 101 may transmit a UE Assistant Information message of the Overheating Assitance configuration in operation 1705. The electronic device 101 may request at least one of reduction of a maximum number of CCs of CA, reduction of a maximum bandwidth, or reduction of a maximum number of MIMO layers, from the network 300, based on the Overheating Assistance configuration. In an example, when the electronic device 101 identifies an over-temperature indication, the electronic device 101 may transmit a UE Assistant Information message including preconfigured information in response to the over-temperature indication. For example, the over-temperature indication may include temperature information received from a temperature sensor, or the processor 120 may generate the over-temperature indication, based on the temperature information. The electronic device 101 may transmit a UE Assistant Information message including the identified information in response to a current temperature (or a range including the current temperature). The network 300 may perform at least one of reduction of a maximum number of CCs of Ca, reduction of a maximum bandwidth, or reduction of a maximum number of MIMO layers, based on the UE Assistant Information message of the received Overheating Assistance configuration. Alternatively, the network 300 may not configure SRS transmission antenna switching for the electronic device 101, based on reception of the UE Assistant Information message of the Overheating Assistance configuration. For example, the network 300 may transmit an RRC reconfiguration message of releasing an SRS-related configuration, to the electronic device 101. The network 300 may perform a control to reduce transmission power of the electronic device 101, based on the reception of the UE Assistance Information message of the Overheating Assistance configuration. For example, the network 300 may perform a transmit power control (TPC) to perform control to reduce transmission power of the electronic device 101. For example, the network 300 may transmit downlink control information (DCI) causing the reduction of the transmission power, to the electronic device 101.

According to various embodiments, if it is determined that the network 300 does not support the Overheating Assistance configuration (if "No" in operation 1703), the electronic device 101 may determine, in operation 1707, whether a current state of at least one parameter of the UE capability satisfies a designated condition. If the designated condition is satisfied (if "Yes" in operation 1707), the electronic device 101 may perform, in operation 1709, a first operation of reducing the number of antennas for reception, without changing the UE capability. If the designated condition has failed to be satisfied (if "No" in operation 1707), the electronic device 101 may perform, in operation 1711, the first operation and a second operation of changing at least a part of the UE capability.

Hereinafter, according to various embodiments, embodiments of controlling transmission power in an over-temperature state will be described in greater detail below with reference to FIGS. 18 to 26.

Figure 18:
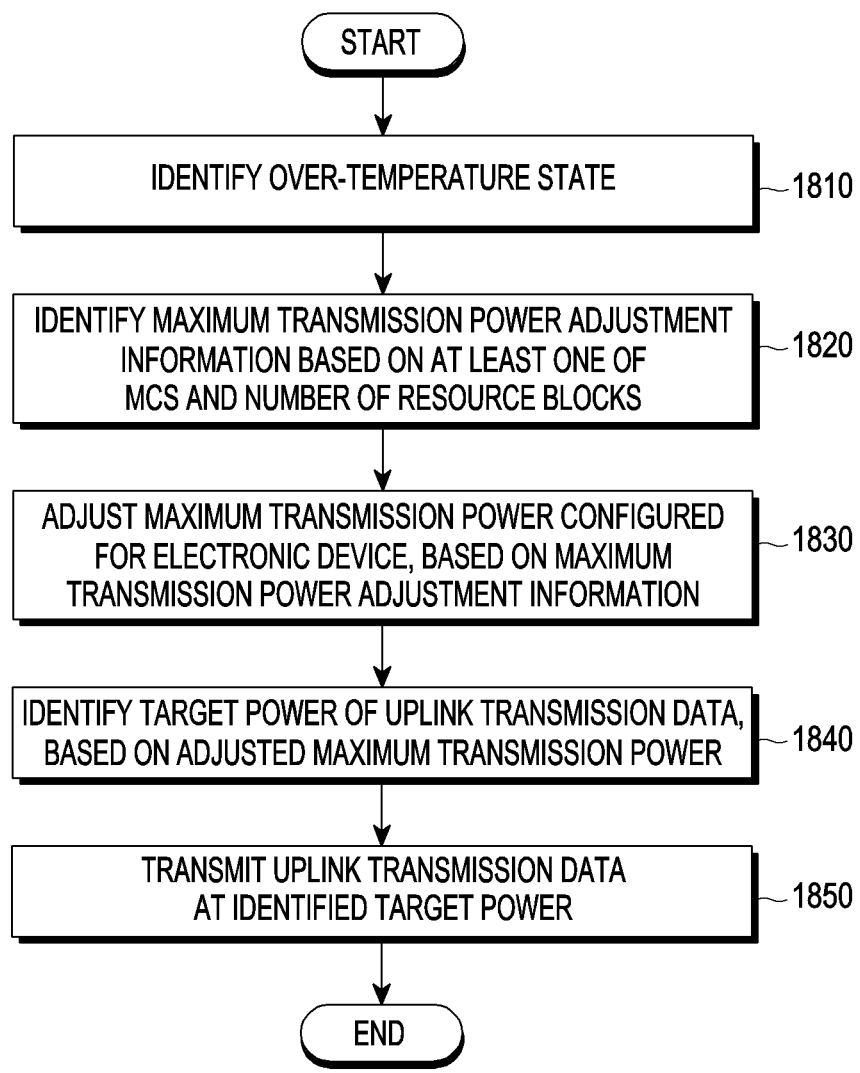
FIG. 18 is a flowchart illustrating an operation method of an electronic device according to various embodiments.

FIG. 18 is a flowchart illustrating an operation method of an electronic device according to various embodiments. Referring to FIG. 18, according to various embodiments, in operation 1810, the electronic device 101 (for example, at least one of the processor 120, the first communication processor 212, the second communication processor 214, or the integrated communication processor 260) may identify an over-temperature state (or information associated with the over-temperature state). For example, the electronic device 101 may identify an indication indicating an over-temperature in operation 1810. For example, the processor 120 may acquire temperature information from the sensor module 176. For example, the processor 120 may determine whether the acquired temperature information corresponds to a designated threshold temperature (for example, 43° C.) or higher. When the acquired temperature information corresponds to the designated threshold temperature or higher, the processor 120 may provide the indication indicating the overtemperature to a communication processor (for example, at least one of the first communication processor 212, the second communication processor 214, or the integrated communication processor 260). In another implementation example, the communication processor (for example, at least one of the first communication processor 212, the second communication processor 214, or the integrated communication processor 260) may acquire temperature information directly from the sensor module 176. In this case, the communication processor (for example, at least one of the first communication processor 212, the second communication processor 214, or the integrated communication processor 260) may determine whether the acquired temperature information corresponds to a designated threshold temperature or higher.

According to various embodiments, the electronic device 101 may identify information associated with the over-temperature state in operation 1810. For example, the electronic device 101 may manage multiple temperature ranges.

The electronic device 101 may identify, as the information associated with the over-temperature state, a temperature range including the measured temperature.

According to various embodiments, in response to the identification of the over-temperature state (or the information associated with the over-temperature state), the electronic device 101 may control transmission power, based on information (e.g., information related to resource allocation) related to a physical (PHY) layer. For example, in response to the identification of the over-temperature state, the electronic device 101 may identify whether the maximum transmission power (Max Tx power) is adjusted and/or the maximum transmission power adjustment information, based on the information related to the physical layer. The information related to the physical layer may include at least one of a modulation and coding scheme (MCS), the number ($N_{RB}$) of resource blocks (RBs), a grant ratio, a block error rate (BLER), a data rate (or throughput (T-put)), a buffer status index (BSI), or a path loss (PL). According to various embodiments, when applying the information related to the physical layer, the electronic device 101 may use an average during a configured unit time (e.g., one second) in the following embodiments.

According to various embodiments, the electronic device 101 may control power of a transmission signal according to target power required from a base station, within the maximum transmission power at which transmission is allowed in the electronic device 101. For example, the electronic device may control the power of the transmission signal to be a minimum value among the target power and the maximum transmission power of the electronic device (UE Tx MAX Power). According to various embodiments, the maximum transmission power of the electronic device (UE Tx MAX Power) may be determined to be a minimum value among the maximum available transmission power (PcMax) of the electronic device in consideration of the characteristics of the electronic device, the maximum transmission power (PeMax) according to a power class configured in the electronic device, and the maximum transmission power (SAR Max Power) in consideration of a specific absorption rate (SAR) backoff event, but there is no limitation in a scheme of the determination. Hereinafter, for convenience of description, it is assumed that the maximum transmission power (UE Tx MAX Power) corresponds to the maximum available transmission power (PcMax) of the electronic device.

According to various embodiments, the target power may change according to a channel state which changes in real time, and may be determined according to a transmitting power control (TPC) by the base station. For example, the electronic device 101 may determine the target power, based on <Equation 1> below according to the standard document 3GPP TS 38.213.

$$P_{0\_PUSCH,b,f,c}(j) + 10\log_{10}(2^{\mu} \cdot M^{PUECH}_{RB,b,f,c}(i)) + \alpha_{b,f,c}(j) \cdot PL_{b,f,c}(q_d) + \Delta_{TF,b,f,c}(i) + f_{b,f,c}(i,l) \quad \text{[Equation 1]}$$

The definition of <Equation 1> may follow 3GPP TS 38.213, wherein $P_{0\_PUSCH,b,f,c}(j)$ may be provided by, for example, p0 for an active uplink bandwidth part (UL BWP) (b) of a carrier (f) of a serving cell (c). $M^{PUSCH}_{RB,b,f,c}(i)$ indicates a bandwidth represented by resource block numbers for transmission occasion (i) on the active UL BWP (b) of the carrier (f) of the serving cell (c), and μ indicates subcarrier spacing (SCS). $\alpha_{b,f,c}(j)$ may be provided by an alpha for the active UL BWP of the carrier (f) of the serving cell (c). $PL_{b,f,c}(q_d)$ indicates a downlink path loss predicted in a dB unit by a user equipment (UE) using an RS resource index ($q_d$), for the active downlink BWP (DL BWP) of the serving cell (c). $f_{b,f,c}(i)$ may follow 3GPP TS 38.213, and may correspond to a value adjustable by downlink control information (DCI) transmitted from the base station to the electronic device. According to various embodiments, the electronic device 101 may configure the target power determined based on <Equation 1> above to be determined within a range not departing from the maximum transmission power of the electronic device. For example, when the maximum transmission power of the electronic device is configured as 20 dBm and the target power determined based on <Equation 1> is 21 dBm, the transmission power for uplink data transmission in the electronic device 101 may be limited to 20 dBm.

According to various embodiments, in operation 1810, the electronic device 101 may identify the maximum transmission power adjustment information, based on the information (e.g., information related to resource allocation) related to the physical (PHY) layer, in response to the identification of the over-temperature state (or information associated with the over-temperature state). For example, the electronic device 101 may identify the maximum transmission power adjustment information, based on at least one of the MCS and the number of resource blocks, in operation 1820. For example, the electronic device 101 may identify information relating to the MCS, and identify the maximum transmission power adjustment information, based on an MCS index. The maximum transmission power adjustment information may include an adjustment value (γ) of the maximum transmission power.

The MCS index may be represented as shown in, but is not limited to, <Table 1> below.

TABLE 1

| MCS Index | Modulation Order | Spectral efficiency | Target code Rate x [1024] |
|---|---|---|---|
| 0 | 2 | 0.2344 | 120 |
| 1 | 2 | 0.377 | 193 |
| 2 | 2 | 0.6016 | 308 |
| 3 | 2 | 0.877 | 449 |
| 4 | 2 | 1.1758 | 602 |
| 5 | 4 | 1.4766 | 378 |
| 6 | 4 | 1.6953 | 434 |
| 7 | 4 | 1.9141 | 490 |
| 8 | 4 | 2.1602 | 553 |
| 9 | 4 | 2.4063 | 616 |
| 10 | 4 | 2.5703 | 658 |
| 11 | 6 | 2.7305 | 466 |
| 12 | 6 | 3.0293 | 517 |
| 13 | 6 | 3.3223 | 567 |
| 14 | 6 | 3.6094 | 616 |
| 15 | 6 | 3.9023 | 666 |
| 16 | 6 | 4.2129 | 719 |
| 17 | 6 | 4.5234 | 772 |
| 18 | 6 | 4.8164 | 822 |
| 19 | 6 | 5.1152 | 873 |
| 20 | 8 | 5.332 | 682.5 |
| 21 | 8 | 5.5547 | 711 |
| 22 | 8 | 5.8906 | 754 |
| 23 | 8 | 6.2266 | 797 |
| 24 | 8 | 6.5703 | 841 |
| 25 | 8 | 6.9141 | 885 |
| 26 | 8 | 7.1602 | 916.5 |
| 27 | 8 | 7.4063 | 948 |
| 28 | 2 | | reserved |
| 29 | 4 | | reserved |
| 30 | 6 | | reserved |

According to various embodiments, the electronic device 101 may map at least one MCS index or an MCS index range to a maximum transmission power adjustment value (γ) and apply the same. For example, the electronic device 101 may configure one MCS index to be mapped to a specific maximum transmission power adjustment value (γ), or may be configure multiple MCS indices to be mapped to a specific maximum transmission power adjustment value (γ). In another example, the electronic device 101 may map a range or an interval including at least one MCS index to the specific maximum transmission power adjustment value (γ) and store the same. For example, when the MCS index range corresponds to 3 to 10, the maximum transmission power adjustment value (γ) may be configured as −1 so that configuration is made to adjust the currently configured maximum transmission power by −1 dB, when the MCS index range corresponds to 11 to 19, the maximum transmission power adjustment value (γ) may be configured as −2 so that configuration is made to adjust the currently configured maximum transmission power by −2 dB, and when the MCS index range corresponds to 20 to 27, the maximum transmission power adjustment value (γ) may be configured as −3 so that configuration is made to adjust the currently configured maximum transmission power by −3 dB. For example, in a case where the maximum transmission power (e.g., an initial value of the maximum transmission power or a current value of the maximum transmission power) is configured as 23 dBm, when the adjustment is made by −1 dB according to the MCS index, the maximum transmission power may be adjusted to 22 dBm, when the adjustment is made by −2 dB according to the MCS index, the maximum transmission power may be adjusted to 21 dBm, and when the adjustment is made by −3 dB according to the MCS index, the maximum transmission power may be adjusted to 20 dBm.

According to various embodiments, the electronic device 101 may identify information on the number of resource blocks allocated to the electronic device, and identify the maximum transmission power adjustment information, based on the identified number of resource blocks. For example, the electronic device 101 may map each resource block number or a resource block number range to a maximum transmission power adjustment value (γ) and apply the same. For example, when the resource block number corresponds to 0 to 30, the maximum transmission power adjustment value (γ) may be configured as −1 so that configuration is made to adjust the currently configured maximum transmission power by −1 dB, when the resource block number corresponds to 31 to 60, the maximum transmission power adjustment value (γ) may be configured as −2 so that configuration is made to adjust the currently configured maximum transmission power by −2 dB, and when the resource block number exceeds 60, the maximum transmission power adjustment value (γ) may be configured as −3 so that configuration is made to adjust the currently configured maximum transmission power by −3 dB. For example, in a case where the maximum transmission power (e.g., an initial value of the maximum transmission power or a current value of the maximum transmission power) is configured as 23 dBm, when the adjustment is made by −1 dB according to the resource block number, the maximum transmission power may be adjusted to 22 dBm, when the adjustment is made by −2 dB according to the resource block number, the maximum transmission power may be adjusted to 21 dBm, and when the adjustment is made by −3 dB according to the resource block number, the maximum transmission power may be adjusted to 20 dBm.

Figure 20:
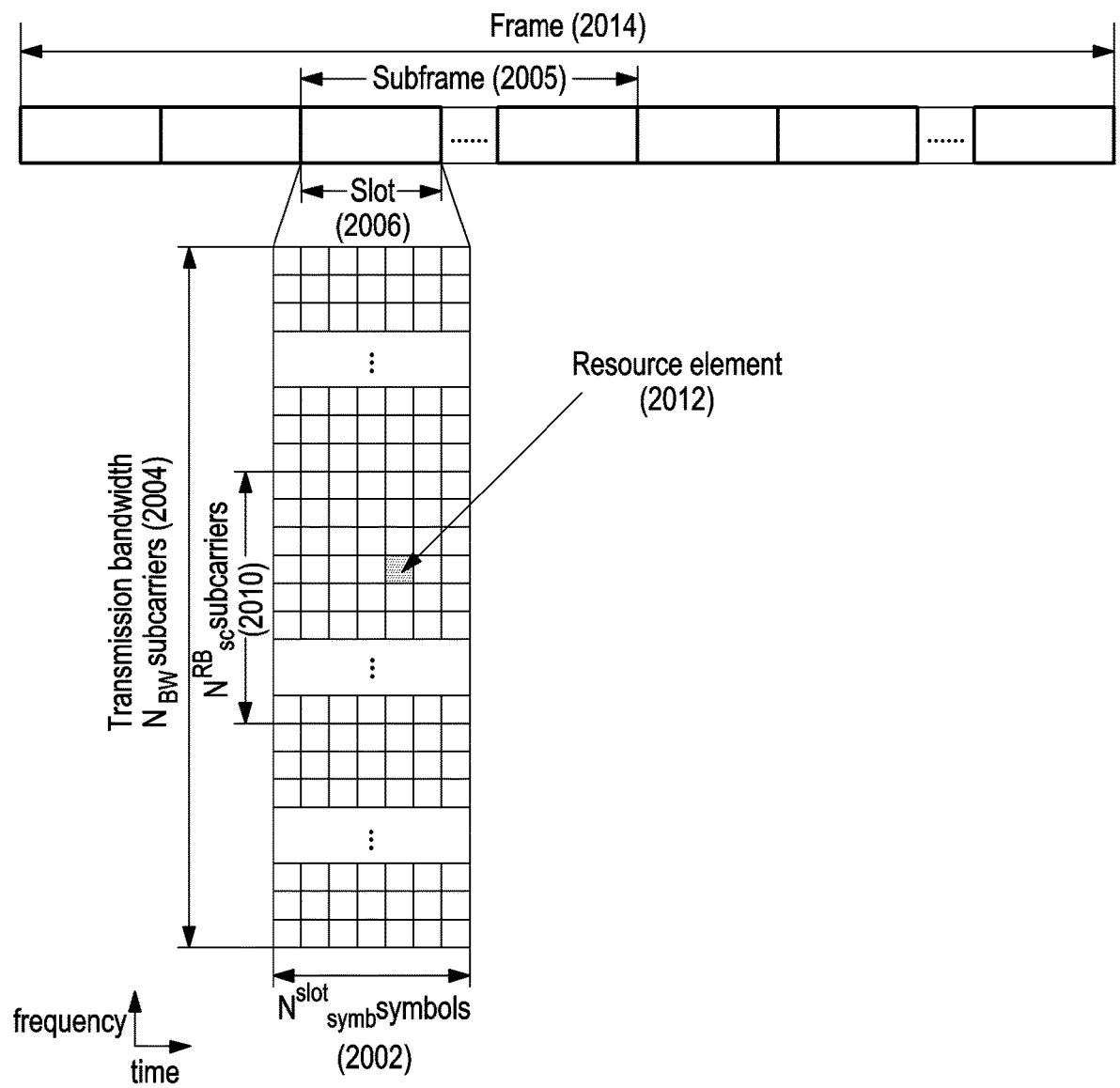
FIG. 20 illustrates a structure of a resource block allocated in an electronic device according to various embodiments.

FIG. 20 illustrates a structure of a resource block allocated in an electronic device according to various embodiments. Referring to FIG. 20, a horizontal axis represents a time domain and a vertical axis represents a frequency domain. A minimum transmission unit in the time domain in the 5G system is an orthogonal frequency division multiplexing (OFDM) symbol, wherein $N_{symb}^{slot}$ symbols 2002 may be gathered to form one slot 2006, and $N_{slot}^{subframe}$ slots may be gathered to form one subframe 2005. The length of the subframe is 1.0 ms, and 10 subframes may be gathered to form one frame 2014 of 10 ms. A minimum transmission unit in the frequency domain is a subcarrier, wherein the whole system transmission bandwidth includes a total of NBw subcarriers 2004.

A basic unit of a resource in the time-frequency domain is a resource element (RE) 2012 and may be represented by an OFDM symbol index and a subcarrier index. A resource block (RB) may be defined by $N_{sc}^{RB}$ consecutive subcarriers 2010 in the frequency domain. In the 5G system, $N_{sc}^{RB}=12$, and a data rate may increase in proportion to the number of RBs scheduled for the electronic device 101. In the 5G system, the base station may perform data mapping in units of RBs, and may perform scheduling for RBs of one slot for the electronic device 101. For example, in the 5G system, a basic time unit for performing scheduling may be a slot, and a base frequency unit for performing scheduling may be an RB. FIG. 20 illustrates an RB in the 5G system, but various embodiments are not limited to the 5G system, and may be applied to various communication systems including the LTE system in the same or similar manner According to various embodiments, in response to the identification of the over-temperature state (or the information associated with the over-temperature state), the electronic device 101 may identify maximum transmission power adjustment information, based on the above-described MCS and number of resource blocks in operation 1820. For example, the electronic device 101 may identify the maximum transmission power adjustment information in consideration of the MCS and the number of resource blocks. For example, according to the embodiment above, the electronic device 101 may identify maximum transmission power adjustment information (e.g., a maximum transmission power adjustment value (γ)) according to the mapping table in which both the MCS and the resource block are considered as shown in <Table 2> below.

TABLE 2

|  |  | Adjustment value (γ) according to number of resource blocks | | |
|---|---|---|---|---|
|  |  | 1-30 | 31-60 | 61 or larger |
| MCS Index | 3-10 | +1 | 0 | −1 |
|  | 11-19 | 0 | −1 | −2 |
|  | 20-27 | −1 | −2 | −3 |

According to various embodiments, in operation 1830, the electronic device 101 may adjust maximum transmission power configured for the electronic device, based on the identified maximum transmission power adjustment information. For example, referring to <Table 2>, when the MCS index corresponds to 11-19 and the number of resource block corresponds to 31-60, an adjustment value (γ) of the maximum transmission power may be configured as −1 so that the maximum transmission power is adjusted by −1 dB. For example, when the current maximum transmission power or the initial value of the maximum transmission power corresponds to 23 dBm, the maximum transmission power may be configured or adjusted to 22 dBm according to the MCS index and the number of resource blocks.

According to various embodiments, in operation 1840, the electronic device 101 may identify target power of uplink (UL) transmission data, based on the adjusted maximum transmission power. For example, the target power of the uplink transmission data may be configured with a value which allows the target power determined based on <Equation 1> above not to exceed the adjusted maximum transmission power. For example, when the target power determined based on <Equation 1> above corresponds to 23 dBm and the maximum transmission power is adjusted from 23 dBm to 22 dBm, the final target power of the uplink transmission data may be configured or identified as 22 dBm.

According to various embodiments, in operation 1850, the electronic device 101 may transmit the uplink transmission data at the target power configured or identified based on the adjusted maximum transmission power.

According to various embodiments, in the embodiment above, the adjustment value (γ) of the maximum transmission power is used to adjust the maximum transmission power, but according to an embodiment, the adjustment value (γ) of the maximum transmission power may be used to adjust the target power in <Equation 1> above. For example, referring to <Table 2>, when the MCS index correspond to 11-19 and the number of resource block corresponds to 31-60, the adjustment value (γ) of the maximum transmission power may be configured as −1 so that the maximum transmission power is adjusted by −1 dB.

According to various embodiments, the electronic device 101 may determine whether to apply the maximum transmission power adjustment in operations 1820 and 1830, based on the information (e.g., information related to resource allocation) related to the physical (PHY) layer.

For example, when the path loss has a value equal to or greater than a configured value (30 dB), it is determined that the electronic device 101 is positioned in a cell edge area or in a week electric field, and thus, the above-described maximum transmission power adjustment may not be applied. For example, even though the maximum transmission power is adjusted from 23 dBm to 22 dBm according to the MCS and/or the number of resource blocks, the maximum transmission power may be configured not to decrease any more, or the maximum transmission power may be adjusted to increase when the path loss has a value equal to or greater than the configured value.

According to various embodiments, when adjusting the maximum transmission power, the electronic device 101 may configure the maximum transmission power not to exceed a configured maximum value and not to be lower than a configured minimum value. For example, when the maximum value of the maximum transmission power is configured as 25 dBm and the minimum value is configured as 10 dBm, the electronic device 101 may control the maximum transmission power not to exceed the configured maximum value, 25 dBm, even when the maximum transmission power increases according to the MCS and/or the number of resource blocks, and may control the maximum transmission power not to be lower than the configured minimum value, 10 dBm, even when the maximum transmission power decreases.

According to various embodiments, when a grant ratio is equal to or higher than a configured value, the electronic device 101 may not apply the above-described maximum transmission power adjustment. For example, when the grant ratio is 50% or higher, the electronic device 101 may control the maximum transmission power not to decrease more from the currently configured value, or may control the maximum transmission power not to decrease by a configured value (e.g., 3 d B) or greater from the initial value of the maximum transmission power.

Figure 21:
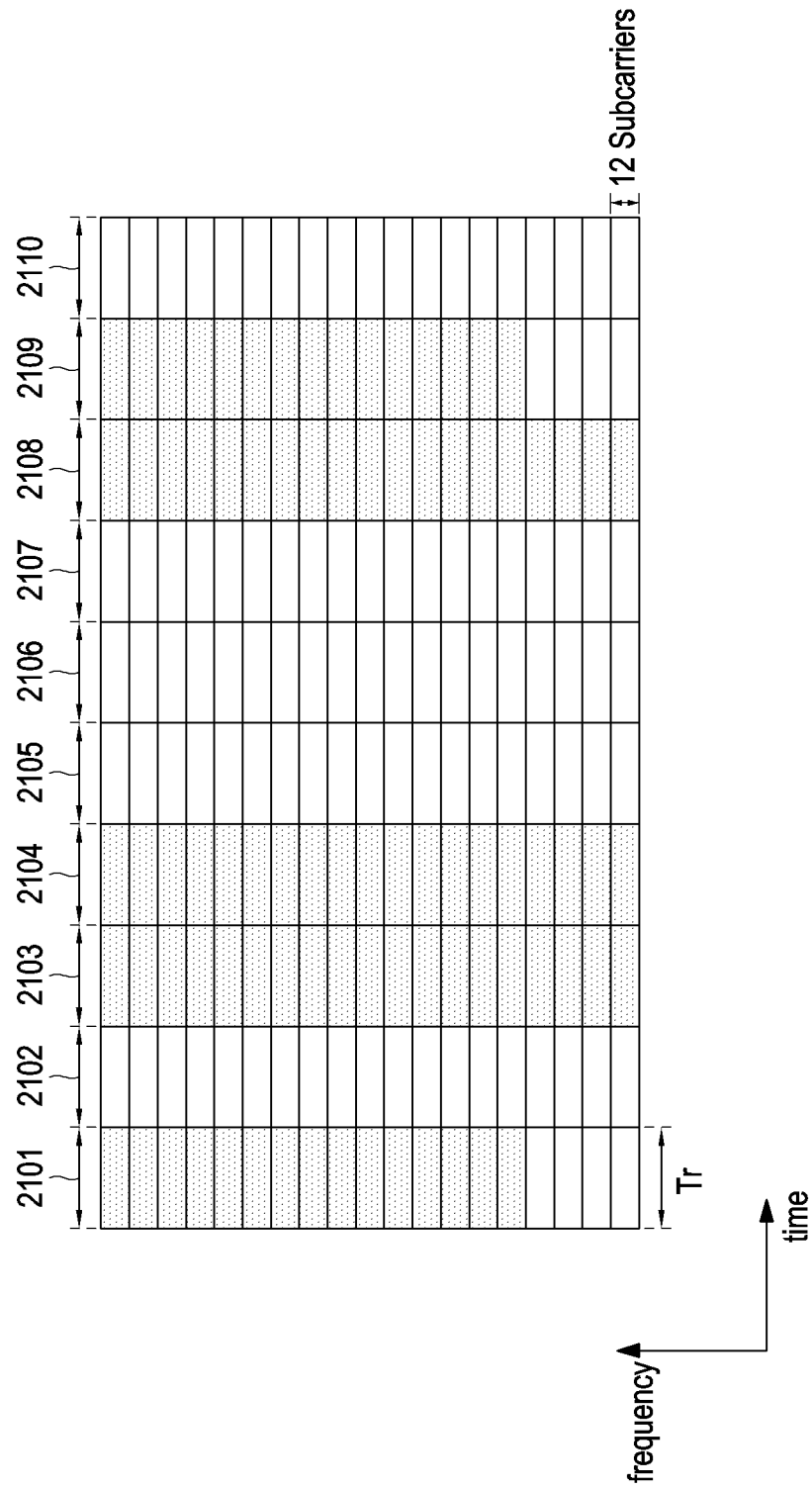
FIG. 21 illustrates the concept of a grant ratio allocated to an electronic device according to various embodiments.

According to various embodiments, the grant ratio may be determined as shown in FIG. 21. Referring to FIG. 21, the grant ratio may indicate a ratio of resource blocks allocated in a time domain. In FIG. 21, a horizontal axis represents a time domain and a vertical axis represents a frequency domain. One square in FIG. 21 may indicate, but is not limited to, one resource block (RB). For example, one square in the horizontal axis in FIG. 21 may indicate, but is not limited to, one OFDM symbol, two or more OFDM symbols, or one slot including multiple OFDM symbols. In the description below, for convenience of description, in FIG. 21, it is assumed that one square in the horizontal axis indicates one slot including 14 OFDM symbols and one square in the vertical axis includes 12 subcarriers. For example, in FIG. 21, 15 RBs of a total of 19 RBs may be allocated for data transmission in the electronic device 101 to a first slot 2101. No RB may be allocated to a second slot 2102, a third slot 2103, a sixth slot 2106, a seventh slot 2107, and a tenth slot 2110. All of a total of 19 RBs may be allocated to a fourth slot 2104, a fifth slot 2105, and an eighth slot 2108. Five RBs may be allocated to a ninth slot 2109. Referring to FIG. 21, at least one RB is allocated to five slots out of a total of 10 slots, and thus, a grant ratio may be calculated as 50% (5/10). According to various embodiments, in a case where the grant ratio is 50% or higher, when the maximum transmission power is reduced by 3 dB or more, a twofold increase in the grant ratio is required, it is thus difficult to additionally allocate a resource block by a base station, and accordingly, the electronic device 101 may control the maximum transmission power not to additionally decrease in order to secure a transmission speed (e.g., a data rate) for the electronic device.

According to various embodiments, when a BSI has a value equal to or greater than a configured value, the electronic device 101 may not apply the above-described maximum transmission power adjustment. The BSI may refer, for example, to an index configured in response to the size of a buffer during a predetermined time in a memory buffer of the electronic device 101, and may be configured as shown in <Table 3> below, but is not limited thereto.

TABLE 3

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |

TABLE 3-continued

| Index | Buffer Size (BS) value [bytes] |
|---|---|
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

For example, when the BSI has a value equal to or greater than a specific value, the electronic device 101 may control the maximum transmission power not to decrease more from the currently configured value, or may control the maximum transmission power not to decrease by a configured value (e.g., 3 d B) or greater from the initial value of the maximum transmission power. The BSI may be included in a buffer status report (BSR) transmitted from the electronic device 101 to the network, and transmitted. For example, the electronic device 101 may transmit the BSR including the BSI to the network through a medium access control (MAC) control element (CE). According to various embodiments, the electronic device 101 may identify a BSI included in a BSR to be transmitted to the network, and may control the maximum transmission power not to decrease when the BSI has a value equal to or greater than a configured value. For example, referring to <Table 3> above, when the BSI corresponds to 50, a buffer size may correspond to 19325 bytes to 22624 bytes, and the electronic device 101 may control the maximum transmission power not to decrease in order to secure transmission of data corresponding to the buffer size.

According to various embodiments, when a BLER is equal to or greater than a configured value, the electronic device 101 may not apply the above-described maximum transmission power adjustment. For example, when the BLER is 10% or higher, the electronic device 101 may control the maximum transmission power not to decrease more from the currently configured value.

Figure 19:
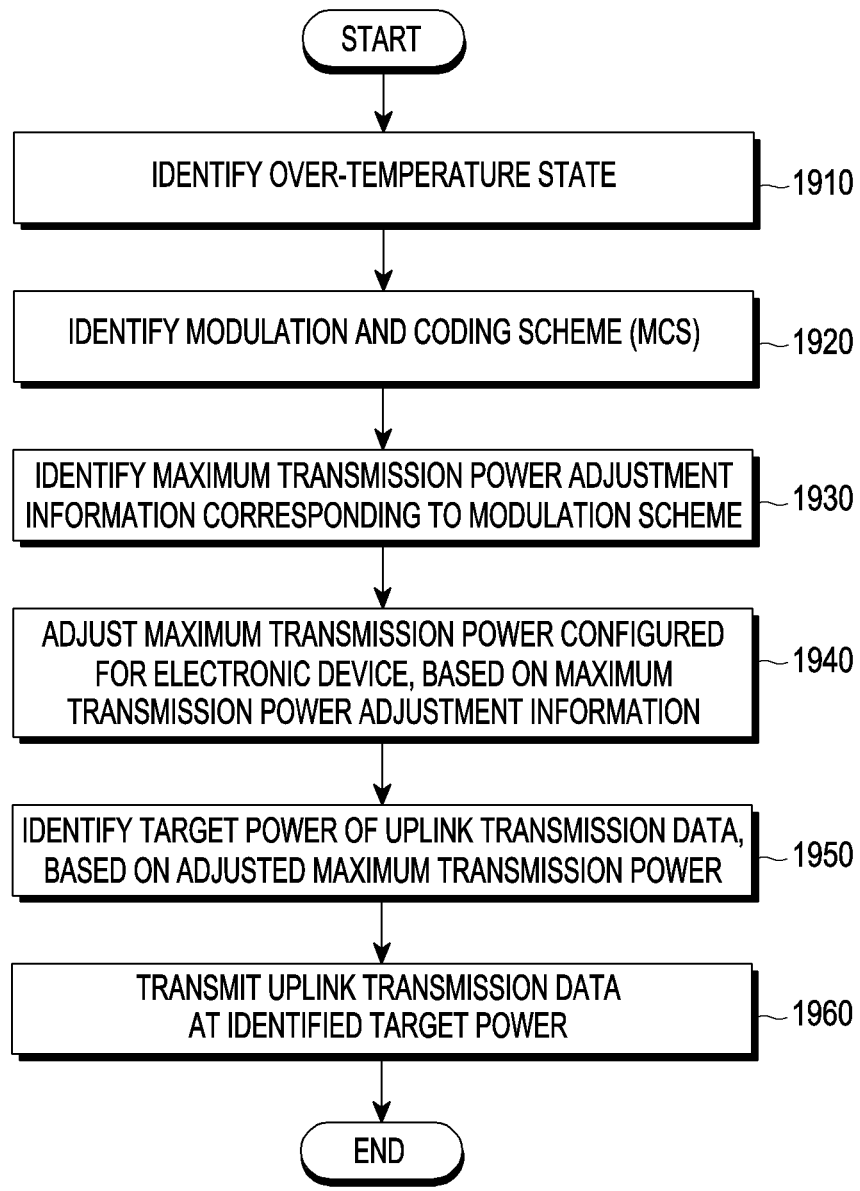
FIG. 19 is a flowchart illustrating an operation method of an electronic device according to various embodiments.

FIG. 19 is a flowchart illustrating an operation method of an electronic device according to various embodiments. Referring to FIG. 19, according to various embodiments, in operation 1910, the electronic device 101 (for example, at least one of the processor 120, the first communication processor 212, the second communication processor 214, or the integrated communication processor 260) may identify an over-temperature state (or information associated with the over-temperature state). For example, the electronic device 101 may identify an indication indicating an over-temperature in operation 1910. For example, the processor 120 may acquire temperature information from the sensor module 176. For example, the processor 120 may determine whether the acquired temperature information corresponds to a designated threshold temperature (for example, 43° C.) or higher. When the acquired temperature information corresponds to the designated threshold temperature or higher, the processor 120 may provide the indication indicating the over temperature to a communication processor (for example, at least one of the first communication processor 212, the second communication processor 214, or the integrated communication processor 260). In another implementation example, the communication processor (for example, at least one of the first communication processor 212, the second communication processor 214, or the integrated communication processor 260) may acquire temperature information directly from the sensor module 176. In this case, the communication processor (for example, at least one of the first communication processor 212, the second communication processor 214, or the integrated communication processor 260) may determine whether the acquired temperature information corresponds to a designated threshold temperature or higher.

According to various embodiments, the electronic device 101 may identify information associated with the over-temperature state in operation 1910. For example, the electronic device 101 may manage multiple temperature ranges. The electronic device 101 may identify, as the information associated with the over-temperature state, a temperature range including the measured temperature.

According to various embodiments, in response to the identification of the over-temperature state (or the information associated with the over-temperature state), the electronic device 101 may control transmission power, based on an MCS. For example, in response to the identification of the over-temperature state, the electronic device 101 may identify the maximum transmission power adjustment information, based on the MCS. According to various embodiments, when applying the MCS, the electronic device 101 may use an average during a configured unit time (e.g., one second) in the following embodiments.

According to various embodiments, the electronic device 101 may control power of a transmission signal according to target power required from a base station, within the maximum transmission power at which transmission is allowed in the electronic device 101. For example, the electronic device may control the power of the transmission signal to be a minimum value among the target power and the maximum transmission power of the electronic device (UE Tx MAX Power). According to various embodiments, the maximum transmission power of the electronic device (UE Tx MAX Power) may be determined to be a minimum value among the maximum available transmission power (PcMax) of the electronic device in consideration of the characteristics of the electronic device, the maximum transmission power (PeMax) according to a power class configured in the electronic device, and the maximum transmission power (SAR Max Power) in consideration of a specific absorption rate (SAR) backoff event, but there is no limitation in a scheme of the determination. Hereinafter, for convenience of description, it is assumed that the maximum transmission power (UE Tx MAX Power) corresponds to the maximum available transmission power (PcMax) of the electronic device.

According to various embodiments, the target power may change according to a channel state which changes in real time, and may be determined according to a transmitting power control (TPC) by the base station. For example, the electronic device 101 may determine the target power, based on <Equation 1> according to the standard document 3GPP TS 38.213, as described in FIG. 18 above.

According to various embodiments, in response to the identification of the over-temperature state (or the information associated with the over-temperature state) in operation 1910, the electronic device 101 may identify information relating to the MCS in operation 1920. According to various embodiments, in operation 1930, the electronic device 101 may identify the maximum transmission power adjustment information corresponding to a modulation scheme identified from the information relating to the MCS. The modulation scheme may correspond to the modulation order shown in <Table 1> above, but is not limited thereto. For example, when the modulation scheme is QPSK, the modulation order corresponds to 2, when the modulation scheme is 16 QAM, the modulation order corresponds to 4, when the modulation scheme is 64 QAM, the modulation order corresponds to 6, and when the modulation scheme is 256 QAM, the modulation order corresponds to 8.

According to various embodiments, the electronic device 101 may map each modulation scheme to a maximum transmission power adjustment value and apply the same. For example, when the modulation scheme corresponds to QPSK, the maximum transmission power may be configured to be maintained without adjustment, when the modulation scheme corresponds to 16 QAM, configuration may be made so as to adjust the currently configured maximum transmission power by −1 dB, when the modulation scheme corresponds to 64 QAM, configuration may be made so as to adjust the currently configured maximum transmission power by −2 dB, and when the modulation scheme corresponds to 128 QAM, configuration may be made so as to adjust the currently configured maximum transmission power by −3 dB.

According to various embodiments, in operation 1930, the electronic device 101 may identify the maximum transmission power adjustment information configured for the identified modulation scheme. In operation 1940, the electronic device 101 may adjust the maximum transmission power configured for the electronic device, based on the maximum transmission power adjustment information. For example, in a case where the maximum transmission power (e.g., an initial value of the maximum transmission power or a current value of the maximum transmission power) is configured as 23 dBm, when the adjustment is made by −1 dB according to the modulation scheme, the maximum transmission power may be adjusted to 22 dBm, when the adjustment is made by −2 dB according to the modulation scheme, the maximum transmission power may be adjusted to 21 dBm, and when the adjustment is made by −3 dB according to the modulation scheme, the maximum transmission power may be adjusted to 20 dBm.

According to various embodiments, in operation 1950, the electronic device 101 may identify target power of uplink (UL) transmission data, based on the adjusted maximum transmission power. For example, the target power for the uplink transmission power may configured with a value which allows the target power determined based on <Equation 1> above not to exceed the adjusted maximum transmission power. For example, when the target power determined based on <Equation 1> above corresponds to 23 dBm and the maximum transmission power is adjusted from 23 dBm to 22 dBm, the final target power of the uplink transmission data may be configured or identified as 22 dBm.

According to various embodiments, in operation 1960, the electronic device 101 may transmit the uplink transmission data at the target power configured or identified based on the adjusted maximum transmission power.

According to various embodiments, the electronic device 101 may determine whether to apply the maximum transmission power adjustment in operations 1920 and 1940, based on the information (e.g., information related to resource allocation) related to the physical (PHY) layer. The same or similar methods described in FIG. 18 above may be applied to various embodiments of determining whether to apply the maximum transmission power adjustment to the electronic device 101.

Figure 22:
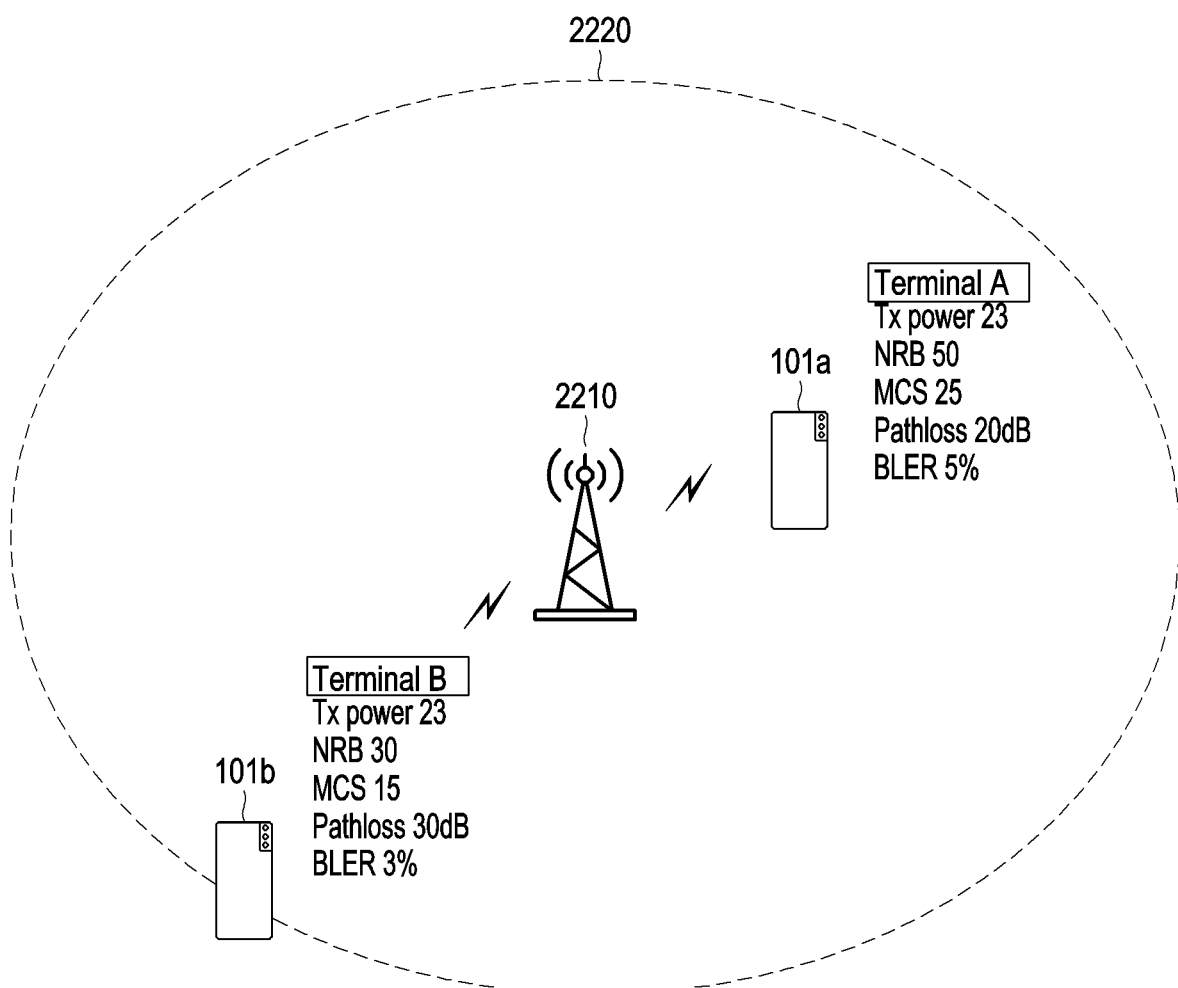
FIG. 22 illustrates an electronic device and a position in a cell according to various embodiments.

FIG. 22 illustrates an electronic device and a position in a cell according to various embodiments. Referring to FIG. 22, a base station 2210 may communication with at least one electronic device (e.g., terminal A 101a or terminal B 101b) positioned in a cell 2220 covered by the base station 2210. The distance between terminal A 101a and the base station 2210 may be relatively closer than the distance between terminal B 101b and the base station 2210. For example, even though terminal A 101a and terminal B 101b transmit data at the same target power, strengths of signals received by terminal A 101a and terminal B 101b from the base station 2210 are different, and thus resource allocations are also different.

For example, as shown in FIG. 22, terminal A 101a may transmit uplink data at target power of 23 dBm, and the base station 2210 may allocate 50 resource blocks and an MCS index corresponding to 25 to terminal A 101a. A path loss between the base station 2210 and terminal A 101a may be obtained as 20 dB, and a BLER may be measured as 5%. In comparison with terminal A 101a, terminal B 101b may transmit uplink data at target power of 23 dBm, and the base station 2210 may allocate 30 resource blocks and an MCS index corresponding to 15 to terminal B101b. A path loss between the base station 2210 and terminal B 101b may be obtained as 30 dB, and a BLER may be measured as 3%. According to various embodiments, even though terminal A 101a and terminal B 101b transmit uplink data at the same target power, terminal A 101a is relatively closer to the base station 2210, and thus the path loss may be lower. The base station 2210 may allocate relatively more resources or allocation a higher modulation scheme to terminal A 101a compared to terminal B 101b so as to provide a higher data rate.

According to various embodiments, unlike terminal B 101b, since terminal A 101a is not positioned at the cell edge, the path loss is relatively not high, and thus, as described above, when heat is generated in terminal A 101a, a control may be performed to reduce transmission power, based on information (e.g., information related to resource allocation) related to a physical (PHY) layer. For example, in response to the identification of the over-temperature state, terminal A 101a may adjust maximum transmission power, based on the MCS index (e.g., 25) and/or the number (e.g., 50) of resource blocks. For example, when the overtemperature state is identified, terminal A 101a may adjust the maximum transmission power by applying <Table 2> above. In a case of applying <Table 2> above, for terminal A 101a, the MCS index corresponds to 25 and the number of resource blocks corresponds to 50, and thus, the maximum transmission power may be adjusted by −2 dB. For example, in a case where current maximum transmission power or an initial value of maximum transmission power of terminal A 110a is 23 dBm and target power is 23 dBm, when the maximum transmission power is adjusted by −2 dB from 23 dBm and is configured to be 21 dBm, the target power may be reduced to 21 dBm. As terminal A 101a transmits uplink data at the relatively reduced target power, the BLER of data received from the base station 2210 may increase, and accordingly, as the BLER increases, the base station 2210 may change, with respect to terminal A 101a, the MCS index or reduce the number of allocated resource blocks. According to various embodiments, when a data rate equal to or greater than a value to which quality of service (QoS) for a service provided to terminal A 101a is configured should be secured, the base station 2210 may increase a grant ratio instead of adjusting the MCS index or the number of allocated resource blocks, with respect to terminal A 101a.

Figure 23:
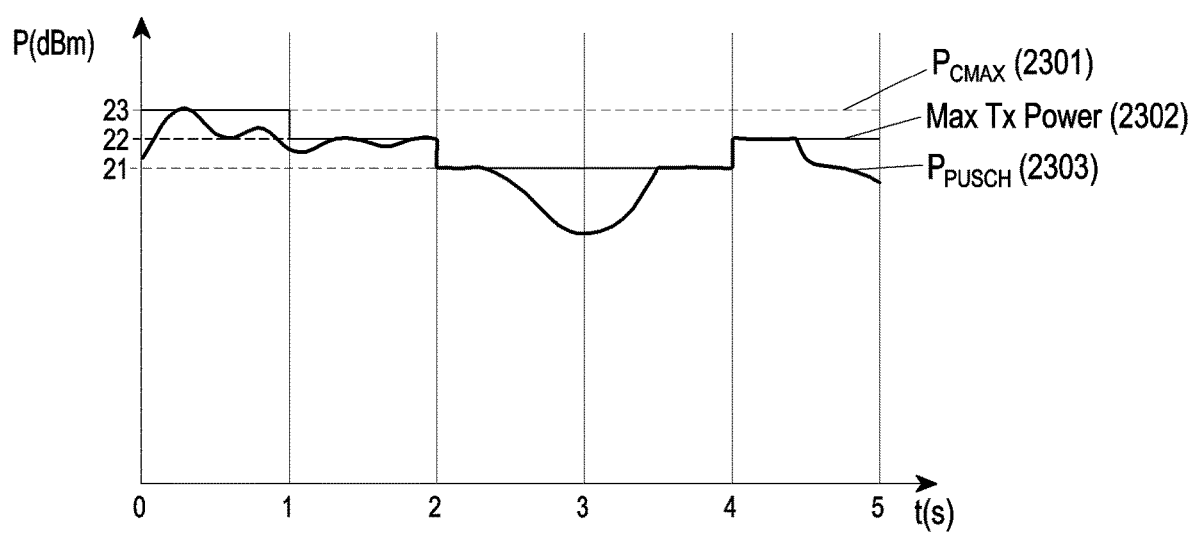
FIG. 23 is a graph illustrating a comparison of power according to various embodiments.

FIG. 23 is a graph illustrating a comparison of power according to various embodiments. Referring to FIG. 23, the electronic device 101 may control power of a transmission signal according to target power required from a base station, within the maximum transmission power at which transmission is allowed in the electronic device 101. For example, the electronic device may control the power of the transmission signal to be a minimum value among the target power and the maximum transmission power of the electronic device (UE Tx MAX Power). According to various embodiments, the maximum transmission power of the electronic device (UE Tx MAX Power) may be determined to be a minimum value among the maximum available transmission power (PcMax) of the electronic device in consideration of the characteristics of the electronic device, the maximum transmission power (PeMax) according to a power class configured in the electronic device, and the maximum transmission power (SAR Max Power) in consideration of a specific absorption rate (SAR) backoff event, but there is no limitation in a scheme of the determination. In FIG. 23, for convenience of description, it is assumed that the maximum transmission power (UE Tx MAX Power) corresponds to the maximum available transmission power (PcMax ($P_{CMAX}$)) 2301 of the electronic device.

According to various embodiments, an initial value or a reference value of the maximum transmission power (Max Tx Power) 2302 may be configured as the maximum available transmission power ($P_{CMAX}$) of the electronic device, and the maximum transmission power 2302 may be adjusted based on the MCS and/or the resource block number at configured time interval (e.g., one second). For example, the maximum transmission power 2302 may be configured with 23 dBm which is identical or similar to the maximum available transmission power (PcMax ($P_{CMAX}$)) 2301 of the electronic device, as the initial value. According to various embodiments, the electronic device 101 may configure the maximum transmission power 2302 to 22 dBm obtained by making adjustment by −1 dB, after one second, based on the identification of the over-temperature state. When the over-temperature state is continuously identified, the electronic device 101 may adjust the maximum transmission power 2302 to 21 dBm after two seconds. According to various embodiments, after three seconds, the electronic device 101 may configure the maximum transmission power 2302 with a value identical or similar to the previous value, 21 dBm, and when the electronic device 101 escapes from the over-temperature state after four seconds, the electronic device 101 may adjust the maximum transmission power 2302 to 22 dBm by increasing 1 dBm.

According to various embodiments, the electronic device 101 may configure uplink data transmission power ($P_{PUSCH}$) 2303, based on the adjusted maximum transmission power 2302. For example, as shown in FIG. 23, the uplink data transmission power 2303 may be changed according to a channel state which changes in real time, as described above, and may be determined according to a transmitting power control (TPC) by the base station. For example, the electronic device 101 may determine the target power, based on <Equation 1> according to the standard document 3GPP TS 38.213, as described in FIG. 18 above. According to various embodiments, the electronic device 101 may transmit uplink data at the uplink data transmission power 2303 determined based on the target power obtained according to <Equation 1> above and the adjusted maximum transmission power 2302. For example, the electronic device 101 may determine the uplink data transmission power 2303 with a smaller value (e.g., a minimum value) among values of the target power obtained according to <Equation 1> above and the adjusted maximum transmission power 2302, so as to configure the uplink data transmission power 2303 not to exceed the adjusted maximum transmission power 2302.

According to various embodiments, the electronic device 101 may transmit, to a base station (e.g., the base station 2210 of FIG. 22), information on a difference between the adjusted maximum transmission power 2302 and the determined uplink data transmission power 2303 by including the same in a power headroom report (PHR). For example, the electronic device 101 may transmit the PHR to the network through a medium access control (MAC) control element (CE). The base station may perform a transmission power control for the electronic device 101, based on the PHR transmitted from the electronic device 101. For example, when a result of the identification of the PHR shows that there is no difference between the adjusted maximum transmission power 2302 and the determined uplink data transmission power 2303, the current transmission power 2303 corresponds to the maximum transmission power, and thus, the base station may perform a control to maintain or reduce the target power of the electronic device 101, instead of performing a control to increase the target power.

Figure 24:
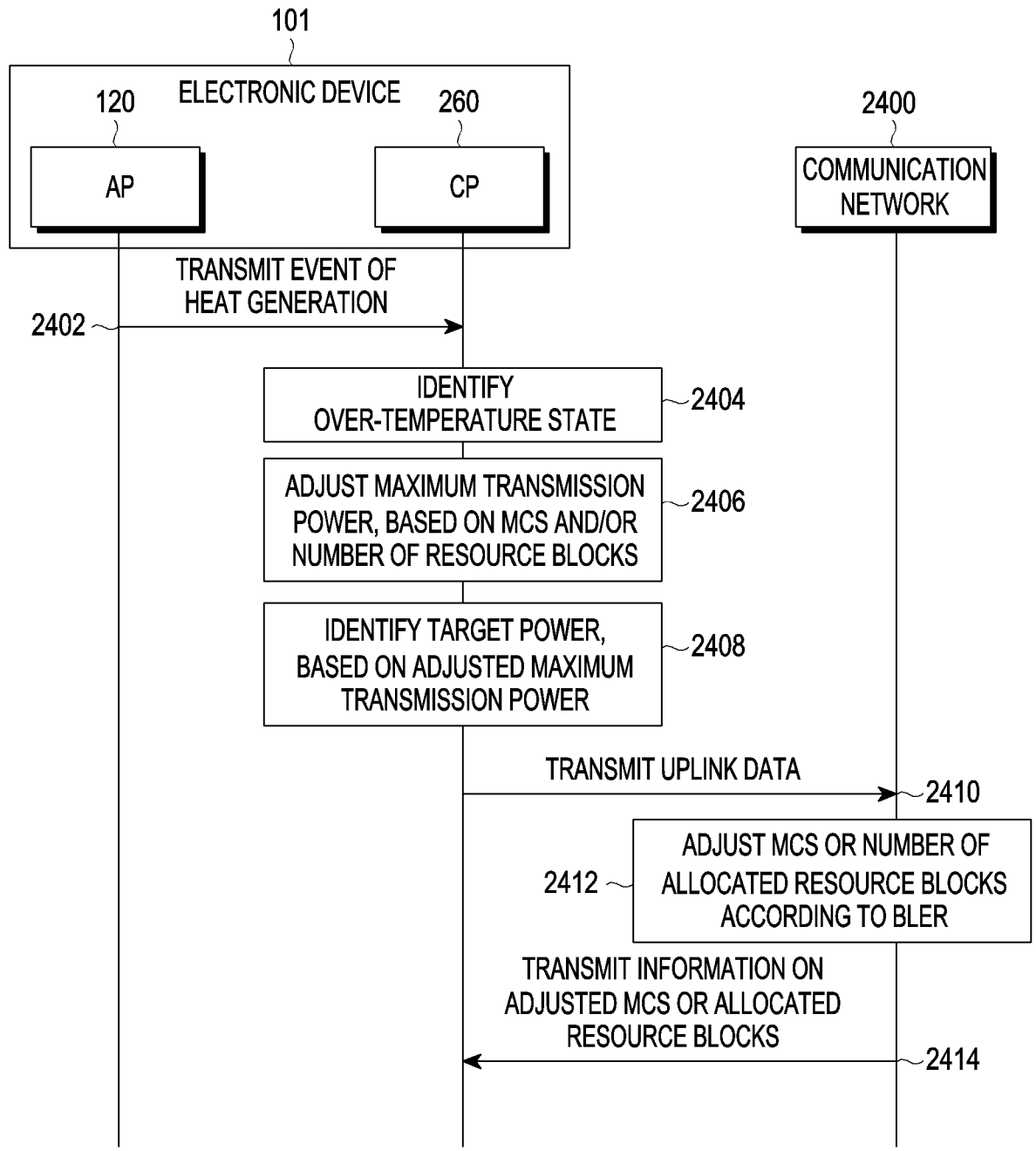
FIG. 24 is a flowchart illustrating an operation method of an electronic device according to various embodiments.

FIG. 24 is a flowchart illustrating an operation method of an electronic device according to various embodiments. Referring to FIG. 24, according to various embodiments, in operation 2402, an AP 120 (for example, the processor 120) of an electronic device 101 may transmit a heat generation event to a CP 260 (for example, at least one of the first communication processor 212, the second communication processor 214, or the integrated communication processor 260).

According to various embodiments, in operation 2404, the CP 260 (for example, at least one of the first communication processor 212, the second communication processor 214, or the integrated communication processor 260) of the electronic device 101 may identify an over-temperature state (or information associated with the over-temperature state).

According to various embodiments, in response to the identification of the over-temperature state (or the information related to the over-temperature state), the CP 260 of the electronic device 101 may adjust, in operation 2406, the maximum transmission power to a relatively smaller value, based on at least one of an MCS and/or the number of resource blocks. Various embodiments of adjusting the maximum transmission power are described in FIGS. 18 and 19 above, the detailed description will be omitted.

According to various embodiments, the CP 260 of the electronic device 101 may configure or identify, in operation 2408, target power (e.g., transmission power of uplink data), based on the reduced maximum transmission power, and may transmit, in operation 2410, the uplink transmission data to a communication network 2400 (e.g., the base station 2210).

According to various embodiments, the communication network 2400 may receive the update data at the reduced transmission power, and as the transmission power is reduced, a BLER of the received uplink data may increase. The communication network 2400 may adjust, in operation 2412, the MCS or the number of allocated resource blocks as the BLER changes. For example, as the BLER increases, the communication network 2400 may reduce the MCS or the number of allocated resource blocks. In operation 2414, the communication network 2400 may transmit the adjusted MCS or resource block allocation information to the electronic device 101.

According to various embodiments, the electronic device 101 may move to the position of a weak electric field. For example, the electronic device 101 may move from the position of terminal A 101a to the position (for example, an edge area of the cell 2220) of terminal B 101b in FIG. 22. The maximum transmission power may be reduced according to the over-temperature state of the electronic device 101 even though the electronic device 101 moves to the position of the weak electric field, and thus, it may be difficult for the electronic device 101 and the communication network 2400 to normally communicate with each other. According to various embodiments, when the electronic device 101 moves to the position of the weak electric field, the maximum transmission power may be adjusted to be increased. According to various embodiments, the electronic device 101 may identify a weak electric field situation, based on reference signal received power (RSRP) of a reception signal or the number of times of failure in decoding a reception signal. For example, the electronic device 101 may determine the state as a weak electric state when the RSRP of the reception signal is equal to or greater than a configured value (e.g., −115 dBm).

Figure 25:
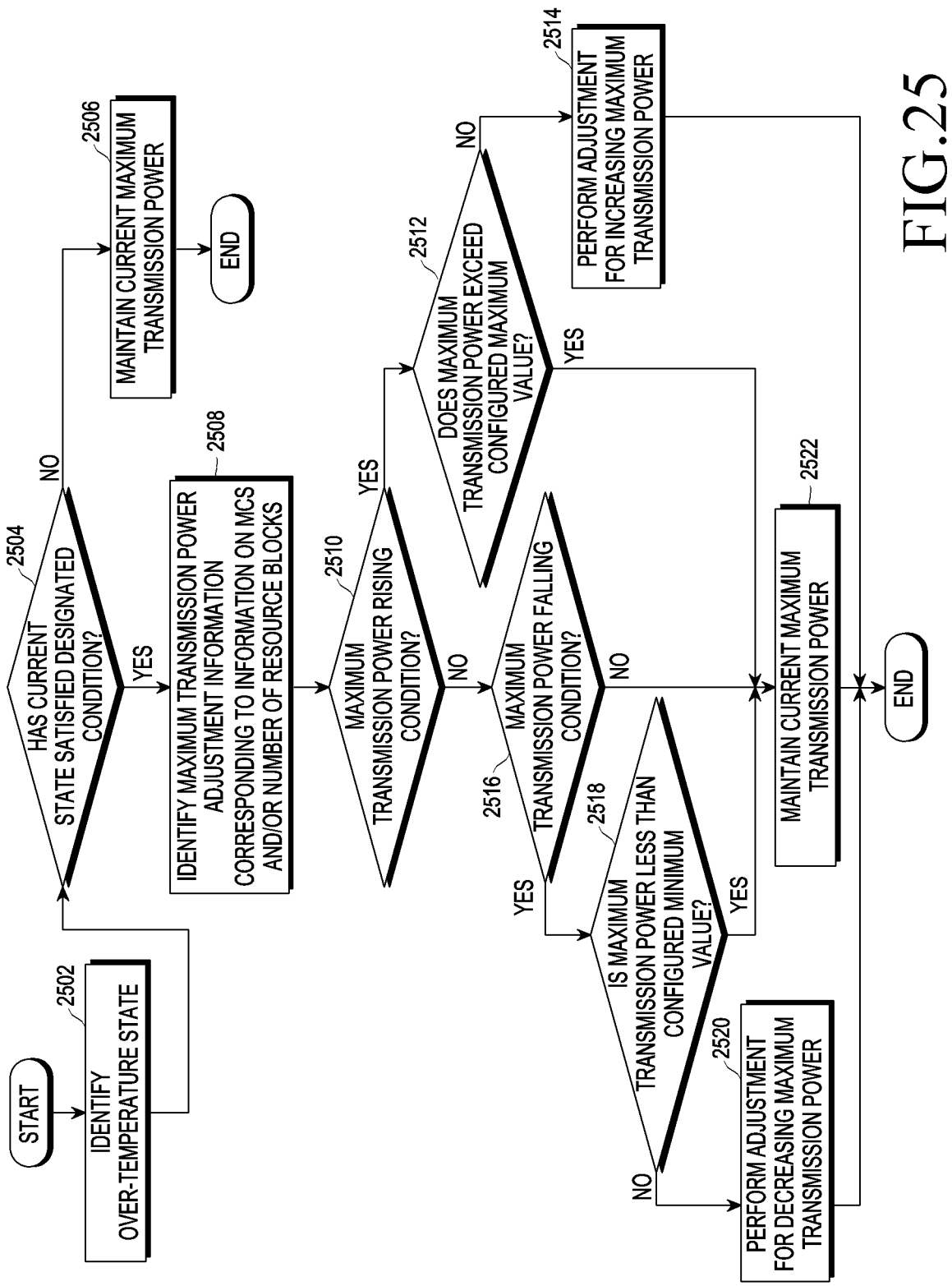
FIG. 25 is a flowchart illustrating an operation method of an electronic device according to various embodiments.

FIG. 25 is a flowchart illustrating an operation method of an electronic device according to various embodiments. Referring to FIG. 25, according to various embodiments, in operation 2502, the electronic device 101 (for example, at least one of the processor 120, the first communication processor 212, the second communication processor 214, or the integrated communication processor 260) may identify an over-temperature state (or information associated with the over-temperature state).

According to various embodiments, in response to the identification of the over-temperature state (or the information associated with the over-temperature state), the electronic device 101 may identify, in operation 2504, whether a current state satisfies a designated condition. For example, a situation in which the designated condition is satisfied may include at least one of operation 1205 of FIG. 12, operation 1505 of FIG. 15, operation 1607 of FIG. 16, and operation 1707 of FIG. 17. As a result of the identification, if the designated condition has failed to be satisfied (if "No" in operation 2504), current maximum transmission power (e.g., $P_{CMAX}$) may be maintained in operation 2506.

According to various embodiments, as a result of the identification, if the designated condition is satisfied (if "Yes" in operation 2504), the electronic device 101 may identify, in operation 2508, maximum transmission power adjustment information corresponding to at least one of the MCS and the number of resource blocks. For example, the electronic device 101 may identify the maximum transmission power adjustment information corresponding to the MCS and the number of resource blocks with reference to <Table 4> below.

TABLE 4

|  |  | Number of resource blocks | | |
|---|---|---|---|---|
|  |  | 1-30 | 31-60 | 61 or larger |
| MCS Index | 3-10 | Increase | Maintain | Decrease |
|  | 11-19 | Maintain | Decrease | Decrease |
|  | 20-27 | Decrease | Decrease | Decrease |

Referring to <Table 4> above, when the MCS index corresponds to 11-19 and the number of resource blocks corresponds to 31-60, the maximum transmission power may be adjusted to decrease by a unit configuration value (e.g., 1 dB). In another example, when the MCS index corresponds to 3-10 and the number of resource blocks corresponds to 1-30, the maximum transmission power may be adjusted to increase by a unit configuration value (e.g., 1 dB). In another example, when the MCS index corresponds to 11-19 and the number of resource blocks corresponds to 31-60, the maximum transmission power may be configured to be maintained at current maximum transmission power. According to various embodiments, in operation 2510, the electronic device 101 may identify the maximum transmission power adjustment information and identify whether the identified maximum transmission power adjustment information corresponds to a rising condition (for example, a condition configured to increase by a unit configuration value). For example, referring to <Table 4> above, when the MCS index corresponds to 3-10 and the number of resource blocks corresponds to 1-30, the electronic device 101 may identify a condition in which the maximum transmission power increases or rises. As a result of the identification, if a maximum transmission power rising condition is identified (if "Yes" in operation 2510), the electronic device 101 may identify, in operation 2512, whether a value obtained by increasing the maximum transmission power exceeds a configured maximum value. As a result of the identification, when the value exceeds the configuration maximum value (if "Yes" in operation 2512), the electronic device 101 may control, in operation 2522, the current maximum power to remain the same without an increase. As a result of the identification, if the value does not exceed the configuration maximum value (if "No" in operation 2512), the electronic device 101 may increase the current maximum transmission power by the unit configuration value in operation 2514.

According to various embodiments, as a result of the identification in operation 2510, if no maximum transmission power rising condition is identified (if "No" in operation 2510), the electronic device 101 may identify, in operation 2516, whether the maximum transmission power adjustment information identified in operation 2508 corresponds to a falling condition (for example, a condition configured to decrease by a unit configuration value). For example, referring to <Table 4>, when the MCS index corresponds to 11-19 and the number of resource blocks corresponds to 31-60, the electronic device 101 may identify a condition in which the maximum transmission power decreases or falls. As a result of the identification, if a maximum power falling condition is identified (if "Yes" in operation 2516)", the electronic device 101 may identify, in operation 2518, whether a value obtained by reducing the maximum transmission power is lower than a configured minimum value. As a result of the identification, when the value is lower than the configuration minimum value (if "Yes" in operation 2518), the electronic device 101 may control, in operation 2522, the current maximum power to remain the same without reduction. As a result of the identification, if the value obtained by reducing the maximum transmission power is not lower than the configuration minimum value (if "No" in operation 2518), the electronic device 101 may decrease the current maximum transmission power by the unit configuration value in operation 2520. As a result of the identification in operation 2516, if it is identified that the maximum transmission power is not a falling condition ("No" in operation 2516), in operation 2522, the electronic device 101 may maintain the current maximum transmission power.

Figure 26:
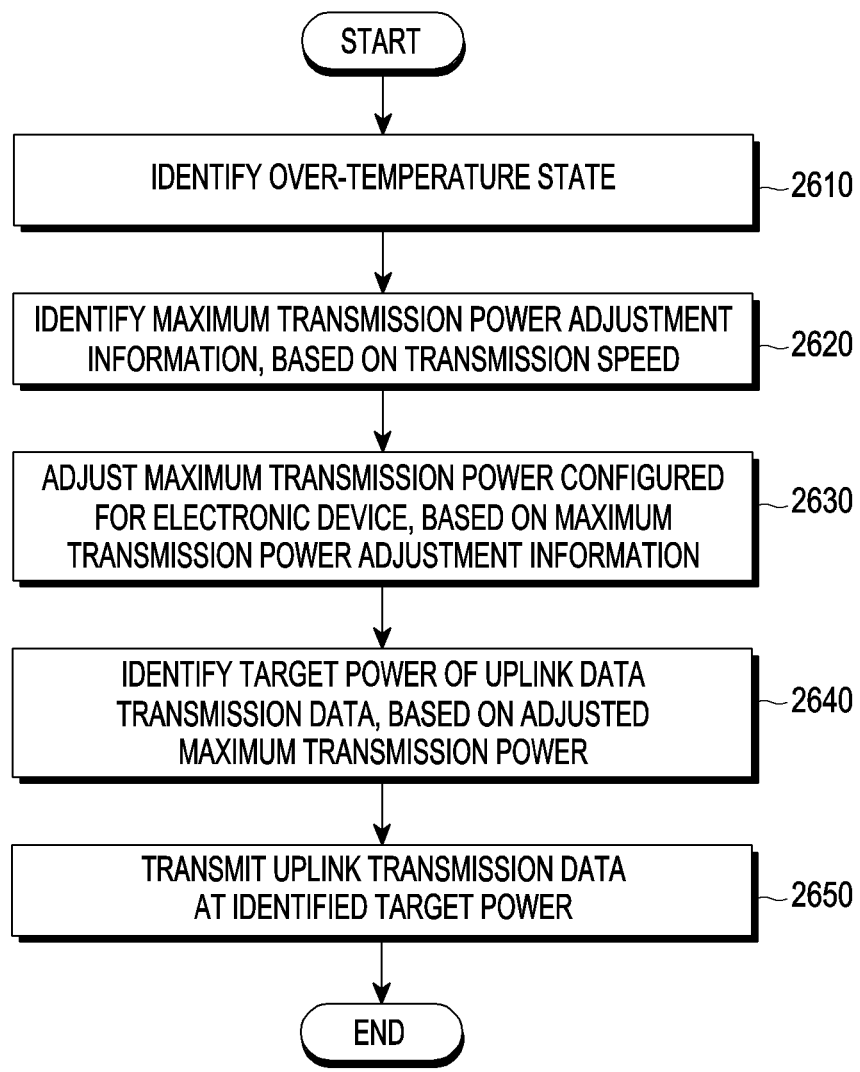
FIG. 26 is a flowchart illustrating an operation method of an electronic device according to various embodiments.

FIG. 26 is a flowchart illustrating an operation method of an electronic device according to various embodiments. Referring to FIG. 26, according to various embodiments, in operation 2610, the electronic device 101 (for example, at least one of the processor 120, the first communication processor 212, the second communication processor 214, or the integrated communication processor 260) may identify an over-temperature state (or information associated with the over-temperature state). For example, the electronic device 101 may identify an indication indicating an over temperature in operation 2610. For example, the processor 120 may acquire temperature information from the sensor module 176. For example, the processor 120 may determine whether the acquired temperature information corresponds to a designated threshold temperature (for example, 43° C.) or higher. When the acquired temperature information corresponds to the designated threshold temperature or higher, the processor 120 may provide the indication indicating the over temperature to a communication processor (for example, at least one of the first communication processor 212, the second communication processor 214, or the integrated communication processor 260). In another implementation example, the communication processor (for example, at least one of the first communication processor 212, the second communication processor 214, or the integrated communication processor 260) may acquire temperature information directly from the sensor module 176. In this case, the communication processor (for example, at least one of the first communication processor 212, the second communication processor 214, or the integrated communication processor 260) may determine whether the acquired temperature information corresponds to a designated threshold temperature or higher.

According to various embodiments, the electronic device 101 may identify information associated with the over-temperature state in operation 2610. For example, the electronic device 101 may manage multiple temperature ranges. The electronic device 101 may identify, as the information associated with the over-temperature state, a temperature range including the measured temperature.

According to various embodiments, in response to the identification of the over-temperature state (or the information associated with the over-temperature state), the electronic device 101 may control transmission power, based on information (e.g., information related to resource allocation) related to a physical (PHY) layer. For example, in response to the identification of the over-temperature state, the electronic device 101 may identify whether the maximum transmission power (Max Tx power) is adjusted and/or the maximum transmission power adjustment information, based on the information related to the physical layer. The information related to the physical layer may include at least one of a modulation and coding scheme (MCS), the number ($N_{RB}$) of resource blocks (RBs), a grant ratio, a block error rate (BLER), a data rate (or throughput (T-put)), a buffer status index (BSI), or a path loss (PL). According to various embodiments, when applying the information related to the physical layer, the electronic device 101 may use an average during a configured unit time (e.g., one second) in the following embodiments.

According to various embodiments, the electronic device 101 may control power of a transmission signal according to target power required from a base station, within the maximum transmission power at which transmission is allowed in the electronic device 101. For example, the electronic device may control the power of the transmission signal to be a minimum value among the target power and the maximum transmission power of the electronic device (UE Tx MAX Power). According to various embodiments, the maximum transmission power of the electronic device (UE Tx MAX Power) may be determined to be a minimum value among the maximum available transmission power (PcMax) of the electronic device in consideration of the characteristics of the electronic device, the maximum transmission power (PeMax) according to a power class configured in the electronic device, and the maximum transmission power (SAR Max Power) in consideration of a specific absorption rate (SAR) backoff event, but there is no limitation in a scheme of the determination. Hereinafter, for convenience of description, it is assumed that the maximum transmission power (UE Tx MAX Power) corresponds to the maximum available transmission power (PcMax) of the electronic device.

According to various embodiments, the target power may change according to a channel state which changes in real time, and may be determined according to a transmitting power control (TPC) by the base station. According to various embodiments, the electronic device 101 may configure the target power determined based on <Equation 1> above to be determined within a range not departing from the maximum transmission power of the electronic device. For example, when the maximum transmission power of the electronic device is configured as 20 dBm and the target power determined based on <Equation 1> is 21 dBm, the transmission power for uplink data transmission in the electronic device 101 may be limited to 20 dBm.

According to various embodiments, in operation 2610, the electronic device 101 may identify the maximum transmission power adjustment information, based on the information (e.g., information related to resource allocation) related to the physical (PHY) layer, in response to the identification of the over-temperature state (or information associated with the over-temperature state). For example, the electronic device 101 may identify the maximum transmission power adjustment information, based on a transmission speed (or throughput (T-put)), in operation 2620. For example, the electronic device 101 may determine the transmission speed (e.g., a data rate (or throughput)), based on <Equation 2> below according to the standard document 3GPP TS 38.306.

data rate (in Mbps) = [Equation 2]

$$10^{-6} \cdot \sum_{j=1}^{J} \left( v_{Layers}^{(j)} \cdot Q_m^{(j)} \cdot f^{(j)} \cdot R_{max} \frac{N_{PRB}^{BW(j),\mu} \cdot 12}{T_s^{\mu}} (1 - OH^{(j)}) \right)$$

The definition of <Equation 2> above may follow 3GPP TS 38.306, wherein, for example, v may indicate the number of layers, Qm may indicate a modulation order, f may indicate a scaling factor, and Rmax may indicate a code rate. In <Equation 2> above, N may indicate the number of RBs allocated to the electronic deice 101, T may indicate numerology, and overhead (OH) may indicate overhead considering control data. For example, the data rate may be determined based on the MCS and/or the number of resource blocks, as shown in <Equation 2>.

According to various embodiments, the electronic device 101 may map the data rate or a data rate range to a maximum transmission power adjustment value and apply the same. For example, when the data rate is within a configure first range, configuration may be made so as to adjust the currently configured maximum transmission power by −1 dB, when the data rate is within a configure second range, configuration may be made so as to adjust the currently configured maximum transmission power by −2 dB, and when the data rate is within a configure third range configuration may be made so as to adjust the currently configured maximum transmission power by −3 dB.

According to various embodiments, the electronic device 101 may identify the maximum transmission power adjustment information, further considering a grant ratio in addition to the transmission speed in operation 2620 above. For example, the maximum transmission power adjustment information may be identified based on a value obtained by dividing the transmission speed determined by <Equation 2> by the grant ratio.

According to various embodiments, in operation 2630, the electronic device 101 may adjust the maximum transmission power configured for the electronic device, based on the identified maximum transmission power adjustment information. For example, in a case where the maximum transmission power (e.g., an initial value of the maximum transmission power or a current value of the maximum transmission power) is configured as 23 dBm, when the adjustment is made by −1 dB according to the data rate, the maximum transmission power may be adjusted to 22 dBm, when the adjustment is made by −2 dB according to the data rate, the maximum transmission power may be adjusted to 21 dBm, and when the adjustment is made by −3 dB according the data rate, the maximum transmission power may be adjusted to 20 dBm.

According to various embodiments, the electronic device 101 may identify a target power of uplink transmission data based on the adjusted maximum transmission power in operation 2640.

According to various embodiments, in operation 2650, the electronic device 101 may transmit the uplink transmission data at the target power configured or identified based on the adjusted maximum transmission power.

According to various embodiments, the electronic device 101 may determine whether to apply the maximum transmission power adjustment in operations 2620 and 2630, based on the information (e.g., information related to resource allocation) related to the physical (PHY) layer.

For example, when the path loss has a value equal to or greater than a configured value (30 dB), it is determined that the electronic device 101 is positioned in a cell edge area or in a week electric field, and thus, the above-described maximum transmission power adjustment may not be applied. For example, even though the maximum transmission power is adjusted from 23 dBm to 22 dBm according to the MCS and/or the number of resource blocks, the maximum transmission power may be configured not to decrease any more, or the maximum transmission power may be adjusted to increase when the path loss has a value equal to or greater than the configured value.

According to various embodiments, when adjusting the maximum transmission power, the electronic device 101 may configure the maximum transmission power not to exceed a configured maximum value and not to be lower than a configured minimum value. For example, when the maximum value of the maximum transmission power is configured as 25 dBm and the minimum value is configured as 10 dBm, the electronic device 101 may control the maximum transmission power not to exceed the configured maximum value, 25 dBm, even when the maximum transmission power increases according to the MCS and/or the number of resource blocks, and may control the maximum transmission power not to be lower than the configured minimum value, 10 dBm, even when the maximum transmission power decreases.

According to various embodiments, when a grant ratio is equal to or higher than a configured value, the electronic device 101 may not apply the above-described maximum transmission power adjustment. For example, when the grant ratio is 50% or higher, the electronic device 101 may control the maximum transmission power not to decrease more from the currently configured value, or may control the maximum transmission power not to decrease by a configured value (e.g., 3 d B) or greater from the initial value of the maximum transmission power.

According to various embodiments, when a BSI has a value equal to or greater than a configured value, the electronic device 101 may not apply the above-described maximum transmission power adjustment. When the BSI has a value equal to or greater than a specific value, the electronic device 101 may control the maximum transmission power not to decrease more from the currently configured value, or may control the maximum transmission power not to decrease by a configured value (e.g., 3 d B) or greater from the initial value of the maximum transmission power. The BSI may be included in a buffer status report (BSR) transmitted from the electronic device 101 to the network, and transmitted. For example, the electronic device 101 may transmit the BSR including the BSI to the network through a medium access control (MAC) control element (CE). According to various embodiments, the electronic device 101 may identify a BSI included in a BSR to be transmitted to the network, and may control the maximum transmission power not to decrease when the BSI has a value equal to or greater than a configured value. For example, when the BSI corresponds to 50, a buffer size may correspond to 19325 bytes to 22624 bytes, and the electronic device 101 may control the maximum transmission power not to decrease in order to secure transmission of data corresponding to the buffer size.

According to various embodiments, when a BLER is equal to or greater than a configured value, the electronic device 101 may not apply the above-described maximum transmission power adjustment. For example, when the BLER is 10% or higher, the electronic device 101 may control the maximum transmission power not to decrease more from the currently configured value.

An electronic device according to one of various embodiments may include: a temperature sensor; a wireless communication circuit; and a processor electrically connected to the wireless communication circuit, wherein the processor is configured to: receive a temperature sensed by the temperature sensor; determine a first maximum transmission power as a maximum transmission power of uplink transmission data to be transmitted through the wireless communication circuit, identify a modulation and coding scheme (MCS) index and a number of resource blocks (RBs), when the received temperature is higher than a predetermined value, based on the identified the MCS index and the number of RBs, determine a second maximum transmission power, and change the first maximum transmission power to the second maximum transmission power, wherein the second maximum transmission power is lower than the first maximum transmission power.

According to various embodiments, the processor may be further configured to: identify a modulation scheme from the MCS index, and based on the identified modulation scheme, change the first maximum transmission power to the second maximum transmission power, wherein the modulation scheme comprises at least one of quadrature phase shift keying (QPSK), 16 quadrature amplitude modulation (QAM), 64 QAM, or 256 QAM. According to various embodiments, the processor may be further configured maintain the first maximum transmission power based on identifying that a path loss between the electronic device and a base station has a value equal to or less than a configured value.

According to various embodiments, the processor may be further configured to maintain the first maximum transmission power based on identifying that a grant ratio allocated for transmission of the uplink transmission data has a value equal to or greater than a configured value.

According to various embodiments, the processor may be further configured to maintain the first maximum transmission power based on identifying that a buffer state index for the uplink transmission data has a value equal to or greater than a configured value.

According to various embodiments, the processor may be further configured to maintain the first maximum transmission power based on identifying that a block error rate (BLER) for the uplink transmission data has a value equal to or greater than a configured value.

According to various embodiments, the processor may be further configured to identify a data rate of the uplink transmission data; and change the first maximum transmission power to the second maximum transmission power based on the identified data rate.

A method according to one of various embodiments may include: receiving a temperature sensed by a temperature sensor; determining a first maximum transmission power as a maximum transmission power of uplink transmission data to be transmitted through a wireless communication circuit; identifying a modulation and coding scheme (MCS) index and a number of resource blocks (RBs); when the received temperature is higher than a predetermined value, based on the identified the MCS index and the number of RBs, determining a second maximum transmission power; and changing the first maximum transmission power to the second maximum transmission power, wherein the second maximum transmission power is lower than the first maximum transmission power.

According to various embodiments, the method may include identifying a modulation scheme from the MCS index, and based on the identified modulation scheme, changing the first maximum transmission power to the second maximum transmission power, wherein the modulation scheme comprises at least one of quadrature phase shift keying (QPSK), 16 quadrature amplitude modulation (QAM), 64 QAM, or 256 QAM.

According to various embodiments, maintaining the first maximum transmission power, based on identifying that a path loss between the electronic device and a base station has a value equal to or less than a configured value.

According to various embodiments, the method may include maintaining the first maximum transmission power, based on identifying that a grant ratio allocated for transmission of the uplink transmission data has a value equal to or greater than a configured value.

According to various embodiments, the method may include maintaining the first maximum transmission power, based on identifying that a buffer state index for the uplink transmission data has a value equal to or greater than a configured value.

According to various embodiments, the method may include maintaining the first maximum transmission power, based on identifying that a block error rate (BLER) for the uplink transmission data has a value equal to or greater than a configured value.

According to various embodiments, the method may include: identifying a data rate of the uplink transmission data; and changing the first maximum transmission power to the second maximum transmission power, based on the identified data rate.

According to various embodiments, a non-transitory computer readable storage medium storing one or more programs, the one or more programs comprising instructions may be configured to, when executed by a processor of an electronic device, cause the electronic device to: receive a temperature sensed by a temperature sensor; determine a first maximum transmission power as a maximum transmission power of uplink transmission data to be transmitted through a wireless communication circuit, identify a modulation and coding scheme (MCS) index and a number of resource blocks (RBs), when the received temperature is higher than a predetermined value, based on the identified the MCS index and the number of RBs, determine a second maximum transmission power, and change the first maximum transmission power to the second maximum transmission power, wherein the second maximum transmission power is lower than the first maximum transmission power.

According to various embodiments, wherein the instructions may be further configured to, when executed by the processor of the electronic device, cause the electronic device to: identify a modulation scheme from the MCS index, and based on the identified modulation scheme, change the first maximum transmission power to the second maximum transmission power, wherein the modulation scheme comprises at least one of quadrature phase shift keying (QPSK), 16 quadrature amplitude modulation (QAM), 64 QAM, or 256 QAM.

According to various embodiments, wherein the instructions may be further configured to, when executed by the processor of the electronic device, may cause the electronic device to: maintain the first maximum transmission power based on identifying that a path loss between the electronic device and a base station has a value equal to or less than a configured value.

According to various embodiments, wherein the instructions may be further configured to, when executed by the processor of the electronic device, cause the electronic device to: maintain the first maximum transmission power based on identifying that a grant ratio allocated for transmission of the uplink transmission data has a value equal to or greater than a configured value.

According to various embodiments, wherein the instructions may be further configured to, when executed by the processor of the electronic device, cause the electronic device to: maintain the first maximum transmission power based on identifying that a buffer state index for the uplink transmission data has a value equal to or greater than a configured value.

According to various embodiments, wherein the instructions may be further configured to, when executed by the processor of the electronic device, cause the electronic device to: maintain the first maximum transmission power based on identifying that a block error rate (BLER) for the uplink transmission data has a value equal to or greater than a configured value.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a wireless communication circuit;
at least one processor including processing circuitry electrically connected to the wireless communication circuit; and
memory storing instructions,
wherein the instructions, when executed by the at least one processor individually and/or collectively, cause the electronic device to:
determine a first maximum transmission power as a maximum transmission power of uplink transmission data to be transmitted through the wireless communication circuit;
identify an over-temperature state of the electronic device;
identify a modulation and coding scheme (MCS) index and a number of resource blocks (RBs) in the over-temperature state of the electronic device; and
when the electronic device is in the over-temperature state, based on the MCS index and the number of RBs, change the first maximum transmission power to a second maximum transmission power,
wherein the second maximum transmission power is lower than the first maximum transmission power.

2. The electronic device of claim 1, wherein the instructions, when executed by the at least one processor, further cause the electronic device to:
identify a modulation scheme from the MCS index, and
based on the identified modulation scheme, change the first maximum transmission power to the second maximum transmission power,
wherein the modulation scheme comprises at least one of quadrature phase shift keying (QPSK), 16 quadrature amplitude modulation (QAM), 64 QAM, or 256 QAM.

3. The electronic device of claim 1, wherein the instructions, when executed by the at least one processor, further cause the electronic device to:
maintain the first maximum transmission power based on identifying that a path loss between the electronic device and a base station has a value equal to or less than a configured value, regardless of the MCS index and the number of RBS.

4. The electronic device of claim 1, wherein the instructions, when executed by the at least one processor, further cause the electronic device to:
maintain the first maximum transmission power based on identifying that a grant ratio allocated for transmission of the uplink transmission data has a value equal to or greater than a configured value, regardless of the MCS index and the number of RBs.

5. The electronic device of claim 1, wherein the instructions, when executed by the at least one processor, further cause the electronic device to:
maintain the first maximum transmission power based on identifying that a buffer state index for the uplink transmission data has a value equal to or greater than a configured value, regardless of the MCS index and the number of RBs.

6. The electronic device of claim 1, wherein the instructions, when executed by the at least one processor, further cause the electronic device to:
maintain the first maximum transmission power based on identifying that a block error rate (BLER) for the uplink transmission data has a value equal to or greater than a configured, regardless of the MCS index and the number of RBs.

7. The electronic device of claim 1, wherein the instructions, when executed by the at least one processor, further cause the electronic device to:
identify a data rate of the uplink transmission data; and
change the first maximum transmission power to the second maximum transmission power based on the identified data rate.

8. A method for controlling transmission power in an electronic device, the method comprising:
determining a first maximum transmission power as a maximum transmission power of uplink transmission data to be transmitted through a wireless communication circuit;
identifying an over-temperature state of the electronic device;
identifying a modulation and coding scheme (MCS) index and a number of resource blocks (RBs) in the over-temperature state of the electronic device; and
when the electronic device is in the over-temperature state, based on the MCS index and the number of RBs, changing the first maximum transmission power to a second maximum transmission power,
wherein the second maximum transmission power is lower than the first maximum transmission power.

9. The method of claim 8, further comprising:
identifying a modulation scheme from the MCS index, and
based on the identified modulation scheme, changing the first maximum transmission power to the second maximum transmission power,
wherein the modulation scheme comprises at least one of quadrature phase shift keying (QPSK), 16 quadrature amplitude modulation (QAM), 64 QAM, or 256 QAM.

10. The method of claim 8, further comprising:
maintaining the first maximum transmission power, based on identifying that a path loss between the electronic device and a base station has a value equal to or less than a configured value, regardless of the MCS index and the number of RBs.

11. The method of claim 8, further comprising:
maintaining the first maximum transmission power, based on identifying that a grant ratio allocated for transmission of the uplink transmission data has a value equal to or greater than a configured value, regardless of the MCS index and the number of RBs.

12. The method of claim 8, further comprising:
maintaining the first maximum transmission power, based on identifying that a buffer state index for the uplink transmission data has a value equal to or greater than a configured value, regardless of the MCS index and the number of RBs.

13. The method of claim 8, further comprising:
maintaining the first maximum transmission power, based on identifying that a block error rate (BLER) for the uplink transmission data has a value equal to or greater than a configured value, regardless of the MCS index and the number of RBs.

14. The method of claim 8, further comprising:
identifying a data rate of the uplink transmission data; and
changing the first maximum transmission power to the second maximum transmission power, based on the identified data rate.

15. A non-transitory computer readable storage medium storing one or more programs, the one or more programs comprising instructions configured to, when executed by a processor of an electronic device, cause the electronic device to:

determine a first maximum transmission power as a maximum transmission power of uplink transmission data to be transmitted through a wireless communication circuit, identify an over-temperature state of the electronic device;

identify a modulation and coding scheme (MCS) index and a number of resource blocks (RBs) in the over-temperature state of the electronic device, when the electronic device is in the over-temperature state, based on the MCS index and the number of RBs, determine a second maximum transmission power; and change the first maximum transmission power to the second maximum transmission power, wherein the second maximum transmission power is lower than the first maximum transmission power.

16. The non-transitory computer readable storage medium of claim 15, wherein the instructions are further configured to, when executed by the processor of the electronic device, cause the electronic device to:

identify a modulation scheme from the MCS index, and based on the identified modulation scheme, change the first maximum transmission power to the second maximum transmission power, wherein the modulation scheme comprises at least one of quadrature phase shift keying (QPSK), 16 quadrature amplitude modulation (QAM), 64 QAM, or 256 QAM.

17. The non-transitory computer readable storage medium of claim 15, wherein the instructions are further configured to, when executed by the processor of the electronic device, cause the electronic device to:

maintain the first maximum transmission power based on identifying that a path loss between the electronic device and a base station has a value equal to or less than a configured value, regardless of the MCS index and the number of RBs.

18. The non-transitory computer readable storage medium of claim 15, wherein the instructions are further configured to, when executed by the processor of the electronic device, cause the electronic device to:

maintain the first maximum transmission power based on identifying that a grant ratio allocated for transmission of the uplink transmission data has a value equal to or greater than a configured value, regardless of the MCS index and the number of RBs.

19. The non-transitory computer readable storage medium of claim 15, wherein the instructions are further configured to, when executed by the processor of the electronic device, cause the electronic device to:

maintain the first maximum transmission power based on identifying that a buffer state index for the uplink transmission data has a value equal to or greater than a configured value, regardless of the MCS index and the number of RBs.

20. The non-transitory computer readable storage medium of claim 15, wherein the instructions are further configured to, when executed by the processor of the electronic device, cause the electronic device to:

maintain the first maximum transmission power based on identifying that a block error rate (BLER) for the uplink transmission data has a value equal to or greater than a configured value, regardless of the MCS index and the number of RBS.

* * * * *